US010902567B2

(12) United States Patent
Mertens

(10) Patent No.: US 10,902,567 B2
(45) Date of Patent: Jan. 26, 2021

(54) HANDLING MULTIPLE HDR IMAGE SOURCES

(71) Applicant: KONINKLIJKE PHILIPS N.V., Eindhoven (NL)

(72) Inventor: Mark Jozef Willem Mertens, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 271 days.

(21) Appl. No.: 15/777,022

(22) PCT Filed: Nov. 11, 2016

(86) PCT No.: PCT/EP2016/077373
§ 371 (c)(1),
(2) Date: May 17, 2018

(87) PCT Pub. No.: WO2017/089146
PCT Pub. Date: Jun. 1, 2017

(65) Prior Publication Data
US 2018/0336669 A1    Nov. 22, 2018

Related U.S. Application Data

(60) Provisional application No. 62/383,692, filed on Sep. 6, 2016.

(51) Int. Cl.
*G06K 9/00* (2006.01)
*G06T 5/00* (2006.01)
(Continued)

(52) U.S. Cl.
CPC ............. *G06T 5/007* (2013.01); *G06T 5/50* (2013.01); *G09G 5/02* (2013.01); *G09G 5/026* (2013.01);
(Continued)

(58) Field of Classification Search
None
See application file for complete search history.

(56) References Cited

U.S. PATENT DOCUMENTS 5,767,983 A * 6/1998 Terashita ............. G03B 27/735
355/35
5,987,222 A * 11/1999 Terashita ............. G03B 27/735
355/38

(Continued)

FOREIGN PATENT DOCUMENTS

WO    2014056679 A1    4/2014
WO    2014130213 A1    8/2014

OTHER PUBLICATIONS

Miller, Scott, "A Perceptual EOTF for Extended Dynamic Range Imagery", Dolby Laboratories, Inc., 2014, www.smpte.org.

(Continued)

*Primary Examiner* — Feng Niu

(57) ABSTRACT

To allow the needed versatile image or video combination now that HDR videos of considerably different luminance characteristics are appearing, the apparatus (301) for combining two images or two videos of images (Im_HDR, Im_LDR), one of them being a high dynamic range image or video, the apparatus comprising: —a dynamic range establishing unit (302) arranged to establish a combination luminance dynamic range (CombRng), being characterized by at least a maximum luminance (LMC) which is determined based on at least one of: a maximum luminance of at least one of the two images or the two videos of images, and a peak brightness of a display for rendering the two images or the two videos of images, the dynamic range establishing unit further comprising a luminance anchor determining unit (303), arranged to determine an anchor luminance (anc) in the combination luminance dynamic range (CombRng), —a color transformation unit (310), arranged to perform at least (Continued)

a luminance transformation on at least one of the two images or videos, wherein the color transformation unit (310) comprises a source anchor luminance reading unit (311) arranged to read at least one source anchor luminance (L_SA1) from a first source (350) which delivers a first image or video (Im1_LDR) of the two images or videos, and wherein the color transformation unit is arranged to establish a color transformation (FF_1) to be applied to the first image or video, which color transformation is dependent on the value of the source anchor luminance (L_SA1) by having the property that the source anchor luminance (L_SA1) is mapped to an output luminance in a vicinity of the anchor luminance (anc); and —an image combination unit (320) arranged to combine the two images or two videos of images to form at least one output image (Im_o).

21 Claims, 18 Drawing Sheets

(51) Int. Cl.

| | | |
|---|---|---|
| H04N 5/265 | (2006.01) | |
| G06T 5/50 | (2006.01) | |
| G09G 5/02 | (2006.01) | |
| H04N 1/60 | (2006.01) | |
| H04N 5/445 | (2011.01) | |
| H04N 5/57 | (2006.01) | |
| G09G 5/10 | (2006.01) | |
| H04N 5/45 | (2011.01) | |
| H04N 5/20 | (2006.01) | |
| H04N 9/68 | (2006.01) | |
| H04N 9/77 | (2006.01) | |

(52) U.S. Cl.
CPC ............ *G09G 5/10* (2013.01); *H04N 1/6027* (2013.01); *H04N 5/20* (2013.01); *H04N 5/265* (2013.01); *H04N 5/445* (2013.01); *H04N 5/45* (2013.01); *H04N 5/57* (2013.01); *H04N 9/68* (2013.01); *H04N 9/77* (2013.01); *G06T 2207/10016* (2013.01); *G06T 2207/10024* (2013.01); *G06T 2207/20208* (2013.01); *G06T 2207/20221* (2013.01); *G09G 2340/06* (2013.01); *G09G 2340/125* (2013.01)

(56) References Cited

U.S. PATENT DOCUMENTS

| | | | | |
|---|---|---|---|---|
| 6,429,868 B1* | 8/2002 | Dehner, Jr. | ............ | G06T 11/206 345/440 |
| 7,899,266 B2* | 3/2011 | Mitsunaga | ............. | H04N 5/772 382/274 |
| 8,116,563 B2* | 2/2012 | Mitsunaga | ....... | H04N 21/44008 382/169 |
| 8,248,492 B2* | 8/2012 | Mitsunaga | ............. | G06T 5/002 348/252 |
| 8,330,768 B2* | 12/2012 | Mantiuk | .................. | H04N 5/20 345/589 |
| 8,385,609 B2* | 2/2013 | Piramuthu | ......... | G06K 9/00234 382/118 |
| 8,593,480 B1* | 11/2013 | Ballestad | .............. | G06T 11/001 345/590 |
| 9,224,363 B2* | 12/2015 | Ballestad | .................. | H04N 9/68 |
| 9,338,389 B2* | 5/2016 | Messmer | ............... | H04N 5/265 |
| 9,361,319 B2* | 6/2016 | Feder | ...................... | G06T 11/60 |
| 9,460,125 B2* | 10/2016 | Feder | .................. | G06F 16/5854 |
| 9,501,817 B2* | 11/2016 | Atkins | ...................... | G09G 5/10 |
| 9,667,910 B2* | 5/2017 | Messmer | .................. | H04N 9/64 |
| 9,916,809 B2* | 3/2018 | Ballestad | .............. | G06T 11/001 |
| 9,973,723 B2* | 5/2018 | Guo | ........................ | G09G 5/026 |
| 9,990,749 B2* | 6/2018 | Kunkel | ................ | G06K 9/4652 |
| 10,055,866 B2* | 8/2018 | Kunkel | ............ | H04N 21/42202 |
| 10,255,879 B2* | 4/2019 | Ballestad | ................. | H04N 9/67 |
| 10,395,351 B2* | 8/2019 | Atkins | .................... | G06T 5/009 |
| 10,477,176 B2* | 11/2019 | Sakurai | .............. | H04N 21/4854 |
| 10,497,162 B2* | 12/2019 | Kunkel | .................. | H04N 5/445 |
| 2007/0053607 A1* | 3/2007 | Mitsunaga | ................ | H04N 9/69 382/274 |
| 2008/0199074 A1* | 8/2008 | Mitsunaga | ......... | H04N 21/4402 382/169 |
| 2009/0027558 A1* | 1/2009 | Mantiuk | .............. | H04N 1/4072 348/673 |
| 2010/0158325 A1* | 6/2010 | Piramuthu | ................ | G06T 7/11 382/118 |
| 2011/0043682 A1* | 2/2011 | Chou | .................... | H04N 5/2354 348/363 |
| 2011/0050934 A1* | 3/2011 | Mitsunaga | .............. | G06T 5/002 348/222.1 |
| 2012/0256943 A1* | 10/2012 | Atkins | .................... | G06T 5/009 345/590 |
| 2013/0328907 A1* | 12/2013 | Ballestad | ............. | H04N 1/6088 345/590 |
| 2014/0002478 A1* | 1/2014 | Ballestad | ............. | H04N 1/6088 345/589 |
| 2014/0232614 A1* | 8/2014 | Kunkel | ..................... | G06T 7/90 345/1.1 |
| 2014/0292801 A1* | 10/2014 | Kim | ........................ | G09G 5/02 345/604 |
| 2015/0042890 A1 | 2/2015 | Messmer | | |
| 2015/0093044 A1* | 4/2015 | Feder | ...................... | G06T 11/60 382/284 |
| 2015/0242099 A1* | 8/2015 | Wallace | ................ | G06T 11/001 345/594 |
| 2015/0245004 A1 | 8/2015 | Guo et al. | | |
| 2015/0256860 A1 | 9/2015 | Kunkel et al. | | |
| 2016/0379405 A1* | 12/2016 | Baca | .................... | H04N 13/271 463/32 |
| 2018/0249140 A1* | 8/2018 | Sakurai | .............. | H04N 21/4854 |
| 2018/0262767 A1* | 9/2018 | Messmer | ....... | H04N 21/440227 |
| 2018/0322679 A1* | 11/2018 | Kunkel | ................ | G06K 9/4652 |
| 2019/0251682 A1* | 8/2019 | Feder | ...................... | G06K 9/46 |

OTHER PUBLICATIONS

Borer, Tim, "Non-linear Opto-Electrical Transfer Functions for High Dynamic Range Television", BBC Research and Development White Paper, Jul. 2014.

* cited by examiner

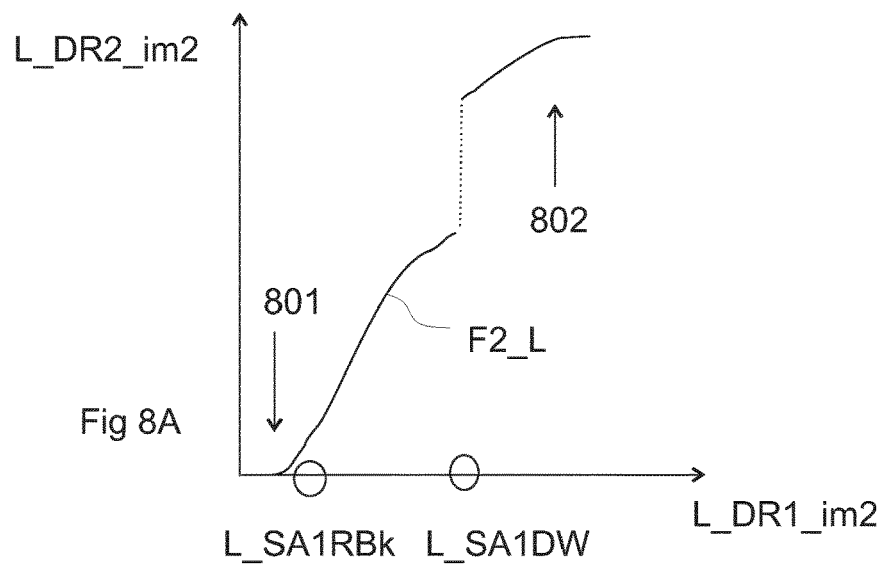
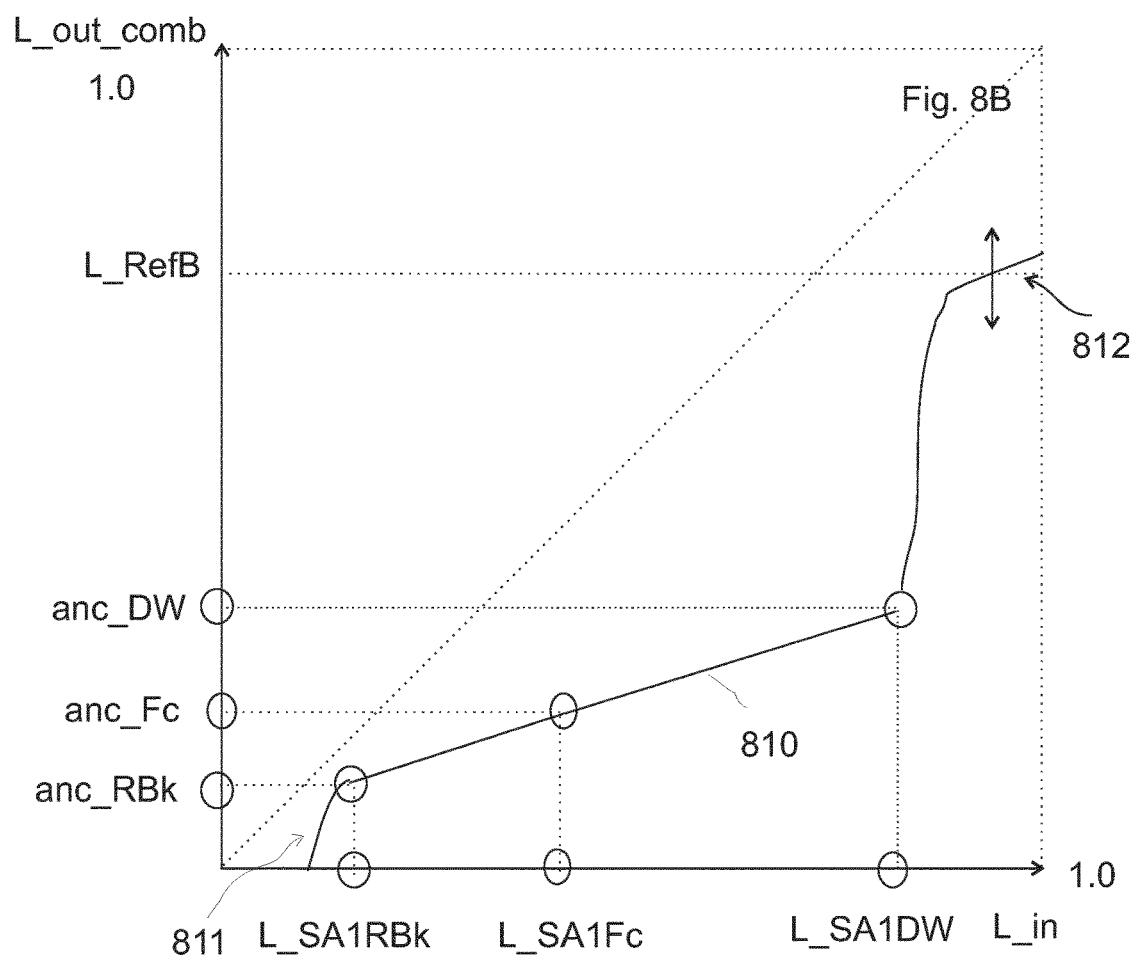
Fig. 8

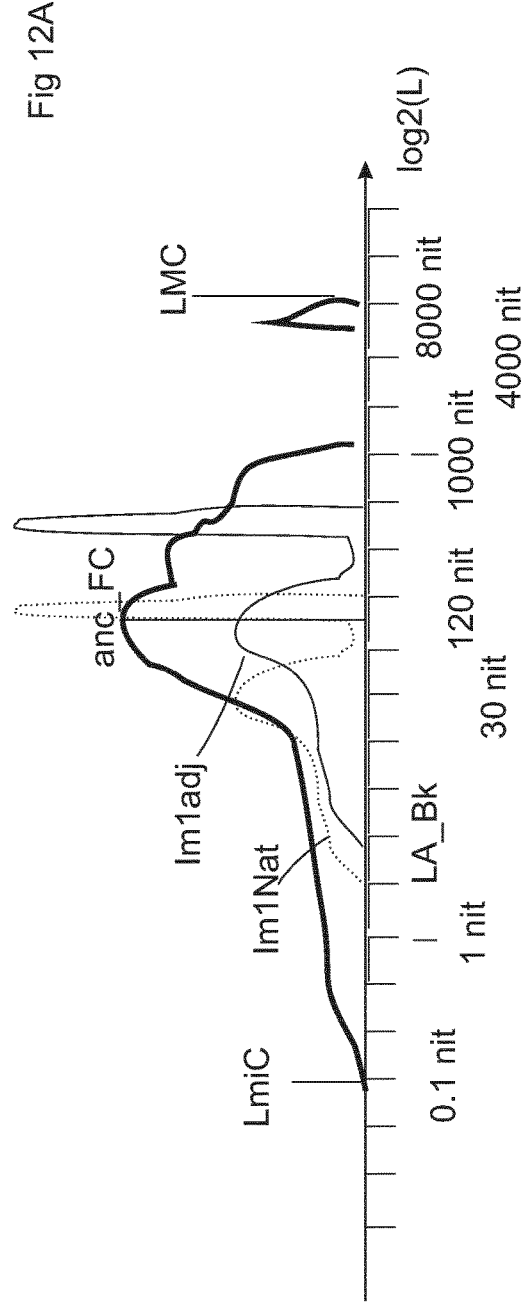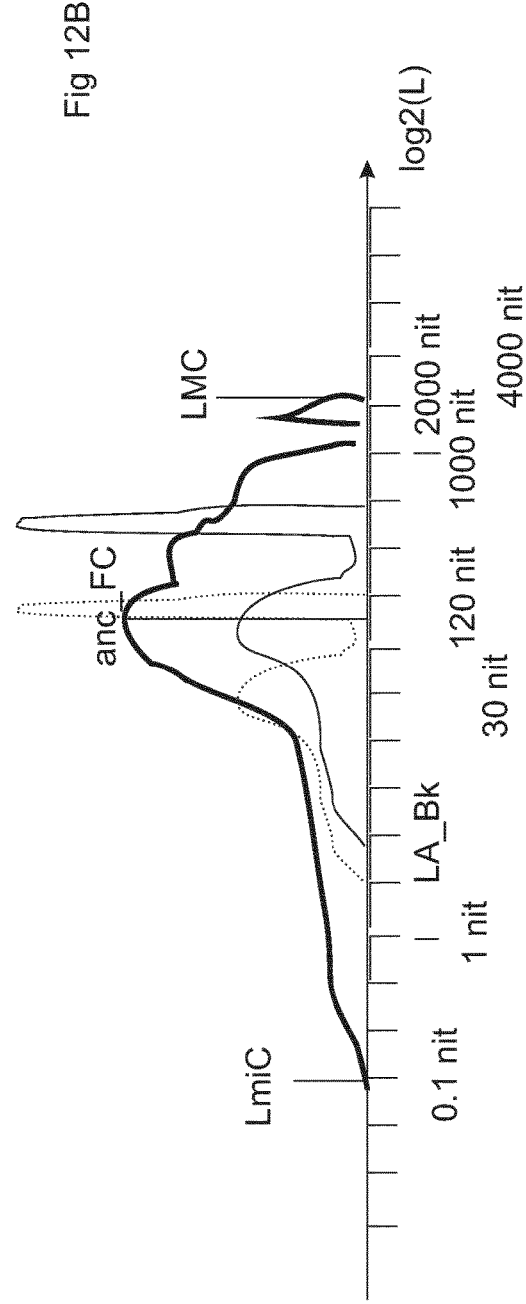
Fig. 12

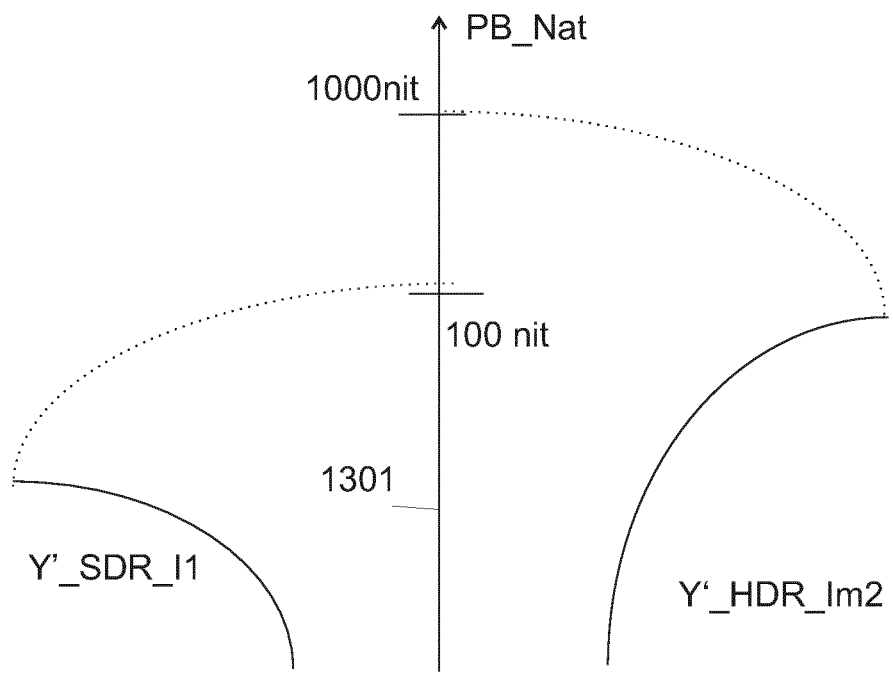
Fig. 13a
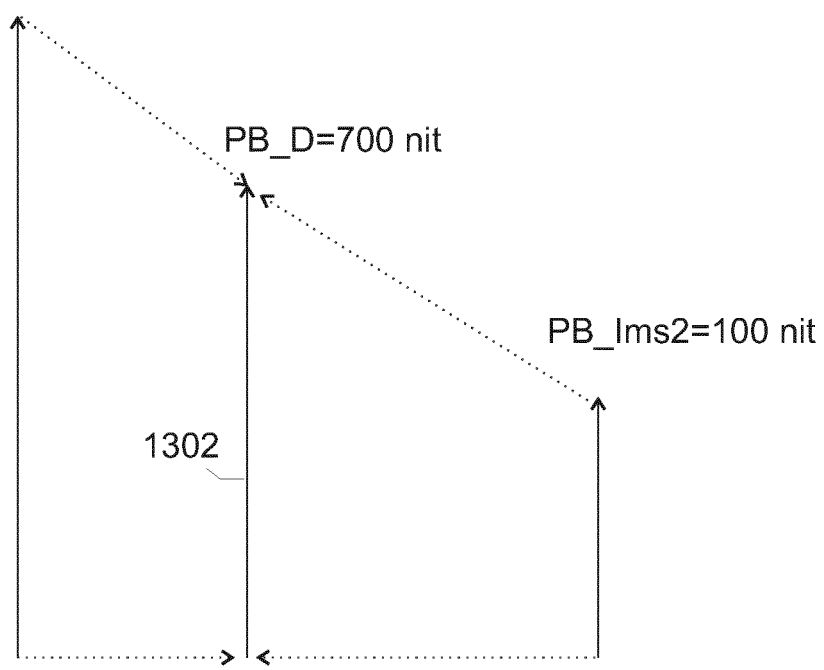
Fig. 13b
Fig. 13

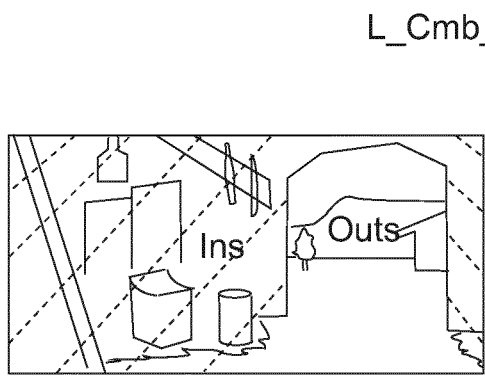
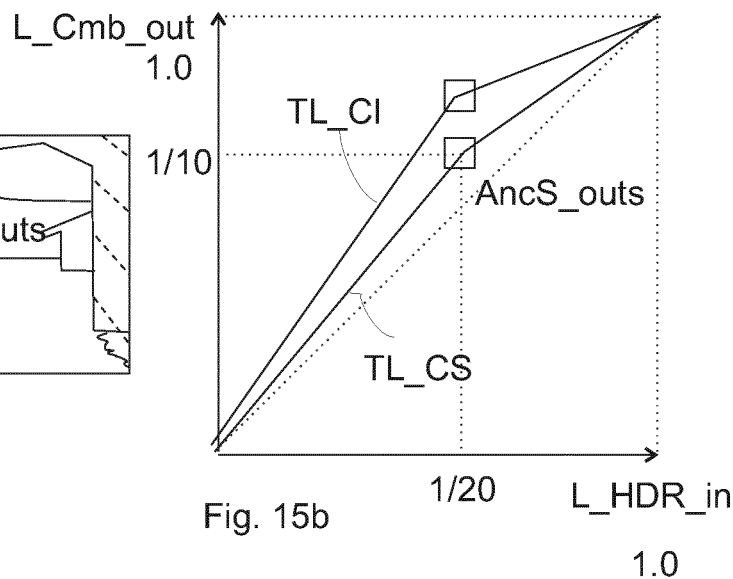
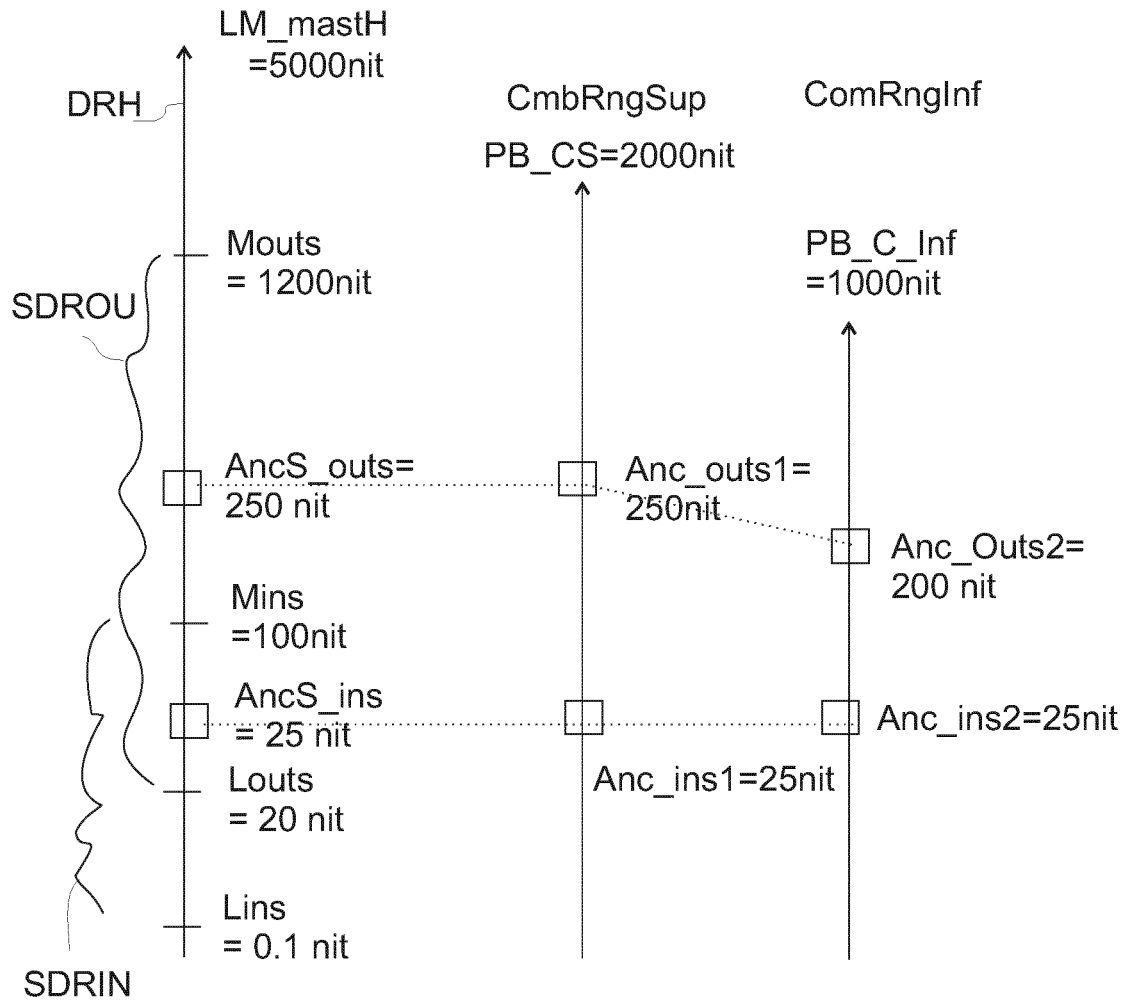
Fig. 15

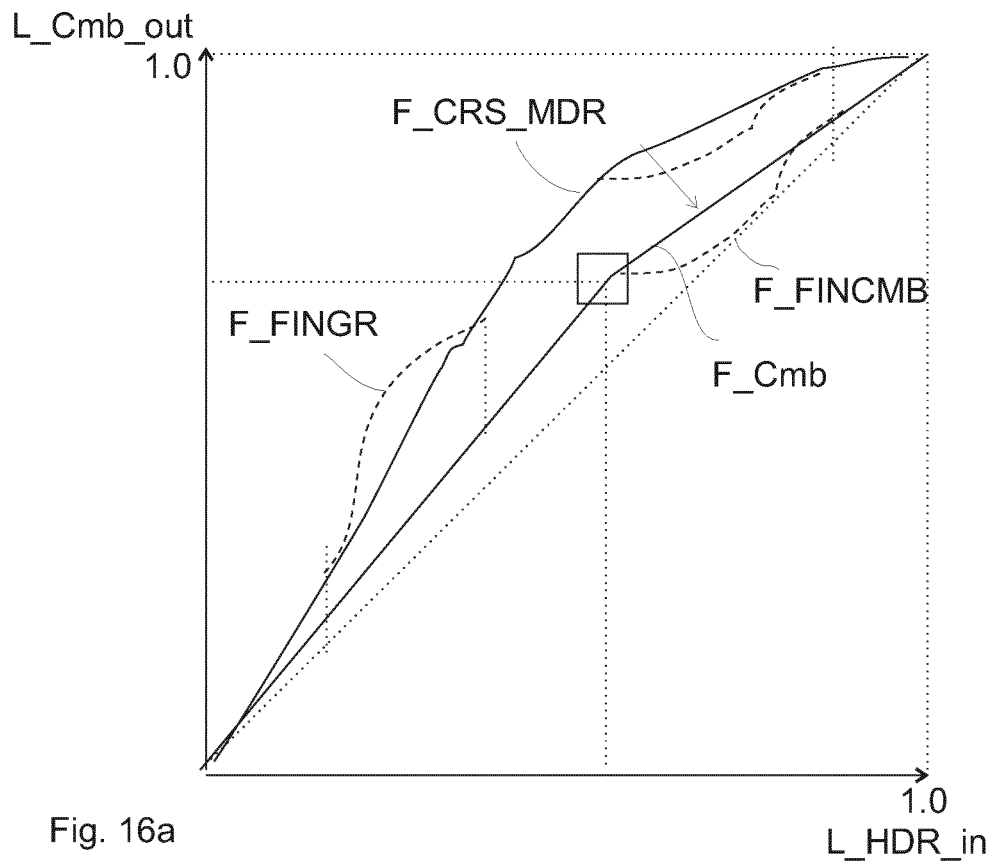
Fig. 16a
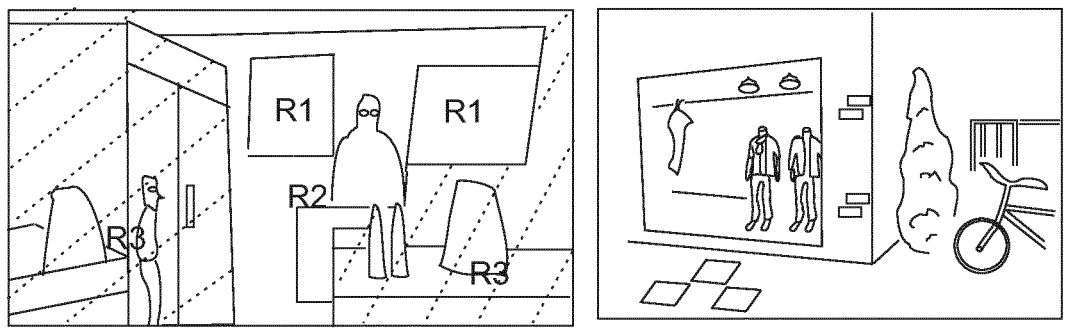
Fig. 16b
Fig. 16c
Fig. 16

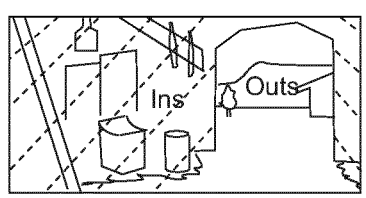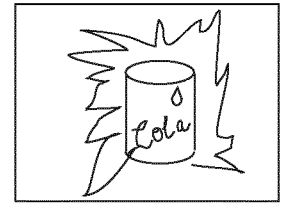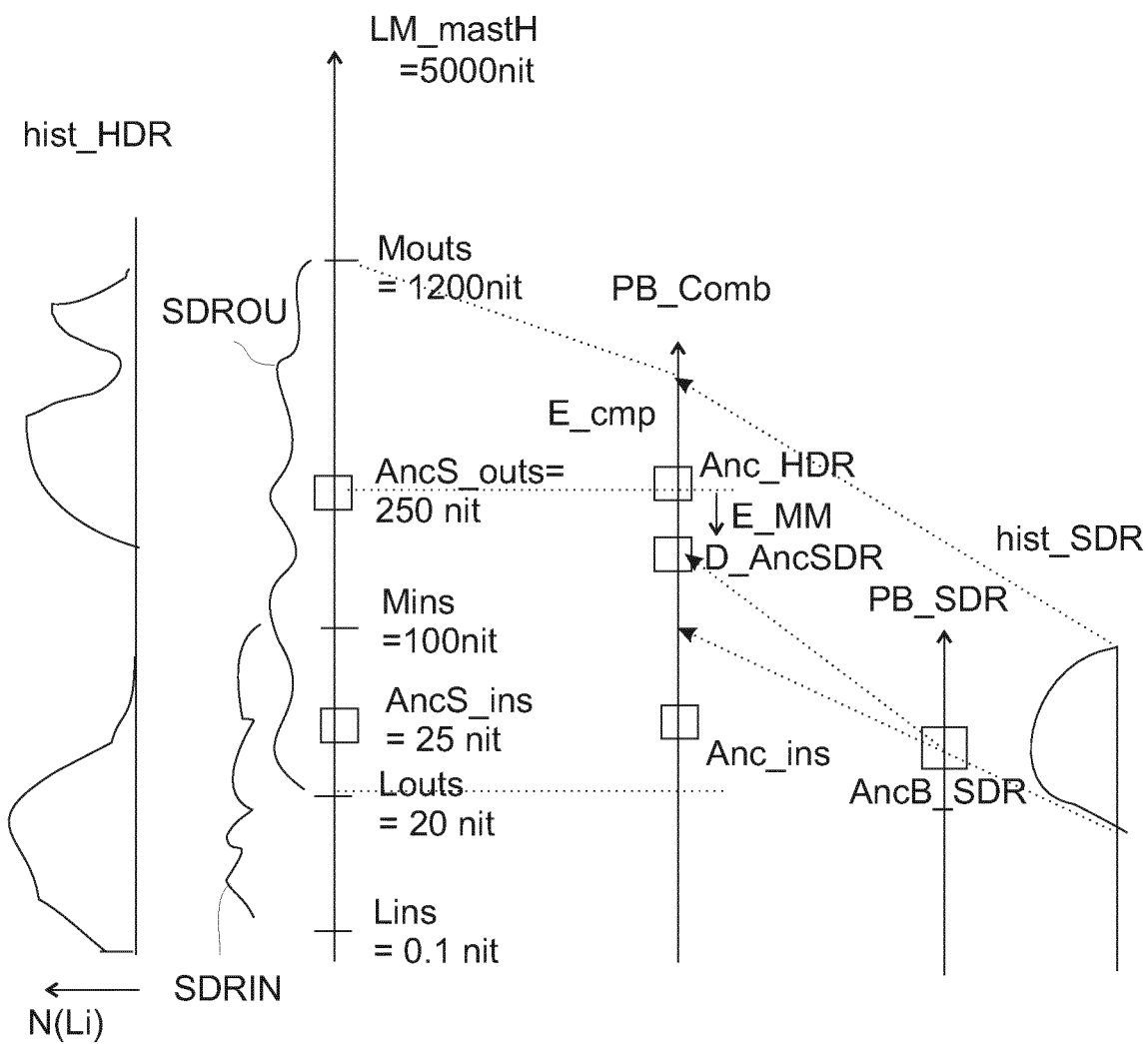
Fig. 17

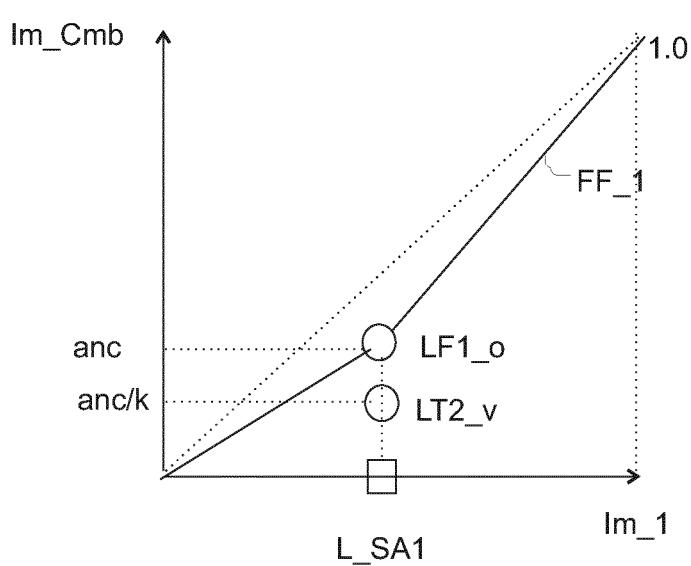
Fig. 18a
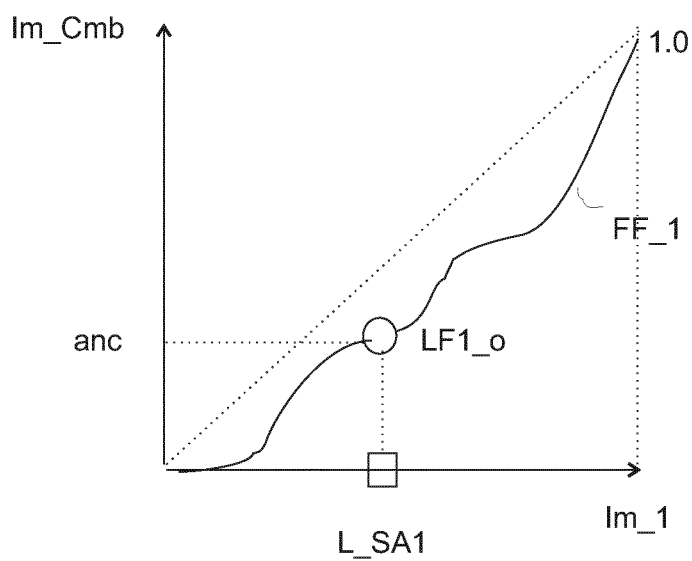
Fig. 18b
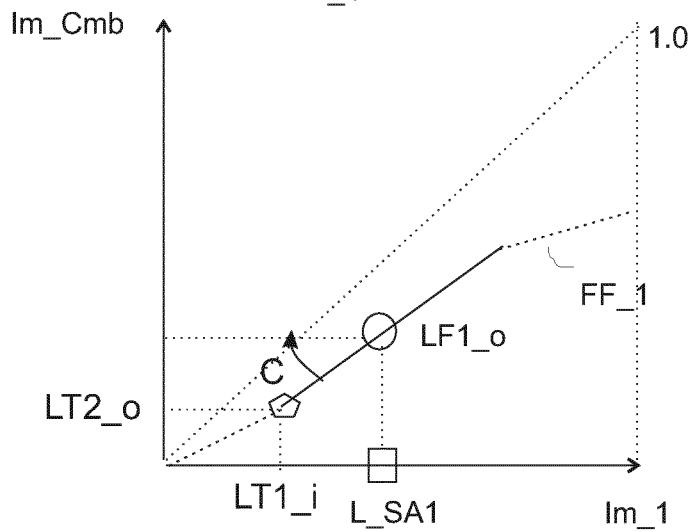
Fig. 18c
Fig. 18

HANDLING MULTIPLE HDR IMAGE SOURCES

CROSS-REFERENCE TO PRIOR APPLICATIONS

This application is the U.S. National Phase application under 35 U.S.C. § 371 of International Application No. PCT/EP2016/077373 filed on 11 Nov. 2016, which claims the benefit of U.S. Provisional Application 62/383,692, filed on 6 Sep. 2016 and European Patent Application No. 15196054.9, filed on 24 Nov. 2015. These applications are hereby incorporated by reference herein.

FIELD OF THE INVENTION

The invention relates to methods and apparatuses for correctly handling combinations of multiple images from different sources and with different luminance characteristics (or videos of temporally successive images) of which at least some have a high dynamic range.

BACKGROUND OF THE INVENTION

Until a couple of years ago, all video was encoded according to the so-called low dynamic range (LDR) philosophy, also recently called standard dynamic range (SDR). That meant, whatever the captured scene was, that the maximum of the code (e.g. 8 bit luma Y'=255; or 100% voltage for analog display driving) should by standardized definition correspond to a rendering of the color white on an LDR display with a display peak brightness PB_D (i.e. the brightest white color which the display can render) being by standard agreement 100 nit. If people bought an actual display which was a little darker or brighter, it was assumed that the viewer's visual system would adapt so that the image would still look appropriate, rather than e.g. annoyingly too bright (in case one has e.g. a night scene in a horror movie). This is the relative rendering paradigm, which always maps the maximum luminance color in the encoded image to the display peak brightness, whatever that may be. This would work if the actual available display at the rendering or video/image consumption side is in actuality not much brighter than 100 nit, but may yield undesirable results if the display is much brighter, e.g. 10× brighter, i.e. having a PB_D=1000 nit.

Of course, this being a nicely strict defined television system colorimetry for everybody to coordinatedly work with, for practical program making this typically meant maintaining a tight control of the scene lighting setup, since even in perfectly uniform lighting the reflection of various objects can already give a contrast ratio of 100:1, and then there is still the difference in illumination of various regions. One typically would light and expose (by choosing an iris setting), so that the white colors in the (well-lit part of) the scene mapped approximately to code white, i.e. the maximum luma code corresponding to a coding peak brightness PB_C, and there typically could be clipping to that PB_C luminance value for even brighter objects or regions in the scene. Typically also cameras, especially the earlier generations of digital cameras of the early 2000s, had problems capturing simultaneously both very bright and rather dark regions, i.e. e.g. a part of a scene as seen outside a room window or car window would typically be clipped to white (giving red, green and blue additive color components R=G=B=max., corresponding to their square root luma code values R'=G'=B'=255).

However, recently both high dynamic range cameras (and importantly new HDR image capturing or in general image creation manners) and HDR displays started appearing, and the rest of the video and/or image technology, e.g. image coding, image composition, etc., has to stay coordinated with these new technical level requirements. Note that if in this application a dynamic range is specified firstmost with a peak brightness (i.e. the brightest rendered luminance) only, we assume that the bottom end of the range is pragmatically zero (whereas in practice it may depend on viewing conditions such as display front plate or cinema screen light reflection, e.g. 0.1 nit), and that those further details are irrelevant for the particular explanation. In case nothing specific is done technically for the darkest image colors, one could say that there is no particular reason why a higher dynamic range display, which then would simplify to a higher display peak brightness firstmost, should render the darkest pixel colors differently from a lower dynamic range display such as in particular a SDR display. Note also that there are several ways to define a dynamic range, and that the most natural one typically used in the below explanations is a display-rendered luminance dynamic range, i.e. the luminance of the brightest color versus the darkest one (of course, in practice also psychovisual aspects can be involved, e.g. a single bright pixel in a dark scene may not be so impressive, but for some technical explanations below this may be discarded, and just the design of technical elements which conform to what is needed for humans is elucidated). One can define a HDR image as any image which can contain pixel colors, and as said in particular brighter pixel colors, which cannot be encoded in an SDR image encoding. As the colorimetry of such SDR image or video codings was fixed (with the video Rec. 709 OETF corresponding to the sRGB OETF of still photos), it could be mathematically ascertained that 8 bit luma encoding could accommodate a dynamic range of only 1000:1, i.e. from 0.1 nit to 100 nit, and nothing beyond. So if one wants to be able to encode scene luminances which are to be display-rendered e.g. 2× brighter than the normal SDR scene white, i.e. up to 200 nit, one would need a new form of HDR image or video coding (the new SMPTE 2084 is an example of an OETF allowing to encode much brighter scene luminances, or at least how they are to be rendered on a display under normal television viewing conditions, e.g. up to 10,000 nit as lumas, even as 10 or 8 bit lumas, which could then further be handled as "normal" lumas, e.g. for video compression like HEVC compression). The human visual system can process much higher dynamic ranges, and they also exist in various practical HDR scenes in the world (e.g. a sunlit scene seen from inside a cave, or a dark room with a small window), so there is a need for higher dynamic range video handling chains, for increased "liveliness" of the images. Typically indoors illumination may be one hundredth of outdoors illumination, so knowing that black objects reflect about 1% of the incoming light, this would already imply needing a 10,000:1 dynamic range (DR). But, if humans are sensible to one percent of the blackest colors in a night scene in dark viewing, a 1,000,000:1 DR of the encoded image content may be in order (which some cameras are able to achieve, and e.g. logarithmically measure). Of course if e.g. a large cave is seen from the inside, in principle in some situations one could artistically opt for actually rendering that surrounding cave shape as clipped minimum black, but in other scenarios one would really desire or need all the coded different grey values from the brightest to the darkest region of pixels in the image, e.g. when some action occurs in the cave (and some partial outside views in some cave shapes can look pretty strange when clipping to black, because of the inversion of psychological detection of foreground and background they look like torn paper snippets, so one could avoid that by rendering more cave interior dark colors). So a display rendered range from 0.01 to 10,000 nit may in practice be a nice HDR range, but as said, coding or rendering even a couple of factors 2× above 100 nit PB would already qualify as HDR technology, with the corresponding need to watch carefully how it should be handled differently from the legacy SDR video philosophy. Note also that a code system itself does not natively have a dynamic range, unless one associates a reference display with it, which states that e.g. R'=G'=B'=Y'=255 should correspond with a PB of 100 nit, or 1000 nit, etc. A common mistake from previous times is to think that the dynamic range of an encoded image is tightly linked to the amount of bits used. Although that would be true for linear encodings, like e.g. the ADC of a camera needing more bits to span the larger range of photo-electron variation of the pixel well, and though it may be a good thing to have at least somewhat more coding precision i.e. bits for higher dynamic ranges, the amount of needed bits also depends on the chosen shape of the luma code allocation functions which is also called opto-electrical transfer function (OETF). So a 10 bit Y'CbCr encoded image could both be some HDR image, with colors being encodeable up to some PB_C value, as well as an SDR image with high precision. Which type of image it is, i.e. how the lumas should be rendered on a display with sufficiently high PB_D to be able to display all the encoded lumas as corresponding luminances, will typically be determined by reading the metadata, such as e.g. the co-encoded PB_C value in nits of the received image. The PB_C is in fact also interpretable as the PB_D of an ideal reference display for which the image has been color graded, i.e. on which display it would look optimal, instead of too dark or too bright.

So a coding of an image which is capable of encoding images with to be rendered luminances of e.g. up to 1000 nit is a good starting point for having good quality HDR, and the reader may keep such a setting in mind when needing to summarize a part of a below teaching, unless other specifics are mentioned.

So in practice there are scenes which can have very high dynamic range (e.g. an indoors capturing with objects as dark as 1 nit, whilst simultaneously seeing through the window outside sunlit objects with luminances above 10,000 nit), and since displays are becoming better (a couple of times brighter PB than 100 nit, with 1000 nit currently appearing, and several thousands of nits PB being envisaged), a goal is to be able to render these images beautifully, though, and that's important: not exactly identical to the original, but at least very natural, or at least pleasing. So HDR is not merely about a brightest and darkest color, but also about all the luminances in between, i.e., in fact it's about psychovisual appearances to humans ultimately. Of course technically, for some HDR handling technologies, like mere encoding, on could formulate the needed appearance in terms of technical luminances to be rendered on a display, because that is what needs to happen by driving the display correctly, for a human to see the correctly appearing colors at all. But applicant wants to emphasize (for the reader to understand the whole below story, and what it means) that when one desires to design a versatile HDR technical system, one needs to abolish the inveterate paradigm of the direct-1-to-1-connection view of mere coding. In Rec. 709, a broadcaster could see on his standard (sole existing) SDR monitor what luminances he was capturing, by watching how they were rendered on his monitor, and would be rendered on all TVs at home, which would be the same everywhere, because there was only the single flavor of 100 nit PB_D SDR display. The only thing he then still needed to do, was to convert those to be rendered (camera-measured) luminances into luma codes (because such codes would make better use of the available transmission technology technical particulars), by approximately applying a square root function, and then at the receiver side the inverse (EOTF) function would then guarantee, that a viewer watching the decoded content substantially on the same TV in the same viewing environment as on the creation side, would experience the program as desired. That is still the view of HDR10. A differently shaped EOTF is used than in Rec. 709, but still the reference display-rendered colors that were visualizable at the creation side are still rendered with identical luminances at the receiving side, by merely applying a fixed mathematical equation to the received lumas. But the real HDR world is very variable, with different viewers having different displays with different PB_D, a different amount of lamps on in their viewing rooms, etc. And that was exactly what HDR10 encoded HDR movies were criticized for: because HDR movies contain many pixels which are relatively dark, those will become difficult to view under bright surround illumination (though the important action often takes place in the relatively darker parts of the video). And HDR10 offers no solution for that, hoping that the display makers will solve it. However applicant thinks that it is in general a complicated matter, which depends on the type of HDR scene image, and should have a mechanism for enabling the content creator to have a say on the ultimate (variable, i.e. not 1-to-1 directly connected inverted fixed mathematics between some luminance and luma representation of the desired colors) display-rendering of the HDR image colors.

The reader should also understand that because a viewer is typically watching the content in a different situation (sitting in a weakly lit living room at night, or in a dark home or cinema theatre, instead of actually standing in a bright African landscape), there is no identity between the luminances in the scene and those finally rendered on the TV (or other display). Actually, no TV whatsoever can nor ever will exactly render at least some objects like e.g. the 1 billion nit sun, nor does the viewer want to be blinded by it (when watching a small screen, the angles or the thereby determined glare are not the same as in a 4*pi solid angle surround environment, so one should also take care of that). Applicant solved this translation of the appropriate luminances to be display-rendered from the relative RGB values captured by a camera by defining a master HDR color grading, to start from when coding and communicating. This HDR graded set of images can be created as desired by an artist (it should be plainly obvious to the reader that although we may mention artist, what the technical aspects of this invention should be, allowing the artist to do the communication and control of his requirements), if he has a reference monitor available, e.g. he can sit in a typical viewing environment and grade perfectly his HDR image(s) for a 5000 nit PB display. But that is only half of the story, namely being able to (at all, in a new video set of requirements) consistently determine an artistically pleasing look image for a HDR scene (and being able to faithfully render that image if one views it on exactly the same 5000 nit PB_D display under the same viewing situation constraints). What should happen if a consumer getting 5000 nit HDR images only has a 1000 nit display will be explained below (display tuning) That is an entirely different matter still, far from something which can be handled with a direct-1-to-1-communication approach, and one can start pondering what that one single reference system with one reference display PB_D should then be.

If this application talks about "high dynamic range" images, it is meant one therein has image content suitable for display on at least a 1000 nit PB_D display (of course the content can also be shown on a 100 nit or 500 nit display, but then not as perfect as it could be, e.g. lamps will be dimmer than ideally). So in this image there will be content which makes it visually interesting when shown on a higher PB_D display, i.e. there are some image objects which are far brighter than the average (or conversely compared to the brightest color which one may normalize as Y=1; at least some objects which are much darker, than typical for SDR images). E.g. an indoors scene may have brightnesses which go up to 500 nit or even more in the original scene, and depending on whether one has a well-lit greenhouse or a narrow tunnel region of a couple of nits or below, and outside brightnesses may in the real world be several thousands of nits. On a display one may then render the indoors below 100 nit, and use whatever the display has available above that optimally for the outdoors objects, e.g. up to 500 nit if one has a "dull day" movie or program, and up to 1500 nit if it is sunny outside, in case one has a display which can render up to 1500 nit or more (PB_D>=1500 nit). So, even just in the rendering, there may be a ratio between the brighter and the darker image regions of (1500/2)/(100/2) or at least 500/100 (this being typically definable as regions which are differently lit, i.e. midpoints of regions which still have a up to 100:1 and typically 30:1 intra-region contrast due to object reflection). If one associates this with luma codes by means of a continuous function those lumas will also be spread apart, but less useful for specifying the content (they will depend on the OETF shape, and possibly on technical requirements). When this application mentions lower (than the HDR images) or low dynamic range images, we talk about images (perhaps a differently graded look of exactly the same original camera-captured scene image, i.e. the HDR image of the same scene) which have (or in fact are associated with a reference display of PB) a peak brightness which is at least a stop (a multiplicative factor 2) lower, or typically at least 2-3 stops (4× or 8×, or more). An SDR image would conform to the standard-prescribed PB_C of 100 nit. The contrast ratio of all objects in those is typically not much more than 100:1 or up to 1000:1 maximally, i.e. one sees a much more uniform luminance or luma histogram typically.

A second thing one needs if one knows the image pixel luminance dynamic range (which should be ultimately rendered) for which one needs to define luma codes, is how to actually distribute the codes, i.e. which code allocation function to associate a corresponding luma code Y' (not only 1023 in a 10 bit coding which may typically map to the PB_D of the associated reference display, but e.g. which luminance the luma code 743 should correspond with) with an object or pixel luminance Y, or vice versa.

In the past 2-5 years a couple of companies have proposed different ways to encode HDR videos (i.e. moving images or in other words sets of temporally successive images). There has been somewhat of a rush towards first products, to be expected in 2016, so despite of the complexity of HDR image coding and handling, some corners may have been cut. This has led to different coding techniques, which were even based on different basic philosophies. That not being finally decided would mean that all image handling systems would need to be able to take care of the differences, and that could become quite complex (certainly compared to the simplicity of the sole colorimetry of the SDR video era, 5 years ago).

Dolby Laboratories Inc. started out with a two-layer system (i.e. a base image and a correction image is needed to make one HDR image, in line with scalability concepts in video compression), which is somewhat more expensive to put in cheap chips, but has also designed single layer coding and contributed a basic EOTF, the so-called perceptual quantizer PQ, recently standardized as SMPTE ST. 2084. The technology is nicely explained in: https://www.smpte.org/sites/default/files/2014-05-06-EOTF-Miller-1-2-handout.pdf.

The idea behind it was that the classical square root (or more exactly Rec. 709) Opto-electronic conversion or transfer function OETF (the inverse of the square power EOTF), which was conventionally used for camera-converting scene luminances to luma codes, is not suitable for the high contrast ratios between different regions which possibly occur in HDR images, no matter how many bits one uses (or at least for pragmatic numbers like 14 bits or less, for the high dynamic ranges that can occur in real life, like the master gradings for 20 stops or more scenes). But it proved to be a good inspiration. Although originally designed because of an accidental physical behavior of CRT electron guns, the square root function followed closely how human vision converts scene luminances to visual lightness codes, so it was a nice way to best use the codes (with a next code corresponding to a next psychovisual lightness impression, so not too many codes are wasted on what cannot be easily perceived anyway, nor, which is worse, there are no regions where there are far too few codes to accurately encode smooth and precise luminance gradients). One can now generalize this curve which gives for each successive luminance interval (e.g. one stop brighter) approximately an equal amount of luma codes up till a maximum codeable brightness, which Dolby typically takes to be 10,000 nit (which should indeed suffice for pragmatic display rendering because some people already complain that is too bright, although by experiment one can also find one can make impressive images even with large regions and even flashing regions above 20,000 nits, and everything of course depends on how one allocates the luminances of various image objects along the possible range, and one need not always fill that up to PB for each kind of image all the time; and those that complain about painfully bright images that might be dangerous should realize that the full moon at night is also 5000 nit, and nobody has gone blind from staring at the moon).

So Dolby standardized a reference EOTF, and one can use its inverse being the OETF (or approximately the inverse in case one wants further behaviors) to define lumas for all the objects/pixels in the image, and then one can put those codes (typically color coded classically as YCbCr, but RGB coding could also be used) e.g. on a Blu-ray disk, after applying regular HEVC encoding techniques. One then has a master HDR grading on the BD, which can be rendered, in the way as the artist desired, by e.g. a 5000 nit TV which can decode it. So one has a mechanism to end-to-end, 1-to-1 provide for showing HDR images (only) of some scene on a consumer display, at the consumer's premises. Of course when it says below e.g. via a BD, it will be understood by the skilled reader that all other image or video communication mechanisms like e.g. satellite broadcast, internet video delivery etc. are also meant, as the presented concepts have large applicability. This 2084 EOTF has also been elected as the luma-to-luminance mapping function for HDR10 coding.

The British broadcaster BBC has designed a different way of HDR video encoding. They came with a standardized OETF (because they started from the camera-view rather than the display-side standardizing an EOTF of a reference display), which has a somewhat different shape. Their view and technology is nicely described in: http://downloads.bbc.co.uk/rd/pubs/whp/whp-pdf-files/WHP283.pdf They define an OETF which closely follows the classical square root Rec. 709 OETF function shape up to a middle grey (Y'=0.5) of the classical 100 nit Rec. 709 OETF, and for higher luminances it becomes logarithmic, to be able to squeeze more bright colors above the scene white object color into the available codes. It was inspired by what cameras did already for a long time when they needed to make a good LDR output image for a scene which was just somewhat too much HDR-ish. I.e., instead of approximately 200:1 pixel luminance contrast ratio, one had e.g. some regions which were too bright, and one tried to squeeze in brightnesses which are 4× brighter than the white of the scene which should map to Y'=255 hence rendered luminance Y=100 nit. Although the white objects of the scene then become rendered greyish, it can at times be psychovisually acceptable because the brain also sees and interprets the brighter pixel regions in the total image. One can always map such bright scene luminances to display PB by just lowering the camera exposure (e.g. by changing the iris), but then the face of say the news reader may become too dark. So what cameras did was follow the curve up to e.g. Y'=80% or some other knee point, and from thereon use a curve which has a small slope, so it can represent quite a number of higher scene luminances in the remaining 20% of codes. Or some camera-specific log curve could be used, which lowered the darker pixel luminances somewhat (so perhaps darkens the faces a little, which should not necessarily be a problem in a high contrast scene, because the viewer understands that the person is standing in a relatively dark (possibly shadow) region, and the brightness could be appropriately adjusted, on a brighter display, anyway), but freeing some more codes for the really bright pixel colors which then typically become a little more coarsely represented, e.g. soft-clipped. In this way there is a balance between colors that need to be ultimately rendered sufficiently bright, and a still reasonable visual quality for brighter colors. But the problem was that each camera did this logarithmic mapping of captured relative scene luminances to (of course in essence absolute) luma codes in a different manner, which was still reasonable when cameras were still only extra-good LDR cameras, but more problematic for a camera which is really a good HDR camera, which is supposed to captured complex HDR scenes of maybe 20 stops. So the BBC wanted to define a fixed curve for all practical purposes. Still, by applying that fixed OETF curve as a luminance mapping curve to the master HDR graded image as input, one would get some reasonable SDR version of it, and if one broadcasts this image, then legacy displays can directly render the SDR image, and HDR displays can apply the fixed inverse curve to reconstruct the master HDR image. And an advantage of the BBC method is that little has to be changed in the technology, as everything works almost like it used to be (but that could be overly deceptive and come with a price to pay, during production or at least some video combinations).

They may have various different starting points, e.g. Dolby may have focused more on the professional movie market, whereas the BBC may have focused more on practical television requirements, like field productions of shows, deployed television equipment, etc. But a major difference which is interesting for this patent application, is that the BBC considered that pixel luminances (or in fact colors) should be represented relatively, whereas Dolby considered they should be represented absolutely. That is a major difference in philosophy, because it determines whether you stand on the scene-referred side or the display-referred side of the gap that must be crossed to come to the optimal rendering. It is a major difference on what luminances will be encoded in two images which need to be combined, but it goes even further, it may influence how such an alternative philosophy would dictate that the combination may need to happen, from essential approach and properties point of view.

So the BBC approached the problem by defining a basic OETF, which defined relative master graded (or at least camera-captured, with also some look decisions like choosing an exposure, and maybe a gamma curve) HDR luminances and lumas, and the appropriate to be rendered display luminances should be calculated by applying some system gamma, which would depend both on the display PB_D and the viewing environment brightness. That would mean if a display maker gets BBC encoded content, which may contain luminances up to 12× the scene white color level, but maybe not depending on actual scene content and camera iris setting, he could do either of two things. He could use the BBC relatively philosophy, and always map the code PB_C to the display PB_D, whatever the display PB_D is (and then maybe apply some gamma brightening and contrast modification function, depending on which PB_D one actually has, but at least white would be rendered to white, which has at least one advantage which is that if there happen to be no such overly bright regions, but only relatively darker pixel colors like in a misty scene, it is in an easy calibrated manner established that such darker coded colors will also be rendered darker than PB_D, but on the other hand, the brightest parts of the scene will be rendered with a variable PB_D luminance; which would seem to be a good property for combining image data, but is it?). Or, he could pretend that this encoded image luminance data is good around or for exactly some absolute luminance PB_D value, say e.g. 1000 nit, and then do its own internal downgrading in case the TV has e.g. only 500 nit PB_D (by blind gamut mapping). Dolby however considered that one should specify in absolute terms which luminances should be rendered, at least if you have a high quality 5000 nit Sim2 or pulsar display, and how this image was generated artistically does not matter, as long as you can define the needed object luminances along the master EOTF 0-10000 nit luminance reference range. So e.g. if one has a dark face in a horror movie, in the absolute method one would typically say that this image should be rendered at e.g. 15 nit, which can be rendered on both low and high dynamic range displays. However, in a relative method, the brightness of this face would scale, even if one would not go so far that 15% of 100 nit would also mean 15% of 5000 nit, since a display PB-dependent gamma function would correct somewhat for that, but still, it would not be so precisely determined at which luminance the face would be finally rendered on a display. That makes one think about what the artist would have liked, if at the rendering side so much change can happen, so there is something to be said for more precise absolute rendering (if one uses the full dynamic range of a display, of course the viewer's sensitivity would adapt corresponding to that, but one would typically use a sub-range of a HDR display if the content would require rendering up to only e.g. 900 nit, at least for e.g. 99% of the image pixels). Still, also the absolute luminance coding has no full answer, because if the PB_D of the actually present is lower than the PB_C of the coding, i.e. the needed to be rendered luminances to make the image optimal, there is still some downgrading strategy needed, which better not be all too blind and against the appearance re-grading needs of the particular HDR scene or scene type. The reader can imagine that such different philosophies lead not only to different code determining EOTFs, but probably also to a different handling of images, i.e. how the object pixel luminances will be allocated to various regions along that curve or its corresponding reference luminance range. And if that already leads to difficult discussions when one has the relatively more simple problem of mapping some input image with a particular PB_C to some display of lower PB_D, which one could still imagine to be somewhat designable at will (e.g. if one uses what we shall call an r-curve, because of its shape with boosts the brights somewhat, and then for the brighter luminances starts getting an increasingly smaller slope, effectively compressing those in smaller sub-ranges of the SDR luminance range, i.e. like the first quarter of a circle or ellipse), as one could stretch e.g. the boosting part for the darker colors of the HDR-to-SDR luminance mapping curve to boost the darkest colors little more, which would increase the brightness of some typical object on that part of the input luminance range or the curve, say somebody's coat, then the reader can imagine that things can become more complex when one desires to harmonize the brightnesses of objects in different images, of different dynamic range, usually differently lit, and potentially differently encoded.

Applicant like Dolby also thinks that it is best to define a master EOTF, which we defined to be 0-5000 nit. One reason is that an image captured from a bright African scene is basically different in absolute terms from that of a Norwegian autumn, so, although one can always apply all kinds of mathematical color (affecting at least luminance) transformations to ultimately yield the appropriate brightness look, why not already encode this difference in the luma values and their corresponding absolute luminances on the reference luminance range? (Advantageously one could even design those lumas to correlate already with psychovisual brightnesses, then one could more easily encode the artistic desiderata in appropriate additional curve shapes when grading from the master starting HDR image corresponding images of different dynamic range, which neither HDR10 nor BBC have.) But most importantly, in the end there only is the ultimate rendering of the pixel colors (even if that may happen on displays of different PB), and without at least an associated reference display (defined not just by a peak brightness, but also its grey-scale behavior as an EOTF), the image is just a set of numbers (which hopefully can be correctly decoded), not much more. It is about the ultimate experiencing of the HDR image, and not so much about how it happened to be designed up to that point, and that is also what graders see on their reference display(s). One must be able at the creation side to make an unequivocally defined starting image. So we must start by standardizing a reference EOTF which fixes this (otherwise e.g. the digital luma numbers in the computer which is used for color grading are undefined), and then one can build further systems on top of that (even if one desires to build back some relativity into the system, at least that can then be controlled relativity, determined based on some commonly agreeable reference luminance measuring system).

Now having summarized here above some novel needed basic background HDR insights, we can move to a more practical situation, of having available different images for which the creators decided for some reason they had to be encoded by one or the other method.

The difference in behavior of the Dolby EOTF versus BBC EOTF (the present patent applicant designed an EOTF which is very similar to the Dolby PQ, or can use the Dolby PQ) can be seen in FIG. 1. OETF 113 is the PQ EOTF (we have shown only the part up to 1000 nit, because if we show the graph up to 10,000 nit the other two curves become unclearly small). BBC OETF 112 is a relative curve, so one can debate about which absolute luminances it should encode, but we assumed it will typically go up to 500 nit (or maybe 1000 nit, but then it can start to show errors and become less appropriate). Rec. 709 curve can only encode absolute luminances up to 100 nit, and we should remember that for various reasons into a far future there may still be much SDR content coming in (which e.g. was not easily converted to some HDR version). On the y-axis we have shown relative lumas, because we want to avoid the bit depth discussion, which is not so relevant for this application (we will assume all codings will use 10 bit for the three color channels, so the maximal luma 1023 becomes 1023/1023=1.0). It should be obvious that if we get an input luma of 0.5 (i.e. 512, or 128 in 8 bit) that can mean anything as corresponding luminance, depending on the used coding method (somewhere around 0.7 we could be 10× different, so simply doing a pixel luma replacing switch could suddenly yield a very dark or very bright replaced pixel). In FIG. 1B we show how the curves differ if we also define them on a relative 0-1.0 input luminance. It should be clear that if one starts with lumas of an encoded image, the to be rendered luminances can be calculated from the inverse curves.

Now, ignoring all practical issues like color errors after various encoding qualities, chip redesign costs, etc., one can say that all three coding mechanisms work nicely if one only needs to communicate a single HDR set of image(s), which is what was focused on in the first phase of the research, and development, and standardization.

But practical HDR handling systems need more, otherwise the users are left with loose ends and questions, which one cannot do as a system designer.

Applicant has designed a coding system, which cannot only handle the communication (encoding) and use (appropriate rendering ultimately) of a single standardized HDR video, for a typical single kind of display in the field (everybody needing to have a 5000 nit PB display, or maybe everybody who doesn't still have a 100 nit legacy TV being able to buy only a 1000 nit PB TV), but which system can handle various possible display types with various PB_D in the field, by being able to calculate an optimally (re)graded image for each particular display, which technology applicant calls tunability or display tuning. It's main characteristics, and particularly the decoder 251, are summarized with FIG. 2 (as far as needed for this application).

Applicant had the approach that any final look optimization depending on the viewing environment could be done at the display side, though not with a final gamma as the BBC proposes, but by a mechanism which is (though calculated by a receiver, e.g. inside a TV or BD player) not solely determined by the TV (i.e. its designer), and not solely on the basis of receiver side factors like actual display peak brightness and viewing surround brightness, but also dependent on the image content itself, since images are complex, and so is their optimization to the rendering side peculiarities. This crosses the old and difficult gap between content creation and content use. The receiving side may be the only side which actually knows which display capability is actually available, yet the creation side is the only side which still definitely knows what the content is about, such as artistic desiderata. If one cannot sell the movie director or DOP instead every TV to optimize the color look at the receiving side, one can at least let the creator specify the intents parametrically, at least roughly, with the image creator being able to mathematically specify: "if I had a display of this PB_D, I would at least prefer to render the various pixel luminances like this and this".

Applicant's engineers argued that the image content-dependent part could be handled by allowing an artist color grader (although one could just as well use automatic image analyzing functions, i.e. determine luminance mapping functions based on established luminance properties of the current images) to specify the according to him optimal color transformations which would at least change the object pixel luminances for (merely) two looks corresponding to different dynamic range or in fact PB_C, at two extremes of the range of possibilities (of display peak brightnesses). So the HDR look image should correspond to a rather high PB_C which applicant chose to be 5000 nit (although applicant can use another PB_C just as well), and the low DR image may as well be a 100 nit SDR grading, as that would satisfy the e.g. 90% initially existing market of people using legacy SDR displays. So for a particular scene, the color grader can say: "if I have only 100 nit PB, I must put the lamps in the image which I'd rather see rendered at 4000 nit to have nicely brightly appearing lamp objects in the rendered image, but that's impossible now, at 95-100 nit, when firstmost desiring that there is enough luminance-room on the display luminance range to render the objects of lower luminance in the room sufficiently bright, i.e. between e.g. 10 and 90 nit, so maybe now I put all the lamp pixels at exactly 100 nit". The same can be done for e.g. making a night scene appropriately dark, and the street lights sufficiently bright, for both a 5000 nit and 100 nit display rendering. The reader should stop for a moment to ponder that it is not that trivial to make a night grading which looks appropriately nightly, i.e. of the correct luminance for the objects (e.g. a black person sitting in a shadow badly lit area), and then both in HDR and SDR (especially with further constraints like e.g. IC complexity), but it can be done, at least if not perfectionistic then reasonably (of course if the display approximately follows the specifications, and doesn't make an entirely different image by itself).

Having obtained these two graded images (M_HDR, and M_LDR, the luminance distribution look of which being typically determined by a human), one for the situation in which one has a high quality HDR display for rendering the images, and one for legacy 100 nit SDR displays, applicant wanted to avoid encoding and communicating two full sets of images, i.e. a need for dual coding, which would need two channels etc. And applicant also wanted the two different DR graded images to be encodable with existing MPEG-type DCT-based codings, so we decided one of the two sequences of video images to be defined parametrically with color transformation functions (F_L), to be used for calculating the images from the set of images which are actually communicated (e.g., though not necessarily, the SDR sequence of images). So we can communicate over some video communication system 250 (the skilled reader understands our system can be employed over many systems, e.g. an airways broadcast to a receiver being a computer either from a professional video supplying service, or between consumer apparatuses connected in an in-home network, or a professional securitized cable-based communication system, with the receiver being a professional apparatus in a cinema theatre, or an internet-based system, etc.) e.g. the master HDR images M_HDR, as say HEVC encoded video signal S encoded by video encoder 203. The encoder also adds all parameters defining the color transformation functions F_L as metadata, e.g. SEI messages or similar. Or vice versa, we can transmit the master LDR grading M_LDR, together with functions allowing to re-calculate at the receiving side higher dynamic range images, like e.g. M_HDR.

So at the creation (or transcoding) side there will e.g. be some color grading apparatus 201, containing a color transformation unit 202, arranged to determine and apply various color transformation functions F_L as desired, to obtain a master LDR look image M_LDR from the previously created master HDR image M_HDR, say 5000 nit PB_C typically (which may be made on the same color grading apparatus at the same time, or be determined otherwise, previously). As an example of image processing the reader can consult WO2014/056679, which application teachings are hereby incorporated in their totality for countries that allow so. As an example of a transformation one can image a function not affecting chromaticities but only pixel luminances (all discussions herebelow will for simplicity of understanding be focused on luminance transformations) which bends the higher luminances somewhat downwards and boosts the darker colors in a relative 0-1.0 HDR input (x-axis) to LDR output plot of the function, so that they will look sufficiently bright on the relatively darker 100 nit display (an r-shaped curve). But more complex functions which customizably and potentially only locally fine-tune some object luminances, and also transforming chromaticity aspects like saturation, are also possible, as long as one can make two related optimal looks: an LDR image and a HDR image.

Now the next thing one can do with this encoding technology, is that if one does not actually need to re-calculate a 5000 nit M_HDR image(s), because one needs M_MDR medium dynamic range images which have a correctly graded look for an actually connected display 280 of peak brightness PB_D=1500 nit e.g., one can with our display tuning algorithms obtain the correctly graded M_MDR images, from the received say M_HDR (or M_LDR in other embodiments/applications) images. The receiving side has a classical e.g. HEVC decoder 260, which outputs a normal (say e.g. linear RGB, or YCbCr) image M_HDR, and the required color transformation functions (F_L or its inverse-shaped mirror function) for changing M_HDR into M_LDR. On the basis of all this information, our color tuning unit 271 in a color processing unit 270 (which we assume for this exemplary elucidating embodiment is separate from a TV, e.g. inside a Settopbox, or a server of a video on demand provider, etc., but it can also reside inside a TV) can not only determine the needed optimal functions F*_L to determine the required M_MDR image(s) from the received image(s), but also ultimately output those medium dynamic range image(s) M_MDR. The display tuning algorithms for obtaining a suitable F*_L function for SDR-to-MDR luminance transformation on the basis of the F_L SDR-to-HDR luminance transformation function or functions can be quite complex depending on which embodiment variant is desired, e.g. for taking viewing environment particulars into account, but for understanding the present applications all those details are beyond what is necessary, so the reader can just take note of that there will be some luminance function F*_L to apply to obtain from whatever incoming encoded image and MDR image, e.g. say a gamma function.

Although this mechanism now allows to have an optimal HDR image rendering not just for a single possible kind of HDR display (e.g. everybody needing to buy a 1000 nit PB_D display, and nobody being able to buy a 3000 nit PB_D display and still get a nicely looking image, at least not if one cares about colorimetric precision), but for any possible display, this additional technical expertise is still is not enough for a fully flexible HDR handling ecosystem. Up to now, the summarized technology still only focuses on getting a single HDR set of video images, from a single captured HDR scene, correctly out to the various consumption sites, and a manner to appropriately render it on a single available television. That was already a daunting task to get ready for the new HDR video technology, so further aspects were delayed to be dealt with later.

But nowadays video programming is more complex. One may want to get feeds from all kinds of different sites, and it has become easy to make video content (even for consumers), with simple portable devices (even a life news feed from a helicopter, or some sporter filming his actions with a GoPro strapped to his helmet), and easily communicate it via several communication means like e.g. the internet. And indeed, at least theoretically because the large deployment by consumers may still need to take off, televisions are becoming more like computers, with internet connections, and able to use or co-supply various data sources, presented as visual information. E.g., we expect various uses of video, e.g. one may be watching a news program in the back, and at the same time playing some video game on some display-rendered area, whether that's an area of the same display or on an adjacent display.

That problem did start in the LDR area, but it was majorly less difficult, because all video was defined in the same Rec. 709 colorimetry, and more or less similarly lit and exposed. And even the computer graphics of e.g. a game were defined similarly. But nowadays HDR video or images can be anything, because that is what one would like to cater for, so if one doesn't come up with a good framework strategy for handling and in particular combining multiple image (partial) contributions, one could expect chaos in the future. As said, in the past, all video was defined in the same LDR framework, i.e. all maximum luma codes corresponded to the same 100 nit rendered luminances, and the luminances corresponding to lumas below maximum, could be decoded by means of the single existing Rec. 709 EOTF.

Still there was some concern (especially in complex productions, or outside broadcasting and other field production), and a need for careful handling, because cameras could have some "minor" setting tweaks. The important ones were typically the white balance (i.e. the chromatic aspect of the neutral, white colors, i.e. whether the white objects looked too blueish or too yellowish, which could become conspicuous when switching between different camera feeds) and the exposure setting. If one lowered the exposure of a capturing of the same scene of one of the cameras, that camera would quickly be spotted as giving too dark an image. Especially for professional multi-camera productions of the same show that was conspicuous, as in a news program cutting to a live reporting one could expect a different capturing (especially if it is amateur mobile phone video), or at least, that was a capturing (whether temporally interleaved or Picture-in-picture) of a totally differently looking scene (e.g. a night scene of Cairo, instead of a well-lit studio in the USA). Now there are two situations one should discriminate. Of course if one switches between a night scene and a midday scene of a desert, the viewer would expect some difference in average scene brightness, or of the object luminances in the scene, although it should still be a reasonable difference, with e.g. the desert scene not startling the viewer, or making him squint his eyes. But on the other hand, one can make any scene look nightly or brightly, by playing on the combination of camera exposure and ultimate brightness of the rendering display. In the SDR era that sometimes led to strange images, if a camera man had to make an inconvenient exposure choice. E.g. somebody standing far from the window in a deep room would be much darker than the objects near the window. The cameraman then wanted to expose for the person in the darker area, to make him look nicely colorful, which could result in that the left side of the image, and all the room objects over there, were totally clipped to white, making the viewer having to watch an ugly "half image". But at least the colorimetry was reasonably defined. One knew that the colors would come out like this, and that would be just the same irrespective of whether such images were mixed or rendered solely. In the HDR era one wanted to solve such issues by making all regions codeable instead of clipped to white, e.g. by lowering the exposure depending on how much brighter exactly the bright parts of the room happen to be corresponding to the luminance of the actor or presenter in a particular scene. But that would nastily come back as a problem, in case one wants to harmoniously mix video content, hence a need for the below embodiments technology.

Furthermore, the more complex more recent cameras got additional settings, like e.g. a black gamma. It may not be easy to perfectly match two different cameras (if they're of the same brand, one could at least e.g. switch off or set similar all "exotic" parameters), but at least it was the task of the camera shader, which is an engineer with a special eye for color differences (or technical director) to remotely camera control all those colorimetric settings. That frees the actual camera operator to focus on framing, which is already a difficult task enough, especially for some productions with actors jumping around the scene etc. In any case, in the SDR framework, even if one did things wrong a little, the fact that the content creator made sure that at least his main topic was reasonably lit (i.e. at least 10% of white, or approximately 1 stop below middle grey as a luma or visual lightness impression), combined with the limited range 100:1 which roughly corresponds to various diffusive reflectances, any incorrect combination with some object luminance incorrectly positioned compared to other object luminances would typically not be too disharmonious (at least, the critical viewers may perceive something is wrong, e.g. maybe the blacks become a little more milky grey, but nothing would look really powerfully bright, or flash with large brightness differences, as a thing that could happen in HDR production).

But now in the emerging HDR era, there is not such a single 0-100 nit LDR reference range, nor are the cameras (and other systems) relatively simply acting in that range (i.e. typically doing non-extreme color transformations). As one can see in FIG. 1, even if in the future we elect to use only one of the possible HDR codecs, which is not obvious, there is still going to be some content defined by the LDR codec. And a difference between 5000 nit and 100 nit is so extreme that one cannot call it a "minor" look change (sometimes only noticed by professionals really), but a very noticeable and potentially even extremely irritating variation (and we may expect that if various devices like television would in the future like to act according to their designer's preferences along that vast luminance range of that vast color space, that variability can become even more extreme, and not as desired).

The problem may not be so conspicuous yet if one is watching a single program from a single source. E.g. if somebody is viewing HDR content of a high PB_D display in a dark environment, the colors may be somewhat too bright, but at least his eyes can adapt. Differences always become very clear if one has some reference to judge an image by, e.g. in a picture-in-picture (PIP) presentation of two videos.

Since images can nowadays come from everywhere, not necessarily all under the control of a director deciding about the look of the images nor shown by themselves in a controlled framework, but only coming together potentially sometimes for the first time at the display side (e.g. a dedicated commercial being inserted), one urgently needs a good framework to coordinate the combination of various original HDR images.

So as said, most of the (novel) HDR technology just focuses on being able to communicate the HDR image information at all, by communicating clearly defined pixel lumas, which can then be converted into to be rendered luminances. If one has a display with lower PB_D than the PB_C of the content, one would need to do something, as one cannot render luminance up to PB_C on that display. One could do a linear compression (mapping white to white relatively, i.e. render the pixels in the image with coded luminance PB_C actually on the display with luminance PB_D), but then in all likelihood the rendered image will look suboptimal (e.g. some of the darker parts of the image may look too dark, maybe even with the action happening being invisible). So one could try to do a more smart luminance mapping, which keeps the darker luminances reasonably visible, e.g. with an r-shaped curve. General gamut mapping techniques would be possible, e.g. inside a TV, but these would be blind, i.e. non-adapted to the particulars of the HDR images, and therefor severely suboptimal.

US20150245004 teaches that two images can be mixed, of which at least one may be a HDR image, and the other may be a SDR image. The application describes that there can be both a mismatch in color space (i.e. the width of the RGB triangle, because other additive primaries are used in a DCI P3 color definition than in an sRGB usual video definition, but that chromatic aspect is irrelevant for the present application explanation, since it can be chosen in addition to what is of primary essence here, namely the luminances of the image pixels, and the corresponding dynamic range of the image encoding), and a mismatch in dynamic range. That application is not very detailed about how the video mixing should or could happen however. [0029] mentions that the mixing can happen in the color space of the display device, i.e. the dynamic range which in the naming of this application ends at PB_D. Furthermore the processing seems to relate to converting to a different transfer function TF, or gamma correction [0027]. Lastly, there is a very generic teaching [0036] on that the composition unit may evaluate the dynamic range of the video content, and presumably that corresponds with the not further detailed teaching that statistical analysis of the input images may be done [0028]. The skilled person would interpret this in the light of existing knowledge. There has indeed be a teaching in SDR video optimization, which looks at the statistical properties of the input video, namely the endpoints of the luminance histogram, and optimizes that histogram in particular for the available display range. E.g., due to various reasons it is not uncommon that the black or darkest pixels in a captured image are brighter than they could (or maybe should) be, e.g. a luma of 30 instead of 0 (ignoring again for a moment complex details about overflow protection ranges, display light leakage, lighting-dependent visibility issues, etc.). One could then stretch the histogram to have the lowest image luma being 0 instead of 30, which results in prettier images because of increased contrast of the image structures, and better blacks, which may be especially nice for dark surround viewing.

Actually, when one needs to prima facie design a video mixer, without having further invented specifics taught, the skilled person could have the following two options to consider as explained with FIG. 13 (apart from mixing luma codes, which as elucidated with FIG. 1 is, although nice and simple for pure SDR image mixing, not so evident or smart when having differently defined images). If a teaching says it needs to convert because of different transfer functions, the skilled person would think of a naturally designed mixing system as in FIG. 13a. In this mixing one has a range of natural luminances (1301), e.g. up to 50,000 nit to be large enough, and in fact, whatever the OETF shapes of the code definitions are, converts them to luminances. Both images then containing (physically uniquely defined) luminances, one could then of course in principle mix those, but the question is whether that would be sufficient, given practical psychovisual and artistic considerations. Secondly, if we map to a common pre-established display dynamic range (1302), with a PB_D of e.g. 700 nit [whereby for simplicity we now skip the step of the OETF and reason purely about the corresponding luminances], then another natural mapping (the relative mapping paradigm e.g.) one could consider is to adjust (based on the "statistical properties of the images") the images towards the capability of the display (i.e. the dynamic range of the image towards the dynamic range of the display). The natural manner to do that is to stretch the ranges (i.e. corresponding to a white-to-white mapping), e.g. linearly. One could also apply some gamma-shaped mapping function, but the question is then what that gamma coefficient should be, and why. But this creates results which are already exactly what in several cases we would precisely like to avoid. If one stretches e.g. an SDR image of a landscape with snow to 700 nit, it may become annoyingly bright.

Furthermore, although these natural mapping system are already not perfect only from considerations about their endpoints, like where the brightest color should map, such techniques fully ignore which as said is probably the most important aspect of HDR, namely the (precisely controlled) distribution of all object luminances between the endpoints of the dynamic range (and at present that still seems to be a missing understanding of many if not most experts, who seem to insist that HDR is merely about the white luminance value divided by the black any technology can reach, although often an image which is correctly rendered on a lower dynamic range display can look better than a badly controlled image on a higher DR display, e.g. contrast- and HDR effect-wise). One can easily understand that dynamic range is not just about technical endpoints, by focusing on the example of having snow on a HDR master grading of PB_C=5000 nit. The grader would e.g. map the brightest part of the snow in the sun to 800 nit, whereas another grader may put it at only 550 nit, so essentially this looks like a lower dynamic range situation, since most of the capability of the codec is not used for this image. In the SDR grading, it can be assumed that normally the grader will put the brightest pixel of the snow at 100 nit. For MDR graded images, one can then ponder at what luminance the brightest pixel should fall, even when only rendering one image instead of a possibly very complicated mix of various image content. So how does one know at what ultimate (mix) luminance a snow pixel should ultimately be rendered, whether it comes from a SDR image, where it is relatively coded at the maximum 1.0, or from "some" HDR image encoding, wherein, even ignoring the OETF shape because that may not be the most important determining factor, the snow pixel is at some prima facie somewhat arbitrarily appearing relative luminance of say 0.126.

FIG. 14 clarifies another important point which is overlooked with methods that merely focus on the dynamic range of any technical system, whether some coding corresponding to a theoretical reference display, or an actual display, etc., as something with primarily an extent defined by endpoint, like e.g. how blind luminance transformations for gamut mapping would work. Especially in HDR, the illumination of objects need not be tightly controlled as e.g. in an SDR news studio, but can in principle be anything. If one walks in the sun past an empty spot in the woods, e.g. an area of grass, one can visually perceive that the inside of the woods may already look black. That is of course not at all because that would is black, because the trees there are just a brown as anywhere else, and the undergrowth just as freshly green, but it is because the local illumination is e.g. $\frac{1}{20}^{th}$, or even less, than the local illumination is the free spot without trees, which gets the full light of the sun and sky. And $\frac{1}{20}^{th}$ starts to humans to look like psychovisual black, until one takes a closer look.

An object like a T-shirt, may hence have different luminances, even in the same movie (in other words, it could fall all over the place on the e.g. 1000 nit PB_C_HDR range; note that a grader could decide to constrain the variation somewhat in his master grading, but we explain with a natural almost 1-to-1 relationship with the camera-captured relative luminances of the original scene). In the sun, the T-shirt will be +−5× brighter than in a starting half-shadow, where the T-shirt is mostly lit by, a considerable solid angle of, the blue sky. Indeed 100 nit would also artistically be what one might expect for a "dull day" rendering on a good HDR display, whereas the 500 nit might pop as appearing really sunlit. The further the person walks into the woods, the more area of the sky which could light him is blocked by tree leafs, so the luminance of the particular object, in this case the person's T-shirt, would be e.g. 100 nit, ergo 50× darker than the bright T-shirt, ergo most likely also looking somewhat blackish on a rendering of this particular HDR scene. Perhaps in a cinematic HDR grading for home viewing the luminances may be graded more conservatively, e.g. half the given values, but the distribution of the various luminances may still prove the same point. So a question would now be, if one would with any of the above relatively static manners of mixing intersperse these various T-shirt renderings in a running video (with its own luminance particulars), would that always be "automatically" reasonably good, and if not, what should then be done?

SUMMARY OF THE INVENTION

The above issue of needing a method to reasonably coordinate the combination of images with (potentially very) different dynamic range can be solved by having an apparatus (301) for combining two images or two videos of images (Im_HDR, Im_LDR), one of them being a high dynamic range image or video, the apparatus (301) for combining two images or two videos of images (Im_HDR, Im_LDR), one of them being a high dynamic range image or video, the apparatus comprising:

a dynamic range establishing unit (302) arranged to establish a combination luminance dynamic range (CombRng), being characterized by at least a maximum luminance (LMC) which is determined based on at least one of: a maximum luminance of at least one of the two images or the two videos of images, and a peak brightness of a display for rendering the two images or the two videos of images, the dynamic range establishing unit further comprising a luminance anchor determining unit (303), arranged to determine an anchor luminance (anc) in the combination luminance dynamic range (CombRng), a color transformation unit (310), arranged to perform at least a luminance transformation on at least one of the two images or videos, wherein the color transformation unit (310) comprises a source anchor luminance reading unit (311) arranged to read at least one source anchor luminance (L_SA1) from a first source (350) which delivers a first image or video (Im1_LDR) of the two images or videos, and wherein the color transformation unit is arranged to establish a color transformation (FF_1) to be applied to the first image or video, which color transformation is dependent on the value of the source anchor luminance (L_SA1) by having the property that the source anchor luminance (L_SA1) is mapped to an output luminance in a vicinity of the anchor luminance (anc); and an image combination unit (320) arranged to combine the two images or two videos of images to form at least one output image (Im_o). Firstly, to avoid doubt, by combination of images we mean various possible options to spatially, or in case of video possibly also temporally, bring the image content together. Combination must be understood in the broad Latin original sense as "bringing two together", and not in the more limited sense of e.g. mixing, which we reserve in this text for weighed addition of two sources per pixel. The skilled person understands that the various embodiments of this invention solve a need for good (luminance harmonious or coordinatedly matching) combination of video which occurs inter alia in various picture-in-picture combinations (and in general nowadays this includes spatially interleaving at least some pixels of the first image with some of the second image, e.g. in a temporally changing amount which corresponds to flipping the first image as if it was a page and showing pixels of the underlying image, but this invention will make sure that the pixel colors, and in particular their perceived brightnesses, will correctly correspond), mixing combinations such as a fade, or temporal interspersing such as e.g. a cut to a commercial at regular times during a movie, etc. Both when having a spatial region of an image replaced by some other (entire or part of a) second image, and when temporally showing images of another video sequence between or after images of a first video, one should not have too much brightness discordance (i.e. one of the images should not look excessively brighter than the other, e.g. as regards its main histogram lobe or key objects), especially when there is also flashing content etc. In any such scenario one can establish a combination luminance dynamic range (CombRng), which is the dynamic range of the (empty representation) combined image, to be filled with combined image data (e.g. one could take for temporal interspersion or succession the largest range of the two).

It should be clear to the skilled person what a high dynamic range image is, and why, namely an image which is not a legacy LDR image defined for a peak brightness of 100 nit, i.e. which cannot be combined in a classical LDR manner (there would prima facie seem to be some mismatch between the image object or pixel luminances defined in the two different image coding frameworks). It should be clear to the skilled reader that if the apparatus gets only 2 still images (or e.g. 5), that typically the output image (Im_o) will be one still image. In case two or more videos of successive images are combined, an output video, i.e. a succession of those images in some form will be generated, e.g. in case each video has an image for each time instant, the resultant video may be an alpha-blended mix video with exactly the same amount of images for corresponding time instants as the original two image sequences, or the resultant video may have images for different time instants, e.g. have a length of 100% of the first video, +50% of the second video, with its various images allocated in the mix to some of the time instants.

To keep the teachings of this patent readable and concise, we will pretend the embodiments just do transformations on luminances (the reader can when reading pretend the images to be gray scale images), as the teachings are firstmost about how to handle differences in luminance dynamic range, and the brightness impressions this would give to a viewer. However, of course the skilled reader understands that actually typically color transformations will be done, e.g., he can understand both how a luminance corresponds to a linear R,G,B color definition, and how one can create a pixel with a desired luminance by color transforming its color, e.g. on linear RGB as in WO2014/056679. In case for conciseness we say below something for video, the skilled person will understand it may apply to still images too. In some cases video may because of the real-time aspects desire simpler manners of handling, which is why elegant quick solutions for mixing are presented. Some of our better performing embodiments will work with human artist intervention, as humans can best judge what HDR images are about exactly, and what they need in various, mixed, presentations, but other embodiments will work with automatic annotation by image analysis algorithms.

The apparatus needs to be able to establish a best-suitable combination luminance dynamic range, which is a new dynamic range which is a part of the reason why a very complex combination problem becomes a more manageable one. As will be explained below, this need not simply be one of the dynamic ranges which already exist, i.e. where already invented and defined, namely neither the dynamic range of any of the source images necessarily, nor the dynamic range of the final display on which the content should be rendered (if even that is known during the combination, which is not for all embodiments true), the intended display (which may not be known in some embodiments, although some creation side apparatus may have a reasonable estimate of what a good reference display may be, which is a typical representative of typical to be expected display in the field, at consumer's premises). That combination luminance dynamic range should be so that the combined presentation has the best visual quality or impact on the viewer. That may of course depend on various aspects of the content to be defined. If the main content (which we will call the second image or video, because that makes the claim easier to read) is e.g. a movie, then the movie creator would e.g. not like his movie to be disturbed too much. E.g., it should not be so that after a bright commercial, the viewer cannot see well anymore what is happening in a dark scene of the movie. In such a scenario, as there will typically be one of the two videos which is distorted in its luminance properties to make it more harmonious with the other input video, and therefore the combined video, the movie is the most important (or leading) video, for which the luminances should be largely left undistorted (where possible). But also the commercial producer or sponsor would like to see his commercial come out in the final rendering as best as possible. The color transformation unit (310) and/or combination unit (320) may enforce a policy that the commercial cannot overshout the movie, but e.g. an LDR commercial should not be rendered needlessly dark either. E.g. a face may not look very pretty if compared to another related object in the movie it looks almost black. As we said above, forest can look black compared to very bright sunlit regions, if the human visual system adapts its interpretation of grey values on that bright area. Therefore, if there happen to be important (large) areas in the HDR movie or broadcast (or game, etc.) which are very bright, say 2000 nit, and especially when closely adjacent to the combined SDR pixels, then a SDR object of only approximately 20 nit might look blackish, ergo some brightening may be desired before combining. Also, visibility of e.g. facial features or other object details reduces with average luminance and contrast of the object. Although we experienced that even with single images some people can complain that in some situations the object brightness distribution (e.g. pixel luminance histogram of a HDR rendering) is not fully optimal, e.g. too bright in some scenario, visual adaptation and the human brain are usually relatively forgiving if a single image is rendered, as the brain can determine and adjust to what all objects in that single image should be. But if an object is now spatially composed in another image, the viewer is bound to notice differences as serious, even if some content is in a frame. Because the brain happens to judge some of the content of the images as a reference for the brightness distribution of the scene, and normally scenes are not so disconnected as a PIP, but rather have smooth illumination variation. As will be shown, it is not so easy prima facie to know which is a good brightness combination. At least, that cannot be done during the creation of the separate videos, since e.g. the creator of the movie does not know which local commercial will be inserted (e.g. by a cable operator), or even, which second image the viewer will select from some image source in e.g. a PIP while watching the movie (maybe streamed by his home computer, or content managing central home apparatus). Also note that the visual importance of some say relatively bright object is dependent inter alia on its size. Having the two images available, the apparatus can make smarter combination decisions. It may need to be that it lowers the maximum renderable luminance (LMC), e.g. to make the HDR content more like the first image, if say that is an SDR image. That may depend on looking at further properties of the pixel or object (where an object is a smartly grouped set of semantically related pixels) luminances. E.g. if the brightest objects are lamps, one can afford to lower the brightness of those lamps in the combination dynamic range (CombRng) for some time. That is than not the most spectacular HDR, but the HDR image can still be used to render nicely bright lamps, and especially for connected displays with a lower peak brightness (LM_MDR) than that of the combined image (LMC) the very brightest codeable lamps cannot be rendered exactly, i.e. with the codec luminance, anyway. So then one still has a high dynamic range movie, but then with a dynamic range which is more appropriate for the situation of a combination.

In fact one can think of two typical alternative scenarios. Generically one can state that the combination dynamic range, i.e. at least its upper luminance (LMC) is defined by the apparatus looking at the needs of on the one hand the input at least two images, and on the other hand, if something regarding that is already ascertainable, the dynamic range (at least peak brightness) of the envisaged display on which the image combination should be rendered (i.e. the HDR needs of suitably presented image content of a typical HDR display). So some embodiments will need to determine the CombRng on the basis of solely the two images, if nothing or not much sensible can be said yet regarding how these should be tuned for use (but in some embodiments there may already be tuning towards some expected typical use: e.g. if master HDR images of say PB_C=5000 nit are to be shown mostly on lower dynamic range displays, and then expected to be interspersed considerably with SDR image material, one may consider to already create—e.g. for the video compression for communication—the combined or combinable (at the receiving side, meaning some image information may still need to be luminance-transformed) images on a lower dynamic range than the PB_C=5000 nit, e.g. 1.5× the expected typical consumption-side display peak brightness of say 1000 nit, ergo, the combination dynamic range will then have a PB_C of e.g. 1500 nit). A first typical example will then have a HDR movie, i.e. with the larger dynamic range of the two input videos of successive images, and SDR content should be luminance transformed, or at least properly annotated by putting its one or more source anchor values in co-communicated metadata, so that it reasonably harmonizes (or can be made harmonizable at the site of ultimate presentation) with the HDR movie, being the leading content. However an alternative typical scenario may already pre-transform the HDR content to some lower dynamic range, which is more in-line with either envisaged typical display rendering, and/or SDR content insertion. If one has an actual display for rendering of say e.g. 750 nit PB_D, such a system may e.g. transform (or annotate with anchor luminances for determining the luminance transformations) the luminances of both videos (which may happen at totally different productions sites and times, which is the power of the consistent anchoring) to make them harmonious on a combination DR of say 1500 or 2000 nit PB_C, or maybe even 1000 nit PB_C. This combined or combinable content can then be easily be downgraded to the needed PB_D=750 nit defined display dynamic range.

Especially because applicant designed a framework in which the (various) ultimate (re-graded) different dynamic range look images can be communicated not actually as real encoded images (i.e. with the pixel colors finally and fixedly defined in the color components of the typically DCT-compressed images), but as functions for calculating the various possible pixel brightnesses of such a secondary image from any primary image, those functions can be re-defined, and hence more complex definitions can be communicated (e.g. specifications of how image luminances for at least some special image objects should be calculated under various situations, e.g. various combination dynamic ranges). Classical image or video encoding just codes and communicates "the" image to be used, i.e. with its pixel luminances as they should (!) be rendered, but applicant can transmit an entirely different image (i.e. with the needed spatial structure and texture of objects, but not the correct colorimetry, in particular not yet the correct image object or pixel luminances), and then a prescription of a method of how to ultimately create the correct luminances for the final image, which in this application will be a combined image, defined with all its pixels luminances on the combination luminance dynamic range CombRng.

Similarly there can be reasons to e.g. increase the minimum (LmiC) of the combination range compared to the minimum (LmiH) of one of the images being a dynamic range image (with dynamic range Im2_Rng), e.g. because with the combination of a relatively bright LDR image (e.g. if it has not been very precisely darkened) the global (or local to at least some dark parts of the HDR image) brightness of the combined output image is such that the darker parts, which come exclusively from the HDR image, cannot be seen very well. I.e. by color transforming them into a CombRng with brighter blacks, one can brighten them appropriately (that will then happen because of choosing the combination range, and one need not additionally do smart processing of the HDR image per se, i.e., it will brighten appropriately even by a simple color transformation to the CombRng).

So the reader can understand how at various points in the image handling chain, e.g. still some content creation site, where the ultimate content is being defined, by apparatuses typically under control of content suppliers, before entering the part of the image chain of image consumption, or some image consumption site (e.g. mixing of two types of content solely under the responsibility of the end user, e.g. by the end user using his remote control or computer control), a suitable combination dynamic range can be established, either by a human, potentially semi-automatically, or automatically. In general, such an apparatus will look both at the contents of the image (i.e. the HDR quality, i.e. what PB_C the various content has, but also the distribution of the various object or pixel luminances on that dynamic range ending at PB_C, and what kind of bright objects [e.g. HDR effects] there are, and whether they can easily be luminance-distorted without creating very objectionable modifications to the look), as well as the needs of the final use of these images, i.e. typically the display rendering (if e.g. the images are to be supplied to an installed base of SDR display consumers, then a lower CombRng may be in order). When done automatically, an algorithm will use heuristical models which mimic what human combiners (i.e. those that make the combined images, and/or the metadata for that, e.g. specifying the LMC value and at least one anchor point, which will be a source anchor point of at least one of the two images or videos to be combined ultimately) will use as methodology. On the dark side of the CombRng, it will be judged what darkest colors will still be relatively well visible, by modeling such visibility based on such aspects as e.g. glare from the brightest areas of the brighter image objects, expected display leak light, and environment light-dependent masking of the darker colors because of typical display face plate reflections, etc. The new element in this model compared to the sole display and expected typical (e.g. home cinema, with dimmed lights) viewing environment is the introduction of the secondary image content. But generally since this establishing of the CombRng typically comes first (before the determination of a suitable anchor), this estimation may be coarse (e.g. not precisely checking where the SDR content is introduced, and whether the brightest part of the SDR image, even potentially brightened, falls geometrically next to a dark part of the movie, hence potentially considerably masking, although some embodiments could take all that into account too when establishing the upper and lower luminance of the CombRng, e.g. in a direct or iterative determination, the latter checking iteratively what a good anchor luminance would be, and then correspondingly suitable CombRng limit luminances).

Since in various applications a rough combination may already be suitable (e.g. if the movie viewer wants to ultimately enjoy his movie, he should not interrupt or combine it with any additional images, but if he does, he should acknowledge that there will always be some distortion in the colorimetry of that leading video content, even if it is only psychovisually in the appreciation of the total image impression of the combined image, and not really a change of the luminances of the movie, as compared to how they were before the combination), it may already be suitable to quickly calculate some heuristic lower luminance LmiC, based on the typical content. E.g. if the histogram shows that most of the SDR content falls between 10 nit and 100 nit, with about half of the display area of the combined image being occupied by SDR pixels with luminance above 50 nit, the apparatus can establish that it needs no deeper blacks than e.g. 0.01 or even 0.1 nit for that combination (because the display-typical heuristic algorithm judges darker image structures will not be seen well under such conditions). Which makes this establishment of a combination range so interesting, is that (although the original content creator of the HDR movie may have made a movie with defined ultra-blacks up to 0.0001 nit, for the case where the movie is enjoyed in a dark room on e.g. an OLED display which can render very deep blacks), the combination apparatus (say a STB, or even the TV itself), can now decide to somewhat brighten the darkest colors of the HDR movie, by determining an appropriate luminance mapping conditioned between the HDR movie (or in general leading content) DR and the Combination dynamic range, and in particular the lower part of those dynamic ranges, prior to putting the HDR movie pixels in the combined image. On the bright side of the luminance range, the algorithms will typically involve determining how much clipping or contrast compression for an original HDR image is still suitable (which will be different e.g. for lamps which need not have rendered internal structure, versus sunlit clouds, where one would ideally have sufficient contrast in the final rendered image, and hence any image coding for that [so that ideally the determination of the final image is reasonably simple based on that encoded received image which in its encoded luminances already specifies mostly what the final rendered luminances of all pixels should ultimately be], ergo less compression for the brightest image colors, defining those bright areas with a larger subset of luma codes, whether already in the combined image, or the pre-combination defined HDR image before having actually transformed it into the combined image pixels). So depending on needs, e.g. an inserted (for the movie creator expectable, e.g. when he knows in a particular channel his movie—ergo this potentially re-graded definition of the movie—will be offered alongside commercials) commercial which shouldn't look annoyingly dark, it may be necessary to squeeze the clouds in a somewhat smaller region of bright luminances not too far above the brightest luminances of the SDR image, at least as that SDR image is transformed for combination. To be able to still tune this image need most appropriately (and generically, i.e. both at least some part of the SDR image, and some important part or object of the HDR image typically) and for various introduced e.g. SDR commercials, ideally the HDR image specifies a number of important luminances for those clouds, e.g. 3, between which the combination apparatus can change, typically dim, the various cloud areas (thereby also reducing the contrasts of e.g. a dark grey part of a thunder cloud). But this is where the anchor luminances will come at play as taught herebelow, with the present part of the teaching just explaining that the combination range should of course not end with an LMC value so low that it starts destroying the look of the leading image (e.g. if the movie is about thunderstorm clouds, which typically have nice different greys if some parts of the clouds are strongly illuminated, e.g. the sunlit rims of the clouds, and the bellies of the clouds are not lit by the sun but only the environmental light, so they can be much darker, then a core aspect of this movie will be lost if the CombRng is such that these clouds must be compressed in an upper sub-range of the CombRng with only e.g. 10 lumas, because even with strong functional luminance-stretching as an attempt at correction by a display, this can never give a good HDR rendering of those clouds, as they should deserve). But otherwise the combination apparatus can decide to do some quality reduction of the HDR image brightness and contrasts, to harmonize the (especially when from less demanding HDR scenes, like e.g. a football match with some content in the sun and some in the shadow) HDR image with typical or actual lower dynamic range images it will be combined with.

Of course, although a dynamic range (at least a maximum, and possibly also a precisely specified non-zero minimum) is a very important (starting) determining property for the ultimate look of an image, but this still does not fully finalize how the object or pixel brightnesses will be located within that range. Simple image handling methods will indeed pretend that all that is needed is an upper and lower limit of some dynamic range, and then to do some mapping (which often is not all that much smarter than mere linear compression, i.e. mapping input content white to final range white, and input content black to final range black). And that may even vary considerably too, especially when one starts using the full potential of large dynamic ranges, with very critical scenes, both as to luminances needed to be representable, e.g. simultaneously many deep blacks in a cave, and many sunlit colors seen through a small crack outside, and even object which need critical control of their intra-object contrast, such as a person dooming up through mist. But as said above, the inventor thinks that good control of HDR image looks, and especially the look of combined images, is also importantly about good control of all or at least many, or at least the most critically important ones, of the luminances between the limits of the CombRng, so something else is also needed to have good HDR image handling systems, in particular such apparatuses that can without further difficult human intervention create appropriately looking finally combined images, for any situation that may in practice occur (since one cannot sell the same Hollywood director in each STB or TV, to have him determine the appropriate final combined luminances for the viewer). A quick mechanism is needed, which still can be nicely tailored by the content creators, as critical or complex their needs may or may not be, to get a good reasonably high quality result in at least most practical cases of image content combination.

So the second component for controlling sufficiently the combination, is that the apparatus determines an anchor luminance (anc). That can be various things, but it is typically a semantically relevant luminance, of a semantically important object. E.g., it may be a particularly typical important object lit in a particular manner, giving luminances in a subrange of the total HDR image range. It will be a luminance which one can expect that it is good, in some combination range, to determine other luminances around it (i.e. this luminance determines whether the totality of luminances are of appropriate brightness, not too dark nor too bright). In other words, if one renders the luminance of the anchor correctly, whatever correct may be for a particular combination range, then the other luminances will also not be bad (and with FIG. 16 we will illustrate how one can with more technical components control them to be increasingly good, according to the creating artist's desire).

FIG. 15 shows a typical HDR scene, with two regions of considerably different illumination, namely a barn (Ins) with dim illumination (see the geometry of the scene in FIG. 15a), and a sunny outside region (Outs) with considerably brighter illumination. For a content grader to make a suitably looking HDR image for typical television viewing (dim environment) from the physical scene luminances, it may be sensible to grade the indoors luminances as in an SDR image, i.e. up to 100 nit for the brightest object indoors. Outdoors luminances in the real world would be approximately 100× brighter, up to 10,000 nit, but that would be experienced as being too bright for television rendering (even if the viewer would typically have such a high end 10,000 nit PB_D display). So the grader may e.g. choose to make this scene with the HDR brighter outside luminances (in the outside pixels luminance sub-range SDROU) of the master HDR range (DRH) up to 1200 nit for the brightest object (except for maybe some small specular reflections on metal), and with a typical average outside luminance of 250 nit.

The power of having an anchor luminance, is illustrated with FIG. 15c. In this example we have made it simple, and assumed that the darker luminances, of the inside pixel luminance sub-range SDRIN, can be rendered with equal luminances under all situations (the will form a stable, unchanged set of luminances on the combination range, which of course need not always be the case; e.g. if the SDR commercial contains many bright colors, the apparatus may use the lower anchor point AncS_ins characterizing the inside pixels of the HDR master source image material, to actually raise the darkest pixels somewhat, but we will elucidate the core principles of our embodiments with a scenario where only one anchor point will be used for correctly luminance-positioning the pixel luminances of at least this first, master HDR image, in the combination range (i.e. with the second anchor point AncS_outs of the set of outdoors, bright pixels). Firstly, although any luminance of an interesting object, e.g. with a typical light reflection spectrum leading to a typical grey value appearance may be used, it is usually not bad to use some averagely bright anchor position in a sub-lobe of the histogram of all image luminances corresponding to a region of reasonably similar illumination, when one desires to determine the luminances of pixels around such an anc value. The reader can imagine that below with FIG. 16, because if for any reason the apparatus desires to "re-light" such a region to e.g. more light, then the luminances around it can brighten continuously with the anchor point, just as real reflecting objects would become more luminous if the illumination falling onto them would increase. Note that for automatic determinations when calculating a representative anc value one should be careful to not e.g. have the very bright sunlit rim luminances of clouds deviate the result too much from a reasonable average, so typically if humans can determine and communicate an anchor luminance together with the encoded images, that would be able to yield the best results. So the reader should understand that there are two kinds of anc value, namely firstly of the result (i.e. a position in the combination range where luminances of images which correspond to the same semantic meaning of the anc definition, i.e. are close to such anc luminance value, but in the (differently lit and differently coded) source dynamic range, should ultimately fall when rendered, or written in the combined image), and second a (corresponding) ancS value for all or at least most of the input images (in case some images are missing an annotated anc, the apparatus must estimate some value, e.g. a SDR value which should not be too unreasonable for most typical SDR content). If such an anc value is defined (even one which is different semantically than the one of the combination, but which can be related to the one of the combination, by e.g. multiplying it by a factor 4), one can then harmonize the input content with the combination framework, and therefore with all other image content.

The reader can see how the anc value (i.e. the resultant anc value of the image combination, and the range which is being prepared before the actual mixing of the two images) coordinates with the determined combination luminance dynamic range, i.e. typically at least its peak brightness, e.g. for a superior HDR quality combination PB_CS=2000 nit. If the superior quality combination range (CmbRngSup) was chosen by the dynamic range establishing unit (302), we have available a high quality dynamic range which is close to the dynamic range of the master HDR content. So it makes sense to also position the resultant anc value of the semantic type: "position where on average bright, second-sub-lobe, outside colors should fall in the combined image") at 250 nit (where the apparatus follows the typical rules for bright region rendering in television movies, which also was the basis which led to the 250 nit selection (approximately) of the master grader for the master HDR image). This combination situation will lead to that most of the relevant HDR luminances, also of the outside pixels, will nicely render as intended by the content creator, i.e. with the same luminances as encoded in the master HDR input image, and only e.g. the specular reflections need to be dimmed somewhat to fall below 2000 nit. This is an example of the above first type of scenario: the combination range largely follows the original master HDR video content, which is leading and substantially rendered without luminance distortions, and then one only needs to harmonize the SDR content (which will be done by looking at the corresponding 1 or more anc values for the SDR image).

For an inferior quality combination range (ComRngInf), the apparatus can already take into account the needed quality reductions, also for the HDR master image. Here the apparatus may need to lower the position of the Anc_Outs value, which it may e.g. typically do with a heuristic estimating needs for inter- and intra-region contrasts (even without looking at a particular image and scene, already some global values for good positions of anchor luminances can be determined, which should consistently work for the upcoming various different HDR shots of the movie). The second resultant anc position Anc_Outs2, should, depending on what amount of range is left above 100 nit or in other words above the lower luminances of SDRIN (e.g. in stops, 10× being 3 stops to position all HDR effects, whatever they may be, i.e. reflecting objects in the bright sunny illumination, but also lamps or specular reflections, and typically also taking into account values that customers would like to see for good quality HDR images, i.e. no large object areas which are too bright, nor too dim) be placed at a luminance position in the CombRng so that the bright region or parts thereof is sufficiently contrasty above the 100 nit (to have a really sunny appearance, e.g. a factor 5-10 may be a good value, and this can be formulated as the division of the two anc values), yet still there is also sufficient room for even brighter HDR effects, such as small specular reflection areas on objects, flames, or explosions, or laser beams, and whatever the movie may actually contain to be graded and rendered near that upper limit of 1000 nit PB_C_Inf. Some embodiments of automatic methods, may work by calculating error estimates. E.g. textures in regions may be analyzed, with a complexity indicating a need for higher or lower intra-region contrast.

So if only the two images are known, e.g. the movie the movie maker is creating (annotating with at least one anc value, and maybe already luminance mapping to a typically suitable CombRng) and a typical average variant of expected SDR content, then the apparatus can calculate at least an error for the luminance distorting compression of the HDR image, and the distortion or disharmony of the SDR image, in its rebrightening before the combination, as illustrated with FIG. 17. Such distortion errors can be calculated both for typical average scenarios, e.g. having a probability of pixel luminances for one or more typical HDR scenes, evaluating how such a scene would need to be distorted (mostly in the brightest areas of the image), when a downgrading to a CombRng with PB_Co1, PB_Co2, etc. has to occur, and/or for actual images, i.e. taking into account the remaining pain if an actual (optimal) luminance mapping is applied to map all the object or region luminances from the native image representation and its dynamic range, to the recolored image in the combination range. In FIG. 17 we see schematically elucidated how an error E_cmp can be associated with the compression of at least one part or object of the image, e.g. the cloud structures. Various practical embodiments mimicking human grader behavior can e.g. extract a texture, and by calculating texture measures and other spatial and/or statistical measures of the local region estimate how problematic a downgrading to a smaller sub-range would be. E.g. for clouds, the texture analyzer would find that there are no sharp boundaries, and that the appreciation of the cloud would primarily happen by the (smooth) distribution of the (many) grey values, and not by typical geometrical shape aspects (e.g. the linear pattern of a Scottish kilt texture would allow more compression or posterization in less luma codes). I.e. if the many fine graded smoothly distributed grey values are mapped to a more limited set and of incorrect brightnesses, one would expect quickly that some error would occur, which would dissuade the apparatus from doing this to too large an extent, particularly if the leading image is of critical colorimetric importance, because e.g. the consumer should be able to enjoy the fine graded artistic color quality of the movie, which should not be reduced to the often extreme and flashy rough grading of e.g. some commercials (in addition to the main concept of providing anchor luminances, some embodiments will allow the content creator to indicate with further metadata how much distortion he would allow between or around anchors, e.g. that the range between AncS_outs/10 and AncS_outs*10 should preferably not be compressed or stretched by a factor of e.g. 2 or 3).

FIG. 17 shows a more concretely elucidating example of how errors can be formulated, for coming to a luminance harmonization in an embodiment based on such error equations. The HDR barn image, and an SDR commercial for a soft drink are to be mixed, and in addition to their ranges we show the histograms of the luminance distributions of the scene images (hist HDR respectively the histogram of the low dynamic range commercial image hist SDR, with in the horizontal direction the counts N(Li) of the number of pixels in the total number of image pixels which have a luminance equal to some value Li). The compression of the HDR image in the smaller upper sub-range of the CombRng up to PB_comb e.g. being 1000 nit leads to an error E_cmp. This error can be balanced with e.g. an error for brightening SDR content, or an error corresponding to the incompatibility of this CombRng with typical ranges of envisioned displays. E.g., if one considers that everybody in the world would have a 1000 nit PB_D display anyway, this error E-cmp can be normalized to zero, because that modification of the master content would need to happen anyway. But then still a CombRng of e.g. 1500 nit may be better, i.e. have a negative error, indicating it is of higher quality than a 1000 nit combination, if one weighs the visual quality of the movie content very highly. Apart from errors which one can calculate for deviating the brightnesses of the SDR content, which may be less important (because on the one hand in a SDR paradigm viewers are supposed to be able to quickly adapt to different brightnesses, but on the other hand the brightness of the potentially "incorrectly" rendered SDR image—e.g. judged by many expert or non-expert viewers as too bright when rendered on its own on a HDR monitor with the brightest pixel e.g. being 1000 nit, for this particular image—now being judged not by itself but in relation to the master HDR image), the following error can be evaluated. An SDR luminance mismatch error (E_MM) can be determined, and this can be done e.g. as simple as the difference between the Anc_HDR value of the CombRng, i.e. also where ideally the source image anc value of the HDR image (AncS_outs) maps to, and the actual mapped to luminance (D_AncSDR) of the SDR source anchor luminance AncB_SDR. I.e. the best harmonization would in this example according to the heuristics happen if D_AncSDR equals Anc_HDR. The reason why this works is because this type of HDR image contains a sufficiently large area of bright outside pixels (which is why its content creator defined an upper anchor luminance, AncS_outs). As the viewer when watching this HDR movie scene is already accustomed to the brighter luminances, introducing approximately equally bright pixels for the (e.g. PIP) SDR commercial is far less objectionable then when the user was only watching dark luminances, e.g. 5 minutes in a cave or basement (in which case an introduction of such a bright commercial would probably startle the viewer, or at least significantly spoil his enjoyment of the rest of the movie scene, at least colorimetrically). This system works especially well if the creator of the SDR content uses a particular type of its anchor, namely that can be so simple that he uses only two types: above-average brightness, and below-average brightness. Irrespective even of how the luminances actually happen to be distributed on the 0.1-100 nit range of SDR luminances, the creator can so indicate which kind of SDR image it is, and hence how it should be rendered, in particular according to this invention how it should be harmonized with various possible subranges of a HDR image. E.g., the SDR image by be normal content of a dull or dark scene ("below-average brightness"), or it may be lumas which are supposed to represent a sunny scene. We assume that the maker of the commercial wants it to be shown as a "sunny" scene, with colors to look bright and vivid, what exactly is bright and vivid in a combination of course also depending on what the other image's colors are.

The reader can now already understand the power of anchor luminance in coordination of images to be combined. Even in such a simple system, and assuming that the commercial content creator has an interest that his image should be rendered "sufficiently bright" (but he probably never has an interest to annoy the viewer with renderings of his part of the total image content which are too bright), but of course there also being a (more, equally, or maybe in some scenarios less) important image quality desideratum of the HDR movie creator too, the combination can already immediate work reasonably in case the HDR movie only has "darker" content in case the HDR content creator then only includes a lower AncS_ins. Then the apparatus understands that at least this scene in the movie doesn't have (too many, important) bright regions, and hence the viewer will be adapted to darker content, e.g. in this non-limiting simple elucidating example only on the SDR sub-range SDRIN. Therefore, the apparatus can make a harmonious combination if in that situation it maps the AncB_SDR (even though it is supposed to be "bright SDR content") to the lower Anc_ins, or in a vicinity thereof. With vicinity we mean a fixed in the apparatus or customizable typically multiplicative fraction of the anc value above or below the anc value, e.g. between ⅓ or ½ to resp. 2 or 3× anc. The extent of the vicinity can be determined (either at run time by the combining apparatus, or at a creation side, e.g. with explicitly communicated vicinity luminance boundaries) on the basis of in various embodiments of such aspects as e.g. allowed luminance errors of the objects when mapped, difference of type or expected variability of anchors, etc. But clearly, if AncB_SDR is e.g. 20% of 100 nit, if it is even mapped to 3× 25 nit (i.e. the upper limit position of the vicinity of Anc_ins), then the combination is much more harmonious (as perfectionism need usually not be achieved, but rather a pragmatically reasonably working system, balanced between accuracy of appearance, and complexity of realizing the system in practice) than with a linear stretch in which the SDR content is bluntly mapped white-to-white, i.e. 100 nit to 1000 nit, which would render the average AncB_SDR to 200 nit (!), which is likely having all SDR image object looking too bright to be pleasing (note that in principle an anc could be specified even below the actual histogram luminances, e.g. the mode i.e. most occurring luminance value of the histogram, but in any case the actual luminances will render similarly excessively bright).

Returning to FIG. 15b, we show there interestingly how anchors, and their positioning at different relative positions in any CombRng, will relate to the various luminance mappings (influence them). The function TL_CS is the luminance mapping for mapping the original master HDR image luminances to luminances in the CombRng (i.e. ready for doing image combination, whether pixel replacement, alpha blending, etc.). Applicant has found it very useful to do luminance transformations in a relative axis system, i.e. both the input luminances and the output luminances or lumas ending at 1.0 (in case lumas are used as vertical coordinate, the mapping is defined taking the OETF into account, e.g. some fixed definition OETF like SMPTE 2084, or Rec. 709 for backwards compatible image communications). For lumas that is very useful, because it circumvents the discussion into how many bits the vertical axis should be quantized (1.0 is just the highest luma code value, i.e. the brightest codeable color). For (e.g. the input) luminance axes, one could still ponder on whether this is or isn't a remnant of relative handling of luminances, but in any case the needed curves can be defined for any to any dynamic range needed image transformation (as this version can always be mathematically equated with its corresponding absolute luminance framework). We see that if we want to keep the absolute luminances of the darker pixels identical, in a relative axis system with lower peak brightness this corresponds to raising that part of the luminance mapping function TL_CS above the diagonal, and one can then clearly see how the remaining upper sub-range of the CombRng lead to some compression, which is not too excessive for the superior quality combination range. But for the inferior quality combination range, the compression of the brighter HDR objects must be more severe, as is also seen from the shape of the corresponding luminance mapping function to that inferior combination range, namely TL_CI. In any case, this situation of a peak brightness of a combination range, and a good anchor point, make it clear that generically, whatever the HDR shot will happen to be, one will need to do some compression of the brights, which will archetypically be approximately of this shape (the precise possibilities of embodiments being detailed below). One also sees by combining the two functions, that if one needed to transform relatively from the superior to the inferior CombRng, one would relatively need to brighten the darker pixels, but which visually firstmost correspond to a compression of the brighter HDR regions (the relative percentual sub-range being, in addition to the total available range, a good measure of the coding or rendering quality of a part of an image). In any case, it is how applicant defines his luminance transformations in his most typical actual embodiments, and in particular the very useful property we will elucidate with FIG. 16.

HDR video handling (in fact merely coding) methods like HDR10, which merely consider the fixed representation of HDR images, need not even communicate one fixed luminance transformation function (since they can put all the HDR object brightness distribution in the image luminances, which would need no communication of an OETF when lumas are transmitted, if that OETF is chosen to be fixed). Technologies which have a simplistic view on the HDR object luminance distribution, i.e. its re-gradability to other dynamic ranges, like the BBC's Hybrid-loggamma, can use a fixed function to communicate, e.g. as a LUT.

Applicant wanted both the content creator and the user (whether TV maker and/or end viewer) to be able to unleash the full quality of HDR (hierarchically), i.e. designed a system in which the content creator can indicate his desires about the HDR image content incrementally (from coarse to fine, depending on how critical he is, or how much time and budget he cares to spend), and the video consumption side can then also decide up to which precision it desires to follow these specifications, or whether the end system wants to impart some micro-flavor of color handling on the images, e.g. by deviating somewhat from the object contrasts as specified in the fine-grading function(s).

FIG. 16 shows an example of the power of anchors, when combined with one of applicants preferential systems of allowing e.g. typically a human grader to hierarchically specify his luminance re-grading needs, with a set of consecutive functions.

Consider the input and output ranges to be perceptually uniformly (approximately logarithmically) quantized. This would create a set of visually equi-distant levels of brightness, e.g. ultra-ultra-dark, ultra-dark, very-dark, dark, etc., up to extremely-bright. One can then imagine that a grader can define his look for an image, by approximately equating the object luminances with one of these levels, e.g. a good quality HDR image should have the lamp's luminance in the sub-range of extremely-bright luminances, e.g. between 90% and 100% of PB_C. Of course a lower dynamic range of the output, here the combination range of luminances (L_Cmb_out) may not stretch all the way up to a level appearing as extremely-bright-luminances, but then the grader would resort to mapping those lamp pixel luminances to the highest level which is available, e.g. very-bright. This would form a part of the luminance mapping function shape, and the reader can understand how a grader (or also an automatic system using image analysis heuristics) could come to some full luminance mapping function shape.

Now just defining two such axis would be a typical prima facie (though rather blunt) manner to map luminances defined in one dynamic range, to output luminances in a second, e.g. smaller output dynamic range (that would equate with a function being the diagonal in this graph). One would indeed form "half reasonable" output luminances, because this strategy would map the whites white of any source image to the brightest possible (codeable or renderable) color of the output dynamic range, and the black to black, which would because of the logarithmic definition also reasonably spread the grey values between black and white from the input to the output image.

But this gives rather unspectacular images with the wrong brightnesses and contrasts, let alone that it allows an artist to nicely tailor the artistic needs to the composition of any particular HDR scene (although the brightest and darkest pixel of our barn scene in say a PB_C=5000 nit coding may have the same value as in an image of e.g. a desk lamp in a darkish room with few objects in the back, of course the image composition and semantics of these two images will be very different, resulting in very different needs regarding grading and re-grading of the various object or pixel luminances).

So the applicant already for sole image use, i.e. either reconstruction to an approximation of the original say 5000 nit master HDR image, or an optimal display tuning therefore to obtain an optimal MDR image for driving e.g. a 750 nit PB_D display, invented a luminance mapping definition system which consists of being able to specify at least two consecutive functions. Firstly a coarse re-grading function F_CRS_MDR globally reallocates the brightnesses of all perceptual sub-ranges, to have a better initial look for the present HDR image and its particulars. We see some roughly r-shaped curve, for which the brightest half of the HDR scene pixel luminances are compressed in a somewhat small sub-range of output luminances, say e.g. the luminances of an SDR image for driving an SDR display, or say to match better with the combination teachings, a 1000 nit MDR image, when the master HDR image had a PB_C of 5000 nit. Depending on the needs of the scene, the grader may tailor that shape. E.g. if there are only some specular reflection spots of a couple of pixels, or light bulbs in that upper half of the luminances, the grader could in principle even define a function that clips to 1.0 for the upper half of the input luminances, as that would not significantly degrade the visual quality of that particular scene. But if the upper half contains the sunlit clouds, even lowering the local slope of the curve a little could lead to significant quality errors. The reader needs to keep in mind that we are talking about relative luminance axes, so if the output is e.g. an SDR range, there may not be that many luma codes and corresponding luminances available for faithfully rendering at the same time very dark luminances, middle luminances, and very bright luminances (consider e.g. a 3 differently illuminated regions image, with e.g. a dark kitchen in the areas in 3D closer to the viewer where a black person is hiding, a middle room which is normally lit, and again sunny objects seen through the windows, as shown schematically in FIG. 16b; and another typical 2-region example is shown in FIG. 16c, with a bright shop window in a street at night, i.e. a different semantics than the barn example, but with sub-ranges which could be treated similarly, or not if the content creator so decides).

FIG. 16c may be "simple" enough (HDR effects complexity-wise), to be able to sufficiently grade, and by adjusting the luminance mapping functions re-grade, with only a specified coarse grading function F_CRS_MDR.

But for a more complex 3-region scene (R1 indicating the bright daylight outdoors street with objects like houses being visible through the windows, the middle region R2 being normally lit or dimly, i.e. with typical SDR luminances, and R3 having the lights out, i.e. with dark luminances) it may be more difficult to reasonably map all luminance sub-ranges and the corresponding object brightnesses to the small sub-ranges of especially the lower dynamic ranges (like e.g. the SDR range). In such a case the grader may find it optimal to use an additional curve, namely a fine-grading curve F_FINGR, which is to be applied to the relative luminances resulting from the coarse grading, i.e. in effect equivalently deviating from that coarse curve shape as shown. But such a strategy can also be applied to "simpler" HDR scenes like the nighttime internally lit shop window of FIG. 16c. To make the shop window and its object sufficiently impressive contrasty and bright to make it appear really luminous (coordinatedly, but when rendering this sole image on its own, both on e.g. a 5000 nit HDR display, a 1000 nit HDR display, and still reasonably approximating and sufficiently nice as far as the limited capability of the display allows, on a 100 nit PB_D SDR display), and also to make the relatively dark (at least in the master HDR grading) nighttime street object pixels sufficiently bright and visible, the grader may create a F_CRS_MDR function which is e.g. relatively flat on the upper end. This may provide a reasonable look overall for both the shop window and the dark street, i.e. a reasonable overall image look already. But the shop window may contain specific objects which don't come out well regarding either one aspect being their luminance, contrast, or color, e.g. a flame in the shop window, or maybe some strongly lit part of the white neck or shirt of the mannequin, etc. Therefore the grader may define a correction curve (i.e. the fine grading curve F_FINGR), which in some part of the luminance range, e.g. corresponding to the luminances of that shirt, e.g. lowers the brightnesses, e.g. to get more intra-object contrast, or colorfulness or whatever the function realizes as an effect (there may even be various spatially localized luminance mappings involved to avoid the changing of other objects with similar luminances in other regions of the scene, but elaborating that further complexity of our system is beyond the needs for understanding the present application).

So interestingly the coarse function quickly puts all object luminances already approximately correct, with an easy grader action (e.g. in one of our embodiments he just needs to turn two dials determining the slopes of the upper part of the brights starting at 1.0, and the lower part of the function starting at 0.0, and our coder then automatically determines a smooth coarse grading curve, which can then be used by the various HDR image combination apparatuses of the present invention and application). But then the "real grading" can start, by fine-tuning the luminances of various pixels of image objects, and consequently the corresponding intra- and inter-object contrasts, by allowing the grader to determine whatever fine-grading curve shape he desires.

A normal decoder, or display tuner, would just use these two curves as they are. Going in the encoding direction (in case we use a backwards-compatible system which communicates the HDR image information actually as legacy display-renderable SDR images), first applying the coarse and then the fine-grading function creates the optimally looking corresponding SDR image to this particular HDR scene HDR master graded image, which was the input of the encoder. On the decoding side, to reconstruct the master HDR image approximation from the received SDR image (s), the inverse functions of exactly this fine and coarse grading function are used, because that was actually the link between these two optimal functions, which were specified to be optimal under the given typical rendering situations. I.e. having a HDR display, then rendering the HDR image, and when having an SDR display viewed under typical viewing conditions then rendering the SDR images of the pair (and when having a display with PB_D considerably deviating from these two graded image PB_Cs, then using our display tuning to create the intermediately dynamic range look image, appropriately corresponding to the master HDR image, i.e. sufficiently approximating its object luminance appearances, at least to the extent that the lower display capabilities allow so).

But now we have a situation in which we need to combine content, i.e. there may typically be a need to again modify the luminances of at least one, and maybe all of the images, to make them harmonious. The splitting of the grading needs in such two curves is very powerful, because it allows to separate object-related needs, such as sufficient local contrast, from general squeezing of the various sub-ranges in the available (even if optimized for the combination) output dynamic range.

So the coarse function defined by the anchor luminance, even if just consisting of linear segments, can now be used as an alternative coarse allocation of the sub-ranges, because apparently that was a better grading for the mix, than the original coarse function F_CRS_MDR for sole rendering of the e.g. HDR movie, on a dynamic range with substantially the same peak brightness as the selected combination range. Now various embodiments could correlate the shapes of various sub-segments of the F_CRS_MDR curve, but usually that will not be so needed. What is important is that the combination apparatus can apply the fine-grading specifics to the various newly allocated optimized levels (i.e. bringing various semantic sub-regions of the master HDR image such as clouds, or cave interiors to the various sub-ranges of the CombRng), with still essentially maintaining the fine grading curve shape. Therefore one can shift the deviation curve to the new position (along the optimal coarse curve for mapping the input HDR luminance to the combination range, being F_Cmb), realizing a new now combination-optimal fine-grading curve F_FINCMB. This can be done e.g. simply by equating master luminances, i.e. shifting on vertical lines, the multiplicative deviation amounts.

The reader by now should start to understand that such anchor-based systems are very powerful to harmonize various content, even if complex luminance-re-grading-desiderata-wise, yet still in a relatively simple, ergo feasible manner.

We will now first describe a simpler embodiment in which the apparatus can autonomously determine such an anchor luminance in the HDR image, and in a related way in the combination range. Ultimately it is important to have the anchor luminance in the CombRng, but this may be easily equated in some embodiments with where it is in the HDR image (and less easy in other embodiments, in which case the content creator of the HDR image can explicitly co-encode it, as L_S2A1). E.g., we will elucidate the principles with an important example of having a face (of course humans are important, so in many images or videos there will be at least one actor, or presenter, etc., and they may typically be reasonably well lit by the content creator, though, in the LDR area it was never precisely specified what reasonably well would be, nor was it really needed). But the skilled reader should understand that our teachings about anchor luminance(s) are generic, so one may have other anchor luminances for other images, which images may not even have a face, like e.g. a middle grey luminance. The reader should understand that in the LDR era a middle grey was a unique and very precise thing (the middle of the coding, which would typically be rendered as an averagely looking grey, and correspond in the original scene with an object reflectivity of roughly 18% of white, or incoming illumination, which would also because of the relative white-on-white rendering correspond to approximately 18% of PB_D), but it is totally not unique for HDR (because there can be a middle grey reflecting object in a relatively darkly illuminated image, or even a dark region of an image, and the same grey object can reside in a relatively brightly illuminated image or region, especially if one doesn't want to force HDR content use into the straight jacket of LDR again, with a very precise manner of lighting and capturing, but one wants to liberally light scenes, liberally artistically grade content, etc.).

It is advantageous if some of those anchor luminances are standardized (so that every apparatus quickly understand what each specific luminance situation of any image input is about), but even if a first image is specified with another type of anchor than the second image, or the anchor of an image is different than which (if just one) anchor the apparatus decides is optimal to specify the CombRng, then those various specifications can still be roughly related. E.g., if a black is not precisely specified (and of course just as in HDR there can be various whites and brights, there can be various blacks), the apparatus may assume, depending on the situation (i.e. the PB_D or other capabilities of the display, and possibly the viewing environment), that it is supposed to be rendered e.g. 2.5 stops, or 4 stops below what the apparatus decided to be its main middle grey (whether that's the first anchor luminance anc, or an auxiliary secondary one). Blacks can both be described (i.e. video coded) and handled, e.g. rendered, with a lesser or higher precision. If a content creator cares about what happens in the blacks, e.g. because there is some critical action of a criminal hiding in the bushes, which should be "half perceived" i.e. neither be too conspicuous nor missed by the viewer, then he should annotate the image or video with additional descriptive metadata for that sub-range or color handling regime. And in particular the creator should define at least one anchor luminance for the blacks. If he cares not or less, e.g. because in the present HDR scene there is only some background texture like photos in a dark basement, which could render with more or less equal semantic quality whether they are well or less well seen, then the creator may rely on typical receiving-side or intermediate-side optimizations of the blacks, where the rendering apparatus may render them with various levels of luminance, as long as it still looks reasonably black (i.e. deep black, good black, or milky black).

So, worded with a simple example to make the user easily grasp major points of our invention, the anchor luminance (anc) in the combination luminance dynamic range (CombRng) specifies what a face luminance should be in the combined (output) image, to make it look appropriate. That will of course depend on whether the face is well-lit, strongly lit, or in the shadows. That avoids that the actor or person in the e.g. commercial, or BD commentary, or video-phone conversation, etc., is not excessively much brighter than the one in the movie. Of course, the apparatus has means to not necessarily exactly collocate the two face luminances, but render one at an offset luminance (e.g. if the actor in the leading HDR movie is in the very dark on purpose, but the rest of the HDR movie is (much) brighter, the commercial need not be dimmed to the luminance specifics of that movie actor necessarily; note that some embodiments of the combination apparatus could further decide by using heuristics, such as e.g. how long the dark scene of the movie has already taken place, e.g. by keeping the time passed since the previous considerably different anc luminance or type of e.g. a daylight scene, and some embodiments could even annotate the anc luminances with further metadata, e.g. the anc at the beginning of a movie scene having a second data element indicating how long the dark scene will last, but we will describe the essentials of the embodiments here assuming that some content creators will not want to go through the trouble of doing many annotations, and will just do the simple act of clicking somewhere in the image, or another representation of it like a histogram, with a pointer, to define the present anc value, which can of course in user interfaces then show by e.g. showing all luminances in the image in a range or vicinity around the anc value in a red pseudocolor, as a verification of the human selection of the anc value).

So the apparatus knows where a good face rendering luminance (this elucidation example's anc), depending on the situation specifics, should actually be (we assume for the moment a Caucasian face with a spectral reflectivity averaged over the wavelengths of about 36%, and of course other skin types of e.g. 5% reflectivity will fall, under that local illumination, on related CombRng luminance positions). The reader can to not be bothered with further details and more easily come to understand the various key aspects assume that the CombRng is in the present explanation just the dynamic range of the HDR image (Im2_Rng in FIG. 4), and the apparatus knows where the most important face luminance is, along that range. As explained above, various alternative determinations of the optimal CombRng can occur in various embodiments of the apparatus, which depend on at least some of on the one hand the luminance characteristics (codeable luminance range, content actually in the range, etc.) of the input images, as far as they are already known or estimatable, or on the other hand the actual established or expected use of the image content, e.g. the luminance capabilities of a display on which the content is to be rendered in a viewing environment (i.e. in fact the typical appearance of generic, average or test images, and the particular present image(s)). This is already complicated, because faces tend to not just have one color or luminance (let alone that in some movies the faces may be painted blue etc.). If one studies various faces even in LDR images, one sees that they can contain pixel lumas even up to the limits of the LDR range in principle (i.e. in a very contrasty capturing, or grading, at least some pixels of the darker part of the face being nearly zero, e.g. in a backlit capturing, and the highlights clipping to 255; sometimes, e.g. with consumer content, one even sees half of the face being eaten away as clipped white), although many faces have less contrasts between the normally lit and shadow region, i.e. are more normal. We may divide content here into well-lit images versus specially lit images, e.g. in real-life field productions (one nowadays even incorporates images made by non-professionals, e.g. in a news program, and if that is of a night scene indeed faces may be badly lit). One could say that in such complex situations one might just as well give up on accurate rendering or combination, but on the other hand one could also say that the more abnormally (deviating from good capturing practice) some image content is shot in the first place, the more one can benefit from regularizing it later on, e.g. by using an appropriate anc value (e.g. if a cameraman in the field happens to be in an unfavorable situation, e.g. where he cannot light the person which for some reason needs to stand in a darker part of the scene, and he happens to only have a camera with lesser DR capability, he may need to optimize in a non-perfect manner his shot images, but then at least with the anc mechanism he can quickly annotate the (exotic) specifics of this image, e.g. as simple as with a stylo on his camera display, or on his portable computing device prior to communicating the content to e.g. the production house, etc.). It is expected that with the emergence of better cameras and other image handling apparatuses, e.g. cameras appearing that can capture dark nighttime scenes as if they were daytime scenes, that many years in the future the complexity of (HDR) image handling will only increase, be it only already because there will be various production standards and levels, e.g. also some people still supplying news content with an old bad quality mobile phone. So the best solution would be to make a technology which can nicely handle all those situations. E.g., a gangster movie may have harsh lighting, e.g. cine noir, with contrasty faces, and strong highlights e.g. in the hair or on a bald face. Talk shows may be lit in a less contrasty manner, with sometimes for the layman almost unnoticeable shadows, and one may light women with a more pleasing more uniform lighting. It should also be noted that it is not the e.g. 4:1 (brightest versus darkest facial half) original lighting ratio of the face in the scene when captured which is important, but rather what is in the encoded image (how the contrast is master graded). This contrast typically may have undergone some in-camera RAW luminance to luma mapping, and if the image is a scan from a celluloid image or movie, the final contrasts can be depending on such aspects as development, pushing, etc.

We have identified this aspect as there being a range of facial colors, e.g. in the elucidating example of FIG. 4 the face colors in the LDR image are softly lit (hence a small range of luminances R_f), and the face in the HDR image was more harshly lit because it was say a horror movie, leading to a larger range R_f2; e.g. a person could be walking through a corridor lit infrequently with spot lights, making his face become darker and brighter over time, around some average value). What is relevant is also how, geometrically, the face is lit. If there is e.g. a small white spot on a bald head, and this image is mixed inappropriately, too bright, with the other HDR movie in the CombRng, one could hear a remark that it looks like he has a lamp sticking out of his head (and the viewer may make such confusing recognitions when such a person quickly flashes through the image, and potentially he loses some of the story, or at least is distracted to the wrong part of the image). But a small spot of a couple of pixels is not necessarily a major issue yet. That can be ignored usually for the determination of the typical face color. When rendered on HDR displays, it can seem like that person is lit by an extremely bright lamp, but at least the spot is small (say a couple of pixels). If the same happens to his entire nose, his eyes, or an entire half of his face, then that could be more disconcerting.

So by being able to indicate a face luminance (e.g. the L_SA1 in the first, say LDR image) in the content, the creator can also easily and quickly indicate not just where there is a face luminance, but also potentially what luminance distribution type it is. E.g., if there is only a small highlight in his hair, he may use the average of the darker pixels of the actual face as L_SA1, and some pixels being rendered brighter will look okay. If on the other hand half (or more than half) of the face is strongly lit, he may use that average or other characterizing luminance value as L_SA1, and then the rest will be rendered darker, and that will be a typically better way to merge, whatever content this face will be merged with. In this case the creator can still indicate with additional metadata that the face is actually an atypically brightly lit face, e.g. X stops above normal lighting. Such information can be advantageously used by the combination apparatus to judge at which luminance (above or below the anc position in the CombRng) this face should then (approximately) be rendered. The normal lighting of a Caucasian (white) face may be taken from the reflection spectrum, which on average over the wavelengths gives a reflectivity of 36%. So that is one stop above the 18% of middle grey (making these two relatable values). As said above, in the classical LDR framework, one would render this middle grey at approximately 18% of display peak brightness too, e.g. 12%. Of course other races should be rendered a little darker depending on their skin type, because otherwise it may be difficult to actually detect the skin type of the actor in the movie for those who may wish to, and that could lead to confusion. E.g., a black skin may reflect as low as 5%, i.e. 3 stops darker than typical Caucasian. As to the rendering, one may render the face somewhat brighter in the LDR range than 36% of peak brightness being 100 nit, to have nicely "sunny" faces. E.g., the image creator can indicate in a first field of the metadata the luma code of the "average" or reference luminance (via the EOTF the lumas can be calculated into absolute luminances) of this face object, e.g. 853, or 80% in a normalized coding of the lumas, and he can indicate in a second field that this is "2SB"-type face luminance, meaning it is lit two stops brighter than the rest of that locality in the scene and its image, etc. The reader understands the same can be achieved by different coding mechanisms, e.g. one can also encode a second anchor point L_S2A1pkS which is a k stop brighter luminance still containing a face color (e.g. the brightest one, or the 95 percentile, or the brightest one still in the face and not a hair highlight), and a third anchor point L_S2A1mkS specifying some darker end of this face in this HDR image or shot of video images. So anchor points of various types can be indicated in a standard understandable manner (to be agreed by various standards implementing the system), e.g. either with a set of enumerated types such as "Face36", "Face18", "Face72", "Face5", "MiddleDimGrey", "MiddleBlack", "MiddleDeepBlack", or a hierarchical, sequential annotation of data can be used, e.g. "Face"+"1 stop above"+"Dim" (in which then face means the 36% reflection of the average amount of light residing in that part of the image with a particular kind of illumination, and more importantly a particular sub-range of the display's dynamic range to be used for rendering those pixel, to give the correct rendered scene appearance: "Dim" would be the middle bright colors, which are e.g. typically rendered, on most or all displays, in the 10-100 nit range, below that there should be at least one region of blacks, and preferably a region of "Blacks" which are slightly less well illuminated, i.e. the dim illumination value divided by up to 10 (or 1-10 nit luminances typically), and a region of deep blacks, up to $\frac{1}{100}^{th}$ of the normal, dim illumination (i.e. 0.x up to 1 nit luminances), which would in HDR artistic scene rendering typically be used e.g. for the deep shadowy scenery one see in a castle when the hero walks through it merely with a candle. Above the dim illumination one should be able to get great results already, make nicely controlled high quality HDR scenery, if one adds a region for the "Brights" (where one would render the sunny outside e.g., approximately 10× for TV viewing, where in real scenes it would be 100× more illuminated, i.e. lumminances of 100-1000 nit), and one for the "Ultrabrights", where one could render e.g. lamps, explosions, etc., i.e. the effects which still make it interesting to have high end HDR displays, with an upper sub-range of e.g. 1000-10,000 nit. A control, whether for display tuning (to finally bridge the gap between scene-referred and display-referred image coding, by after absolute coding of the image structure re-introducing some correct level of display-relativity again), or as in this application for correct image combination, which allows precise differentiated control in 5 scenes, should be sufficient. Actually if one does a survey of types of HDR scene, which exist in real life or which artists could make, then one often sees two region images, like e.g. the shop at night in FIG. 16c (one region uniformly lit image of course typically being SDR encodable), and it is already somewhat less likely to encounter three-region images like FIG. 16b, and when one needs the full power of the 5 different lighting regimes, one is making a really complex HDR scene (perhaps in some movies only appearing at the beginning as a commercial showing the ultimate possibilities of HDR). But the reader will by now understand that our principles are not limited to smaller or more complex embodiments. If the content grader specifies only one anc value, harmonization of various image content to that anc value is already possible. This would typically happen if there is only one critical object in the image, e.g. the sole actor or presenter (but as said, although this actor, even when lit very contrasty, will have only one typical illumination and luminance, it can still theoretically be anything between 0 nit and PB_C). If nothing specifically is needed for the anchor type, it is assumed that the combination apparatus will work with a normal anchor related to a middle grey value, and of a normal rendering luminance, typically "Dim". So content creators annotating only 1 anc value, should typically use a representative value for a middle grey position (in the local illumination of that area of the scene and its image) of their actor, e.g. in a bimodal histogram he resides in the sun, and then annotate the type as e.g. "Bright", so that even with this simple small amount of information the combination apparatus can nicely judge what to do (e.g. in case the movie shouldn't be disturbed too much, it can decide to render the "Bright" actor in the commercial as a dim PIP inside the movie anyway, or to still allow an impression of brightness, it can render the bright actor somewhat above the dim level, e.g. at (bright+dim)/2, e.g. at (30+300)/2 nit; if the standard allows the communication of further metadata, and this metadata is filled in, the creators of content like e.g. the commercial can indicate they don't want to deviate from their preferred "Bright" rendering too much, but on the other for various reasons apparatuses could ignore that, e.g. because the end viewer has indicated with the UI that he wants to enjoy the movie, i.e. preference should be given to lower disturbance errors of bright inserted content in the histogram of the movie).

Of course if the grader annotates further anc values, he can e.g. specify his "Deep darks", and then the combination apparatus can take that into account in its final combination, whether already prepared for bad finally renderable blacks in a bright viewing environment, or not (i.e. with the combination still being done in a theoretically perfect framework of an ideal rendering system prior to display tuning to a real system).

So, having both the anchor luminance (anc) indicating where approximately to put the face color (we assume for simplicity of explanation for this embodiment that the HDR face colors were already at that luminance level, so getting the face colors from the HDR image is then trivial, needing no complex luminance mapping considerations), and a way to identify where at least the main face color is in the LDR image (source anchor luminance L_SA1), the apparatus can relatively simply put all the face colors of both images correctly combined in the combination image as output image. And even for the simplest embodiments the surrounding colors (of the face to start with) and all other image colors will fall relatively well automatically around that anchor luminance (anc). The philosophy for the other colors was also relatively simple, as it needed not be worked out in more detail for those technical rendering scenarios. If all other colors fell in about 2-2.5 stops range around middle grey (e.g. white being typically 90% or 5× times brighter in linear luminance) that would give a good image. Prints could often not get very deep blacks, and also practical LDR television was limited to typically 32:1 (the peak white versus the deepest still reasonably well discriminable blacks), in view of light reflecting on the front glass of the TV. That being 5 stops of image object content, meant that if one made sure that the darker colors and in particular the important blacks were within 2-2.5 stops from middle grey, one would be reasonably okay on the darker side of a well-lit LDR scene too. All this in principle doesn't mean anything anymore in HDR image handling, in particular for compositing and rendering, hence one needs an improved mechanism, and in particular in view of the complexity (images can contain just about anything), some human guidance of what is semantically relevant, and hence what would be a good combination. More complex embodiments can make smarter coordinated choices of how other object luminances can be smartly positioned around the main object as positioned by the anchor luminance anc, which in this simple to understand example is a face. One could annotate e.g. an anchor point being a limit of a range, etc. For avoidance of doubt, when we mean video, we mean just a temporal succession of images, and we don't limit ourselves to that a particular strategy should be applied similarly for an entire movie, but rather it may apply to only a part of that movie, e.g. a shot of images of a same scene (i.e. e.g. the CombRng may be different at different time moments, certainly if later on a new commercial with different object luminance characteristics is being combined). Since most characteristics of our invention embodiments will be similar at least for spatial combinations whether stills or videos are being used, to avoid tedious less readable formulations we may use in cases where distinction is not necessary one of the two embodiments, video or image, in the elucidation, and the reader should then understand he may also read the other. The determination of a function that maps a first (source anchor) luminance to a second luminance (combination range anchor anc), should be sufficiently clear to the reader for various embodiments. As said, one could e.g. construct the combination apparatus color transformation unit to be as simple to make a two-part linear function raising the particular input (source image) luminance from the diagonal up to where it needs to be, and then connect the lines to the maximum and minimum of the input and output range (0, and [PB_C_image_1; LMC]), but if one has a particularly shaped function for reprocessing image luminances to make them more appropriate for different dynamic ranges or brightnesses etc., one can also e.g. linearly scale that function so that the point on it for ancS falls on the anc output value on the Y-axis. It should also be clear how one could build similar systems which need not use exact anchor collocation, but which work with a (not too large) vicinity around that anc value. The usable vicinity can be established as any combination between what the content creator may have indicated in the source metadata (e.g. this anchor may be rendered with a deviation of 20% of its exact value) and what the combination apparatus may decide depending on the situation (as said, although e.g. a face in commercial may in simple calculation come out from the calculation to be rendered at e.g. 150 nit, the combination apparatus may according to various program rules decide to deviate somewhat from that, e.g. it may decide that PIPs which desire to be positioned at the very important central position of the image to be brightened somewhat, and e.g. to an extent which the combination apparatus, which may be the only apparatus having all information of all image parts to be combined, and maybe even the rendering system and environment on which the combined image is to be displayed, judges to be optimal or reasonable for the present total presentation of combined image content). If nothing is further specified, a factor 2× below or above the ideal anchor position may be a pragmatically reasonable vicinity.

Lastly we would also like to mention that because applicant's embodiments can work with functions specifying the ultimate look of images, in various embodiments it need not be that an actual apparatus (e.g. the combination apparatus) actually makes the combined image. E.g. if the combination apparatus is a STB, it could send an already fully optimally combined image to a TV, e.g. HDR10 encoded over HDMI if that standard is sufficient for what is needed for that image, and then the TV renders it directly as a dumb display. But the STB could also just judge and prepare the situation, and then send all needed data: at least some image data, and some transformations (which when having become the optimal transformations FF for calculating the combined image should be sufficient, but some other embodiments could also send anchor values, maybe even further anchor luminance values determined by the STB to the TV). In that case the TV has all the information to uniquely perform the combination, i.e. in a PIP combination it will not only do the pixel selection, but apply FF_1 to the received corresponding SDR image pixels prior to storing them in the combined image buffer, and FF_2 to the luminances of the HDR image pixels, to get the correct luminances of those pixels in the combined image. The simplest embodiments of a combination apparatus may just determine only one good anchor position. E.g. depending on what the TV is showing, how it is set (e.g. by a user brightness control), etc. it may only determine a dim light average grey anchor value, which should under the present condition render nicely looking images, e.g. anc_1D=30 nit. Of course this will not yield the best control over image combination, but if a first content indicates with its anchor (e.g. a black average luminance value) that the action is happening in a dark night, and the second content indicates that it is a bright and flashy commercial, this simple combination apparatus embodiment should already be able to quite reasonably harmonize both images around its anc_1D value. Of course better more complex combination apparatus embodiments will have judged what would be a good combination situation for several kinds of content, and have specified optimal anc values for the 5 above brightness-type of anc value (deep black to ultrabright). The apparatus will then be powerfully able to harmonize any incoming content, by looking at its type of indicated HDR situation or effects by examining its source anc values (and potentially further metadata like re-grading functions, e.g. indicating how blacks can be greyed if needed), to those different illumination sub-ranges of the CombRng, whatever the situation is (e.g. if the combination is made or prepared for an expected further handling e.g. rendering system which has low brights, e.g.

not enough display peak brightness to spectacularly render the ultrabrights sufficiently brighter than the brights, in which case the combination may sway towards some form of posterization for the brightest image pixels; that would then not be the best theoretical combination of the image pixel colors per se, but a good combination for such lesser quality systems). So the anchor luminance in the combination range is typically determined as at least one good luminance for determining the other luminances around it, and is determined by the combination apparatus (based on generic needs of good quality image rendering and/or specifics of actual or envisioned content and/or display capabilities), and the source anchors do a similar thing in the source image dynamic range, and are typically determined according to what the creator thinks is important for his images, i.e. at least which specific important objects and pixels regions around it (at least luminance-wise) should be rendered and used well-controlled, under the various possible usage scenarios, in particular image combinations. It can be understood how to define a suitable anchor luminance for a specific object, i.e. a spatial and temporal sub-part of images, and it should be clear that anchors may need to be redefined when the movie changes to a new (shot of) image(s), from a different scene, e.g. the first scene happening in the living room of a house under daylighting on a rainy day, and the next scene in the basement lit by one sole practical, namely a light bulb in the middle of the basement (both scenes will have similar objects which can be indicated with an anchor, e.g. the shirt of the actor, but the will of course have different graded luminances in the master images, and need to be rendered differently in the ultimate MDR images for varying displays).

It is advantageous when the color transformation unit (310) is arranged to determine the color transformation (FF_1) so that an output luminance (LF1_o), being determined as the result of applying the color transformation (FF_1) to an input luminance of a color of pixel of the first image or video (Im1_LDR) being equal to the at least one source anchor luminance (L_SA1), is equal to the anchor luminance (anc). So one way of coordinating the luminances of the at least two images (or videos) to be combined, is to design the combination strategy so that the chosen anchor luminances for all the images are the same, and set to the value of the appropriate anchor luminance (anc) in the combination dynamic range of the output image (Im_o) in which the final image combining is going to happen (e.g. a PIP, or alpha blending). The skilled person understands how the apparatus can calculate a function which has as a property: FF_1(L_i=L_SA1)=anc, and then a mapping for all luminances around anc respectively L_SA1. In particular since we may be working in linear luminance color space (and the smart choices regarding object luminance placement along the luminance axis have already been largely done by decoder 251 working on at least one of the images, because the content creator created the specifics of the different graded images for their image dynamic range, and the corresponding re-grading luminance transformation functions if communicated), one may often just use a linear mapping (or sometimes a simple non-linearity to non-equally spread contrasts, like a gamma function). As elucidated with FIG. 18a, one can understand how one (with a linear dimming factor) has to dim the luminances as determined by the input image encoding by some factor for the darker images, and a similar somewhat different mapping happens to input image luminances brighter than the source anchor L_SA1.

In the case of a linear function, one can easily understand that the function can be determined (e.g. in a normalized to 1.0 axis system with x-axis=linear input luminance of the say LDR image, and y-axis is normalized luminance in CombRng), namely as L_out=FF_l(L_in)=C*(L−L_SA1)+anc. C is a contrast constant, which the apparatus can still further optimize to make the two images more harmonious. It could be determined looking at the semantics of the two images, e.g. the histogram, and spatio-luminance distribution (e.g. small shapes at the top of the image being lamps, etc.), average brightness relationships of the images, etc. E.g., if the HDR movie consists mainly of a dark basement, in which a person is walking in the shadows, with the high brightness part consisting only of a single lamp, then the relevant contrasts (of the majority of the HDR image) won't be very high. So if one has to combine with a very contrasty LDR commercial, one may want to decrease the contrast of that commercial somewhat, to be more in line with the lower contrasts the visual system perceives hence expects in dark environments (e.g. one could constrain the brightest part of the LDR commercial, by applying a softly sloping part of FF_1 for those brightest relative colors, whatever the semantically contain be it sunlit outdoors objects or light bulb pixels, like in FIG. 18c. On the other hand, boosting C somewhat above 1 can help to increase the vividness of a commercial, even if not shown to the maximum or HDR-average brightness in a HDR movie which is very contrasty (i.e. one can control the contrasts in the local sub-range of the HDR CombRng to which all possible SDR image luminances will be allocated, etc.). Of course the reader understands that the apparatus can make other FF luminance (color) transformations also, e.g. a function which has a relatively high contrast just below the point (L_SA1, anc), but then starts decreasing its slope, leveling in some threshold blacks L_out=L_b, etc. In fact in principle any function can be determined by the combination apparatus, as long as it approximately maps the source anchor luminance to the anchor luminance, but typically the resultant functions will be relatively simple (and e.g. a multi-linear segment function will usually already give good results, at least on less critical HDR scene images), unless either the creation side has communicated specifics for the combination apparatus to follow, like partial luminance mapping functions shapes for re-grading various luminance sub-ranges, or the combination apparatus embodiment has significant internal image analysis units, which allow it to propose more beautifully looking combinations (by identifying and optimizing various interpixel, or inter-region contrasts, texture rendering quality, etc.).

Advantageously the color transformation unit (310) is arranged to determine the color transformation (FF_1) so that a luminance ratio of a second output luminance (LT2_o), which is determined as the result of applying the color transformation (FF_1) to a second input luminance (LT1_i), divided by the output luminance (LF1_o) is a multiplicative constant (C) times a ratio of the second input luminance (LT1_i) divided by the source anchor luminance (L_SA1). As said above, simpler embodiments can determine a fixed value of C for the entire (partial) luminance range (the input luminance of the image to be processed), but one may also make C a variable function of the input luminance L_i (C=CF(L_i)). Partial luminance ranges can be defined by the combination apparatus (again whether guided by received further metadata prescriptions, or on its own) in various manner, e.g the extent of a main histogram lobe can be determined, or a range can be determined for luminances in the LDR image between ancS/k and k*ancS, with k, e.g. equal to 4, and the rest of the LDR luminances being mapped with the two dashed partial functions of FIG. 18c, etc. As an example of more variable functions FF, one may increase the contrast of the brightest parts of the LDR image (above constant L_it, e.g. as a histogram percentile etc.), in case there is important information (e.g. stongly lit faces), but one may alternatively also decrease the contrast for that bright region in case it is only less relevant information above the main action, so that e.g. the apparatus can increase somewhat the average luminance of the first mixed e.g. LDR image (e.g. by mapping to anc+d_anc), but not overshout the HDR movie with too brightly rendered highlights in the luminance-mapped LDR image in CombRng. This allows inter alia to make the luminances correspond more to an expected human brain-calculated brightness distribution. So LT2_o can be selected e.g. as a certain percentage above LF1_o (e.g. equal to anc), e.g. 150% LF1_o, or $k$ stops above LF1_o, and then specify C1 for that luminance interval, etc. Smart tailoring of such an (at least one, or more) sub-region of typically the lesser important one of the images (e.g. a SDR commercial) can greatly improve the harmonious look of the total combination.

Advantageously the color transformation unit (310) comprises a deviation determining unit (312) arranged to determine on the basis of the at least one source anchor luminance (L_SA1) a luminance offset (d_anc), and wherein the color transformation unit is arranged to determine the color transformation (FF_1) so that an output luminance (LF1_o), being determined as the result of applying the color transformation (FF_1) to an input luminance of a color of pixel of the first image or video (Im1_LDR) being equal to the at least one source anchor luminance (L_SA1), is equal to the anchor luminance (anc) plus the luminance offset (d_anc). As said, there may be considerable differences between such object-related luminance aspects as e.g. the lighting of a face (e.g. very contrasty), and the relation of the face luminance to the rest of the image. So the apparatus may decide that it is more appropriate to not render the LDR face (or any dynamic range first image anchor object, or region and corresponding sub-range of luminances) at exactly the output luminance anc, but rather e.g. 2× brighter. This may be inter alia determined on the basis of a type of face lighting (which may e.g. typically be indicated with an anchor type codification), e.g. if the source anchor luminance (L_SA1) is determined as the average luminance of a very brightly lit half face, and the face is to be rendered in the final image with a big size, then the apparatus can decide to determine a negative d_anc of e.g. 50%. The heuristic considerations behind these program rules and mathematics may consider e.g. that bright regions may over-radiate surrounding darker regions, or be too conspicuous and attention grabbing, or just irritatingly bright compared to the rest of the image, which may be the main thing the viewer was watching, like a movie, etc. The considerations may also evaluate the brightness composition of the HDR movie image. E.g., that image may consist of a dark indoors region and a brighter outdoors region as seen through an open garage door. If the PIP of the relatively much brighter LDR commercial is supposed to be placed in the dark part, it should be darkened (i.e. a relatively large d_anc, e.g. to bring the average luminance of the face in the LDR, or further anchor luminances characterizing the LDR image, being weighed in a single representative luminance for the LDR image, halfway in between anc and the local average luminance of that dark region of the second, HDR movie image), to have the contrast between the two images, and the local contrasts seen therefrom by the brain in adjacent objects of those two images, not too excessive. But if the bright PIP is to be presented near the sunny outdoors part of the HDR movie, it may even need to be brightened with a positive d_anc. So in general these deviations d_anc will be calculated based on what an ideal combination (of e.g. two faces) would be in an ideal situation (e.g. if the faces were surrounded in both image by a middle grey background), and what the actual situation of at least the main image (i.e. in this example the HDR movie, in which we paste the LDR commercial) is, both globally (i.e. what kinds of objects it comprises, with average luminance, and size, and potentially more semantic characterizers, like internal complexity with a texture measure, etc.), and locally around where the composition would happen (e.g. in a PIP of small size X,Y). So the offsets will be determined in general based on what is harmonious for the two images, and in various embodiments that will depend on the specifics of the images by themselves (contrasts, type of source anchor position and object content in that vicinity, and content outside that vicinity, geometrical size etc.), and the combination (whether the PIP is e.g. positioned in a small less critical place at the bottom right of the image, or how the mix will shine through the partial information in a blending mix, etc.). Simpler embodiments will just use a relatively simple harmonization structure, which is not too bad per se (especially if the anc+d_anc value can be optimized for mitigating e.g. a risk of excessive contrast, if that is judged for the commercial), but more advanced combinations can look more precisely at where and how exactly the second image information is placed, or even further properties of the combination.

Advantageously the color transformation unit (310) is arranged to read at least one second source anchor luminance (L_S2A1) obtained from a second source (351) which delivers a second image or video (Im1_HDR) of the two images or videos, and in which the deviation determining unit (312) is arranged to determine the luminance offset (d_anc) also on the basis of the at least one second source anchor luminance (L_S2A1). We have above described a simple embodiment, in which the luminance structure of the main image (which we call image 2 in our claim formulation) has a known luminance structure, and hence can easily be transformed and form the basic reference in the CombRng. It is a useful manner of combination in case the HDR image is a leading image, which should be distorted minimally, hence it is mostly the secondary content which is transformed towards it. This may happen e.g. if one knows that the HDR image is of a type produced to guarantee that all Lambertian reflecting objects (say of a studio talk show) are given a luminance which always falls tightly specified within the 0-400 nit range of Im_HDR's dynamic range Im2_Rng (and that will correspond e.g. to a 0-300 nit range in CombRng, or the same 0-400 range in CombRng), and everything above are mostly highlights such as e.g. small specular reflections on metals. In that scenario, one has a specific kind of HDR scene, in which the lower part is produced in a manner which is largely similar to LDR television production, and the HDR effects are mostly lights, for which one is not too critical about their exact luminance (and not e.g. objects through a window, which are not only to be clearly seen, but which exterior objects maybe even should have particular luminances to convey some artistic mood). In this case, the problem is mostly about coordinating the LDR commercial with the lighting situation of the HDR talk show, mostly the part up to 400 nit, and coordinated also to some extent with what exactly is in the bright regions (e.g. one could use the above contrast mechanism with multiplicative constants C, or any general determination and application of a luminance mapping function, to brighten up small highlight regions (identified or supposed) in the LDR commercial to be more corresponding to the luminances of these highlights actually present in the HDR talk show).

But in general the HDR content can be just anything. E.g. it's faces may not be lit to approximately 25% of 400 nit tightly, but fall all over the luminance axis if an actor is running e.g. through a dark mine corridor with sparsely placed lamps. So therefore it is advantageous if everybody who makes whichever content annotates their content, so that also the HDR image will indicate where one or more of its faces fall on its luminance axis, with at least one second source anchor luminance (L_S2A1). Then it is more certain that both images will harmonize in their final combination, because the apparatus can by reading L_S2A1 verify where in the HDR second image the face luminances are (see the matching elucidating example in FIG. 4). The HDR image can then be optimally transformed for whatever the best final combination situation is (in particular the CombRng), e.g. taking into account that most likely the movie will be shown outdoors instead of in dark surrounding, etc. E.g. the FF function can modulate the different facial illumination to a lesser degree, in particular if e.g. the viewing situation will be such that dark object texture rendering will be deteriorated compared to optimal cinematic viewing of the movie.

It is also advantageous if the color transformation unit is arranged to establish a color transformation (FF_1) to be applied to the first image or video also in dependence on first color re-mapping functions (F1_L) which specify a change in luminance distribution of objects in the first image or video (Im1_LDR) for mapping the that first image or video from the dynamic range associated with the encoding of the first image or video, to a dynamic range with a peak brightness which differs at least a multiplicative factor 2, or in which the color transformation unit is arranged to establish a color transformation (FF_2) to be applied to the second image or video also in dependence on second color re-mapping functions (F2_L) which specify a change in luminance distribution of objects in the second image or video (Im2_HDR) for mapping the that second image or video from the dynamic range associated with the encoding of the second image or video, to a dynamic range with a peak brightness which differs at least a multiplicative factor 2. As explained above, in our basic HDR video or image encoding framework we indicate with communicated color transformation functions (at least defining a luminance transformation, but sometimes also a needed saturation transformation, e.g. to increase the saturation of objects which needed to be darkened in the LDR look, to keep them sufficiently lively looking; the functions specifying the look for dynamic ranges which differ typically at least a factor 2 in PB_C, e.g. how to transform one extreme or middle grading, e.g. 5000 nit PB_C into the other, e.g. 100 nit PB_C) how a luminance distribution of the objects should change (which is in general a complex optimization towards the lower capabilities of a lesser PB display or codec, taking into account the semantic specifics of the HDR scene) when going from a higher dynamic range to a lower one (or vice versa). I.e., when transforming from a master 5000 nit HDR graded image, to e.g. a 100 nit image, or some in between medium dynamic range image, e.g. optimal for driving a 1200 nit display. Typically the creator can so determine how he would like the look to change, e.g. progressively darken highlights and dark regions.

The power of the combination framework is that it can decide how to formulate the new kind of functions, which map not to a different (sole) optimal rendering image dynamic range, but to a combination dynamic range, depending on inter alia how accurately one wants to control the colorimetry of the combination (which by itself can be depending on various external parameter settings, with parameters quantifying i.a. a desire by a content creator, owner, or distributor, a viewer—is he trying to attentively enjoy the movie e.g.—, or even the display manufacturer). Of course the total look of the combination may vary depending on the particular combination and what is in it, but that doesn't mean that the re-grading functions per se do not contain interesting re-grading needs or desiderata (whether in the brightest sub-range, say upper 20% of the lumas, there are clouds which desire careful re-grading, or less important objects), which also the combining apparatus may want to follow to a certain degree.

Now, if the simple linear functions FF mentioned above are used for mapping input luminances of images around the anchor luminance anc, the details of F_L may not be needed. But more sophisticated mappings can vary on the linear strategy, and should in particular do so according to what is implicitly said is needed by the content creator in the functions F_L for that particular image of that particular HDR scene, in that sub-range of the luminances. E.g., if the creator likes to make the darker luminances disappear into black quickly, the color transformation unit (310) can take that into account when determining an optimal function FF, e.g. it may stretch some of the contrast for brighter regions (around the face color anc e.g.) by more quickly clipping to black a larger percentage of the LDR luminances than the linear function would do. So the apparatus can evaluate the functional shape of at least a luminance transformation function of the set of F_L functions (which for simplicity of understanding the reader can assume to be just one arbitrarily shaped function mapping normalized to 1.0 input luminances to normalized to 1.0 output luminances), and use a part of that shape to design the shape of the final function to map to CombRng. It should be noted that in such functions there can be given various desiderata for re-grading parts of an image, whether by itself or in relationship with other possible luminances in other parts of other images, etc. E.g. one could specify for a geometrical region of an image that the luminances present there should e.g. not be boosted too excessively, even if e.g. in the rest of that image are pixels with the same luminance which can be boosted to a large degree. Any such partial function shape can in principle be indicated (e.g. previous embodiments which applicant has developed allow the specification of a sub-set of pixels in an image which fulfill the property of falling in a particular geometrical region like a rectangle, and have luminances between L_min and L_max, and then one could define a desired mapping behavior partial function e.g. for luminances in that region of say the HDR image which fall between L_min+k and L_max−l, with k and l constants. E.g., one could give a sole or parametrized boosting function for those luminances L_out=B*L_in+O, wherein B and O could be function of various properties, such as LMC, or an average of the luminances of the combined output image surrounding the rectangle in which data from the HDR image is placed, etc. Any split re-grading behavior can be indicated in functional specifications prior to the ultimate combination, or even deconstructable after a combined image has been created (for at least part of the total to be combined content).

It is advantageous if the dynamic range establishing unit (302) is arranged to establish the combination luminance dynamic range (CombRng) depending on the luminances in at least one of the two images or videos. Not all embodiments need to or can take into account final viewing environment specifics. E.g. the output image may be mixed in some master control room for transmission to various users. The final situation may not be known, and could vary considerably (if one viewer is watching e.g. in the train, and another in the cinema room he has made in his attic). In that case it is advantageous if the combination is optimized based on the characteristics of both (or all if more than 2 are mixed) images, because that will always be relevant. Of course the reader will understand that if well applied, the combination paradigm is further scalable. E.g., a first content creator may have mixed two image sources, but that doesn't mean that down the line more content could not be mixed. And that could happen both post factum, or with the first creator already anticipating, and at least some of the combination apparatus embodiments should cater for all such situations. E.g. the first content creator may have the first say in what should happen, so he could determine a CombRng (and/or anc) which is optimal for his content, but perhaps already anticipating that some entity further down the line will add some image content which some typical additional characteristics (e.g. a ticker tape with news info at the bottom, or in a cinema room or shop or museum situation a secondary projector projecting some secondary image information besides or partially across the primary rendered image content, etc., which secondary content will have a dynamic range, average brightness, dynamics such as temporal evolution of the average brightness, etc.). The secondary content mixer can then still decide whether it is better to follow the first content creator's indication, e.g. keep the CombRng, or maybe better fine-tune it, given there is now additional information regarding the final combined image, or its presentation. Two classes of embodiments are possible. In a simpler class the two images are already at this stage mixed inseparably (e.g. final PIP composition), and the final receiving side may only optimize this total image according to its rendering specifics (display PB of the display to be rendered on, average surround brightness, etc.). I.e. for simplicity of understanding, say it takes this combined image and applies as square root function to its luminances, to obtain the final output luminances to be rendered. This may be sufficient for many scenarios, because the mix image may already have harmonized brightnesses, and the viewing environment may not differ too much from the intended one.

More advanced embodiments will allow re-determination of the object/pixel luminance distributions of the two images at the receiving side, and may in some embodiments comprise the redetermination of the original images, at least to some extent (e.g. their basic encoding, or at least original luminance grading; which is the above-mentioned deconstructability). E.g., some embodiments could specify the say PIP combination in some luminance distribution manner, but co-encode the CombRng specifics, and the functions FF to bring at least one of the two images to correctly harmonized luminances within CombRng. E.g. one can imagine that one just puts the LDR PIP in the HDR surround image with luminances linearly scaled to 5000 nit PB, which without the correct processing on the receiving end would of course give a horribly looking combination. But the receiving side gets all necessary information to make the combined rendering correct, at its side, i.e. with a harmonized PIP image. It can do so by suitably changing the pixel luminances in that rectangle, taking into account everything it knows (i.e. e.g. partial luminance mapping functions received for that region, or special additional anc values for that rectangular region, etc.; or what it can at its own end determine, e.g. that such region seems considerably bright compared to the surrounding pixels, etc.). The skilled person will by now have understood that these functions FF are not the functions F_L to re-grade for a different dynamic range per se, e.g. not simply the functions to reasonably map a sole LDR image appropriately to a MDR display dynamic range of PB e.g. 1500, but rather functions with which the creation side specifies (or the combination apparatus at whatever location establishes) that this would give a good mix for the LDR image harmonized with the HDR image, i.e. taking specifics of the two images together into account.

Advantageously the dynamic range establishing unit (302) is arranged to establish the combination luminance dynamic range (CombRng) depending on a peak brightness of a display on which the at least one output image (Im_o) is to be rendered, and preferably also on a brightness characteristic of a viewing environment. If an embodiment of our apparatus is incorporated in an end rendering site apparatus or system, e.g. a TV or computer, then it may be appropriate to even further specify the combination according to the viewing specifics. If an LDR image would look excessively bright when seen on its own in a dark environment, so will it likely be too bright for that dark viewing surround when combined with a movie, in particular because that movie may already have been optimized for that particular viewing situation (see in FIG. 3 the appropriate MDR automatically re-graded look image Im2_MDR being calculated for a e.g. 1200 nit PB display watched in dim surround, from a say 5000 nit Im_HDR which all viewers having the same content subscription or watching the same broadcasted program receive). The partial images can then be mixed in their appropriate MDR dynamic range (Im1_LM and Im2_HM). This will be in particular important when e.g. the darkest pixels of some image are difficult to view in brighter viewing environments, in particular if the viewer is distracted by (maybe even spatially neighboring) bright content from the other combined image(s), and then having e.g. an additional anc value for the darker pixels in at least one of the images (e.g. the leading image) may significantly improve the optimality of the final combination. The skilled reader will understand that of course with the combined presentation of the two images the optimization may typically need to be different than sole image optimizations, and depending on the totality of the situation, as that is what the viewer gets to perceive (of course pragmatically one will build apparatuses which do the optimization more or less accurately based on the complexity one can afford in view of the positioned market price of the apparatus; some of the simpler embodiments may already do a quite reasonable job). When viewing a sole LDR commercial which is too bright, even in a dark viewing environment the viewer will then largely adapt his vision by what is seen on the screen. But having two images combined, it is not trivial a priori what exactly the human vision will adapt to, and consequently related which lightnesses and brightnesses the brain will see for the combination of rendered pixel luminances (it is not unlikely he will start seeing the leading movie badly), hence the desire to have a system where the content creator can at least indicate the minimally needed information and guidance (practical technical systems are always a balance between complexity— e.g. amount of effort spent by a content creator, and cost of the ICs which need to do the calculations—versus the need to be able to handle at least some minimally needed color transformations to make the system behave at least half reasonable, instead of just badly; and various embodiments, typically standardized, will then decide how far to go with which further specific control functions in which scenarios). So the skilled reader understands that it is advantageous to determine the CombRng (and also the anchor luminance typically, and also the specific shapes of the FF functions if not linear, or the contrast multiplier C if linear) depending on at least the capabilities of the display (its PB may suffice in most situations, but further characteristics may be incorporated, e.g. if it is not fully used in view of power saving, etc.). And if apparatuses are connected to evaluate the brightness of the surround environment of the viewer, one may want to do more. E.g., an illuminance meter may be used, but it may be better to use a camera somewhere in the receiving side room, e.g. connected to the display, which can be calibrated into a luminance meter for various regions of the imaged viewing environment, and is already in some TVs. From this one can roughly estimate how the viewer will be experiencing the images. Simpler or more advanced versions can be used, e.g. a camera which checks the various luminances in a region behind (see around) the TV up to 1 TV width on each side.

It is advantageous if the luminance anchor determining unit (303) is arranged to determine the anchor luminance (anc) depending on at least one of: the combination luminance dynamic range (CombRng), the luminances in at least one of the two images or videos, a peak brightness of a display on which the at least one output image (Im_o) is to be rendered, and a brightness characteristic of a viewing environment. Also at least one anchor luminance anc should be established, from which the distributions of the luminances of both images can be distributed in a harmonized manner. The reader should understand that various embodiments can do the determination of CombRng and anc in either order. E.g., some embodiments may first establish, say depending on the capabilities of the (actual or expected) display and the brightness characteristics of the viewing environment, what a good CombRng would be, e.g. typically for the situation of the current movie, or even per shot of images etc.

E.g., some embodiments may before starting a movie analyze the first images of the movie, or a characteristic set of images sampled throughout the movie. Or the movie may have co-encoded metadata, from which the apparatus can establish before even decoding the first image, what a reasonable at least initial CombRng would be. E.g. the metadata may specify that the average brightness of the movie is 200 nit in a lower range up to 400 nit, and with a most extreme sequence—say a shot in a desert—falling up to (i.e. which should be preferably rendered on any MDR display having sufficient capability to do so) diffuse object luminances like of the sky or sand up to 900 nit (and average 600 nit). The image combining apparatus embodiment can then decide that it should reserve in the CombRng (especially if for serving displays of various PB) a fixed over-bright area, e.g. up to 200% of that 900 nit which would be the most excessive requirement for that movie, so that the upper 100% of luminances can be used for all highlights (whether small specular reflection spots, lamp, or even above-bright regions containing image detail such as a very brightly illuminated part of a scene). Of course more advanced specifications can aid in determining what exactly the region of brighter luminances in CombRng should be, by also encoding what kind of HDR effects are typical in the program or movie, or part thereof. Working with a couple such sub-ranges is powerful and versatile (whether they indicate mostly the needs of the content, or the capabilities of foreseen rendering, or both), especially if complemented with a couple of good anchor luminances for those ranges.

After having decided an optimal CombRng, the apparatus can then based thereupon determine where the anchor luminance of e.g. a face color should be. E.g. if half of the range is for the well-lit Lambertian objects, then it can decide to use 40% of that 50% of peak luminance as the face-luminance anc point. However, some embodiments can work the other way around. Taking into account all rendering characteristics, the apparatus can determine a suitable anc luminance for faces or main region Lambertian objects middle grey, so that it looks appropriately bright for the viewer. It can then construct a suitable CombRng around that. E.g. it looks in the most demanding HDR image, and sees bright objects (see lamps) up to 20× the face luminance. It may then decide to put the maximum of the range at that luminance value, or consider e.g. 80% of that value should be sufficient for a combined rendering of two sets of images, and then higher values in Im_HDR respectively Im2_MDR (whichever will be used in the combination in the particular embodiment) will typically be clipped to the maximum LMC of the combination dynamic range. This can be very useful in case one wants to harmonize content with e.g. lesser dynamic range capabilities, especially if e.g. the HDR movie is not the leading content, but e.g. a PIP on a computer display which mostly shows other image regions with e.g. information etc. So simple embodiments will make an object which is 2× brighter than face color or in general any anchor luminance in either image (i.e. the first and second HDR image, or the LDR image in case an LDR image is used in the combination) two times brighter also in the respective image pixels when ready for adding into the combination image, or images (Im_o). Or more advanced color transformations (or combinations, some of which may also weigh or change the pixel luminances in their combination mathematics) may make some luminances darker or brighter. And similar considerations may be done by the apparatus to come to the lower limit luminance LmiC of the CombRng, e.g. somewhat brighter than in at least one of the source images, so that the combined image (which may now have much more bright objects than at least one of the originals) doesn't have too dark or too contrasty a look, etc.

Further embodiments may be realized as corresponding apparatuses (whether small as just part of an IC, or as large as an entire consumer or professional system) or methods, e.g.:

A method of combining two images or two videos of images (Im_HDR, Im_LDR), one of them being a high dynamic range image or video, the method comprising:

establishing a combination luminance dynamic range (CombRng), being characterized by at least a maximum luminance (LMC), the establishing further comprising determining an anchor luminance (anc) in the combination luminance dynamic range (CombRng);

applying a color transformation (FF_1) on at least one of the two images or videos, consisting of at least a luminance transformation, which color transformation is established on a value of the source anchor luminance (Im1_LDR) which is read from a first source (350) which delivers a first image or video (Im1_LDR) of the two images or videos; and combining the images with their pixel colors in the combination luminance dynamic range (CombRng) to form at least one output image (Im_o).

A method of combining two images as claimed in claim 10, in which the color transformation (FF_1) is determined so that an output luminance (LF1_o), being determined as the result of applying the color transformation (FF_1) to an input luminance of a color of pixel of the first image or video (Im1_LDR) being equal to the at least one source anchor luminance (L_SA1), is equal to the anchor luminance (anc), or a luminance offset from the anchor luminance (anc) by a determined difference (d_anc).

A method of combining two images in which the color transformation (FF_1) is determined so that a luminance ratio of a second output luminance (LT2_o), which is determined as the result of applying the color transformation (FF_1) to a second input luminance (LT1_i), divided by the output luminance (LF1_o) is a multiplicative constant (C) times a ratio of the second input luminance (LT1_i) divided by the source anchor luminance (L_SA1). As explained above, the other luminances occurring in the images around the anchor luminance may be either simply mapped around the anchor luminance, or in a more precisely determined manner.

A method of combining two images in which a color transformation (FF_2) of the second image or video of images is determined based on at least one second source anchor luminance (L_S2A1) obtained from a second source (351) which delivers a second image or video (Im1_HDR) of the two images or videos. One can determine various anchor luminances not just of the first but also of the second image, so that their various brightness ranges (e.g. well lit, light shadows, deep shadows, lamps, etc.) can be optimally coordinated mapped onto each other in the output range of the output image CombRng.

A method of combining two images in which at least one of the color transformations (FF_1, FF_2) to be applied to the respective one of the at least two images or videos is determined at least in part based on at least one received function (F1_L, F2_L) which indicates how the respective image is to be transformed from the dynamic range corresponding to which it is encoded, to a dynamic range which is at least two times higher or lower. As said these functions determine how exactly the brightnesses of all objects in their scene should look in any dynamic range (at least 2× different from its native dynamic range, i.e. the PB of the reference display which corresponds to the EOTF which defines the luma codes Y' of the received input image). So, that information can also be used if one needs to re-grade to e.g. a somewhat lower dynamic range (e.g. CombRng being a little lower than the MDR range of Im MDR). This will do most of the smartness for coming to coordinated luminances at least for one image or video being used on its own, but it may be a good starting point to roughly determine an initial set of pixel luminances of the mapped image to CombRng also for combined image content presentations. Further fine-tunings may happen, either somewhat simplistic, e.g. a heuristic linear stretch determined by the combining apparatus or method, or more advanced taking into account the specific required luminance coordinations in the images in their objects or luminance sub-ranges (whether smartly determined according to e.g. object segmentation algorithms and the corresponding luminance ranges, or more approximately by e.g. dividing the CombRng into 5 equal or non-equal sub-ranges, and the same for the two input image luminance ranges, and their corresponding sub-ranges), as they are specified by the creator of the content in the shape characteristics of the functions F1_L respectively F2_L, whichever is being examined and used in any embodiment.

A method of combining two images as claimed in one of the above method claims, in which at least one of the combination luminance dynamic range (CombRng) and the anchor luminance (anc) is determined based on at least one factor from the set: a luminance distribution-dependent property of the objects in at least one of the two images, information summarizing the luminance characteristics of at least one of the two images, the dynamic range of a display on which the combined at least one output image (Im_o) is to be rendered, and a brightness measure for a viewing environment in which the output image is to be seen.

All the above may be incorporated in various systems and forms, whether consumer apparatuses, or professional systems, of which some components may reside on servers in other countries connected via the internet, etc.

It may be advantageous if an image is supplemented with metadata, such as a specification of a CombRng (e.g. its upper luminance LMC, and its lower limit luminance LmiC), and/or a typical anchor luminance, e.g. of a face, and possibly also at least one color transformation function indicating how to map the image pixel luminances to the CombRng.

It is also advantageous if content creator annotate their image(s) with at least one semantically relevant (and preferably of a pre-agreed type) anchor luminance, so that when received the lighting choices of the image can be understood by an apparatus wanting to combine various images.

Advantageously each of the methods can be embodied as a computer program which may be communicated via some physical carrier e.g. a computer program product comprising software code enabling a processor to run the code so that when the code is run all steps of any of the above method embodiments is performed.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings:

FIG. 8 schematically illustrates some more advanced examples of how the apparatus can tune the (FF) functions to color transform the images to be combined into the combination range (CombRng), based upon semantic specifics of the object luminance distribution in the HDR scene as imaged;

FIG. 12 schematically shows further elucidating examples of how apparatus embodiments can determine a CombRng, and allocate source image luminances therein, starting from a good position of a luminance value of an anchor luminance;

FIG. 13 schematically shows how one could simplistically combine pixels from two images if one doesn't use the technical aspects of the present invention, but which could lead to bad quality combined images;

FIG. 15 further elucidates schematically how various combination ranges could be determined, and what that could mean in practice, in particular for the establishment of the related sensible anchor luminance(s) (anc), and therefrom typical luminance mapping functions for harmonizing the partial content from the at least two images or videos;

FIG. 16 schematically shows in particular how one can to very powerful harmonization in case one has specified the earlier part of the video handling chain, the video coding per se, in a particular manner of coarse and fine re-grading of the various image luminances;

FIG. 17 schematically shows how automatic versions can formulate the determination of the various variables based on various algorithms determining such factors as errors, both of image content distortion, and/or content disharmony, which in case of human grading and image annotation can be determined by the human content creator; and FIG. 18 schematically shows some further examples of useful luminances transformation function embodiments for determining harmonized luminances for the image combination.

DETAILED DESCRIPTION OF THE DRAWINGS

Figure 1:
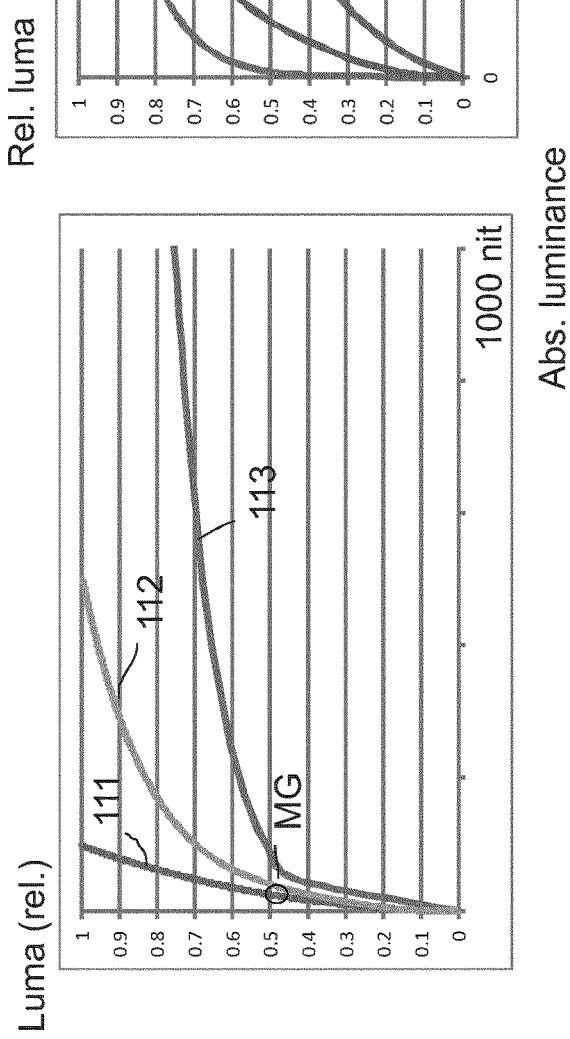
FIG. 1 schematically illustrates how in the (recently started) HDR era various different ways of encoding videos have been proposed (in 2015), which will lead to images with very different luminance characteristics, which are not easy to relate.

FIGS. 1 and 2 have already been explained above, and FIG. 2 shows how we preferably encode a HDR video, or more precisely an LDR graded image and HDR (typically 5000 nit PB) graded image of the same scene, which can be decoded (by applying luminance transformation function(s) to the received LDR image(s)) to yield an optimally re-graded image for a display peak brightness anywhere within or even outside the range of dynamic ranges spanned by the LDR and HDR grading as extremities.

Figure 3:
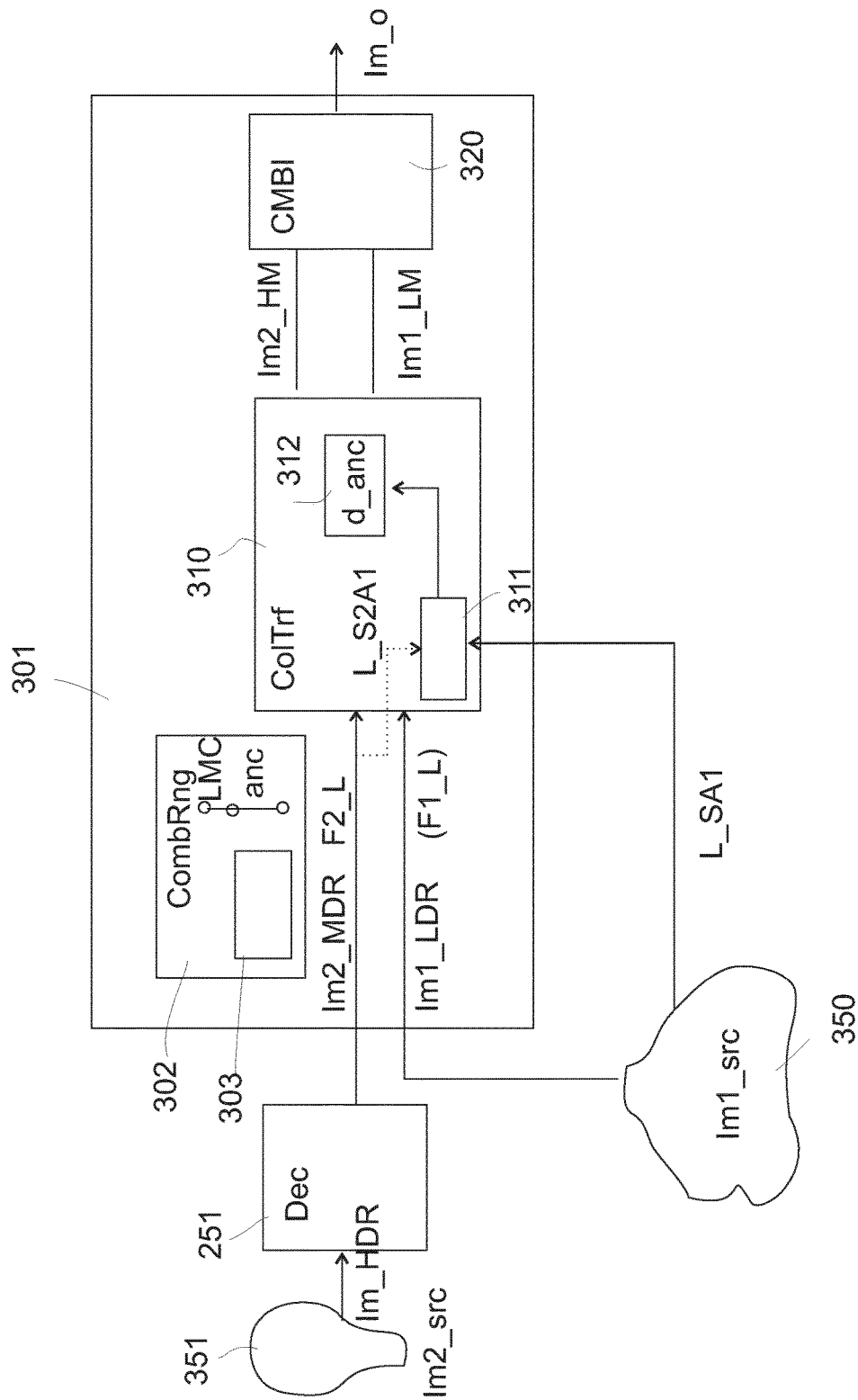
FIG. 3 schematically illustrates a basic embodiment of the present HDR-capable image or video combination apparatus, showing main units.

FIG. 3 elucidates on higher level some basic components underlying most embodiments of our HDR image, or video, harmonic combination apparatus or method. We will below describe the situation with a PIP example, although the same techniques can also be used e.g. to dim a grading's brightness coordinatedly in a temporal succession of interleaved video from different sources. E.g., one may establish a good CombRng level for the LDR commercial, and adapt luminances in the HDR images in a gradual manner towards it (various extra metadata could be send regarding the temporal evolution of the various videos). The skilled reader will understand that once the situation of very different and differently defined luminances (let alone luma codes) of the two images has been converted into having corresponding related, similar luminances (to be combined), one can also start mixing the content in more complex manner, e.g. alpha-blending, or replacing part of a face with some computer-generated face structure with appropriately coordinated luminances etc. E.g. if the face luminances (e.g. on either side of the differently illuminated face) as mapped to the CombRng of the first image are x and y, and of the second image x+e1 and y+e2, with e1 and e2 sufficiently small deviations, then one can apply mixing equations like $L\_out\_comb = alpha*L\_im1\_comb + (1-alpha)*L\_Im2\_comb$, in which $L\_im1\_comb$ and $L\_Im2\_comb$ are respectively the pixel luminances of the first and second image after being color-transformed (with the respective to be used FF function) to the CombRng, and alpha is a real number between 0.0 and 1.0, and $L\_out\_comb$ is the final luminance for that mixed pixel in the output image Im_o, i.e. the combined image having CombRng as dynamic range.

The reader may understand that if a creator has the fullest possible control over the original images (in particular he may even need to know the specifics of the intended rendering environment), he could of course tweak a combined image with any means until it is fully satisfactory according to his desires. But the present embodiments cater for the many situations where that is not so simple or possible, e.g. because there is no time to do all that amount of tweaking manually, or some input or variables defining the optimal look are not controllable yet, or not even known. Something can always change to the image handling situation, so that is what the most advanced HDR handling technology should cater for. Or at least our embodiments allow for more versatile applications, in which at various moments colorimetric fine-tuning can be done, e.g. according to new desires, and one can retain some of the original image look information. That is important, that one retains something of at least the most important aspects of the images at each stage. Of course the end user could decide to totally recolor the video, but then all the content creator's efforts have been bypassed and lost, and that in fact is useful for nobody (even if e.g. a TV maker wants to add somewhat of his own particular taste to image rendering, he should not necessarily do so by ignoring everything that the image is about, in particular what the content creator specified about the image; but on the other hand the receiving side should not feel that it has absolutely no say whatsoever about the image colorimetry, even if it clearly seems to be inappropriate for the situation).

Figure 2:
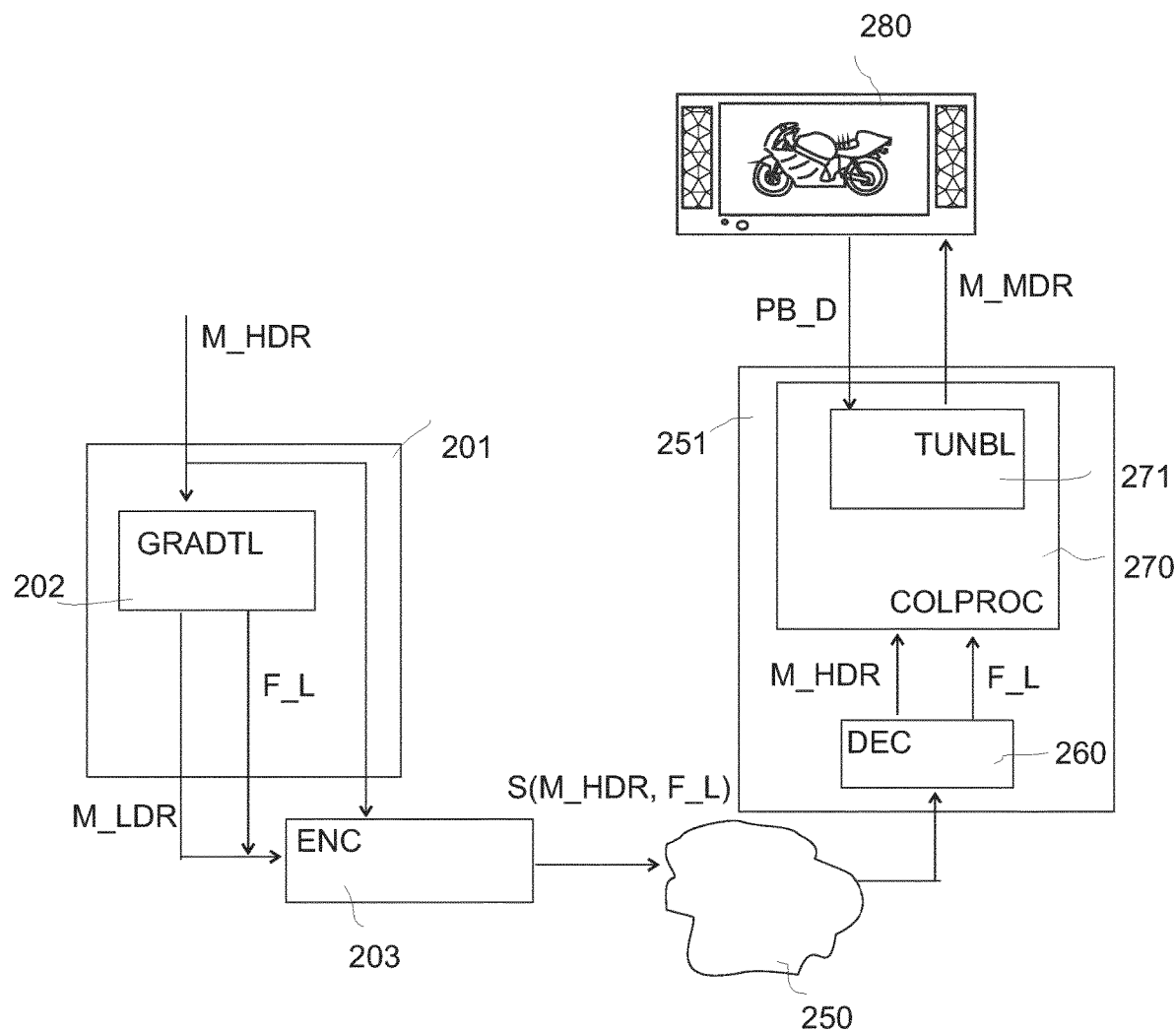
FIG. 2 schematically illustrates basic components of how applicant's HDR coding technology can encode a HDR image, together with an LDR lower luminance different look (or color grading) of object brightnesses of the same image HDR scene, and how this information is sufficient to calculate an appropriate look with the correct image object brightnesses on any available HDR display with any peak brightness (PB_MDR)

Decoder 251 is again similar to what we elucidated in FIG. 2, i.e. it can handle (HDR, LDR) image gradings according to our explained HDR coding method (extract luminance mapping functions, determine new MDR re-graded images therefrom, etc., according to the various possible image-global or local embodiments). Of course the reader understands this is merely elucidating one of the possible realizations, and the apparatus would typically be able to handle (i.e. decode and combine) all kinds of HDR or LDR video or images, i.e. Im_HDR could also be defined according to the PQ EOTF, or the BBC-HLG method, etc. In this example however we assume that from some (second) image source 351 (e.g. a satellite broadcast channel, or a connection to a video storage over the internet, or even a connected camera, etc.), the second one of the two images to be mixed is obtained (e.g. the main, most important (leading) program being a HDR movie which is accurately artistically color graded), and e.g. it is a 5000 nit PB HDR grading of which the images are transformed with a PQ EOTF, and then DCT encoded, and encoded according to some HEVC profile and level. Also metadata is communicated which comprises the functions F2_L for downgrading this HDR image to a 100 nit LDR image. The decoder can make an optimal image for a connected display, e.g. a 2500 nit MDR image, Im2_MDR. This would be the correct grading in this movie is being watched on its own, without combination with any other (first) image data, whether spatial or temporally interspersed.

Figure 7:
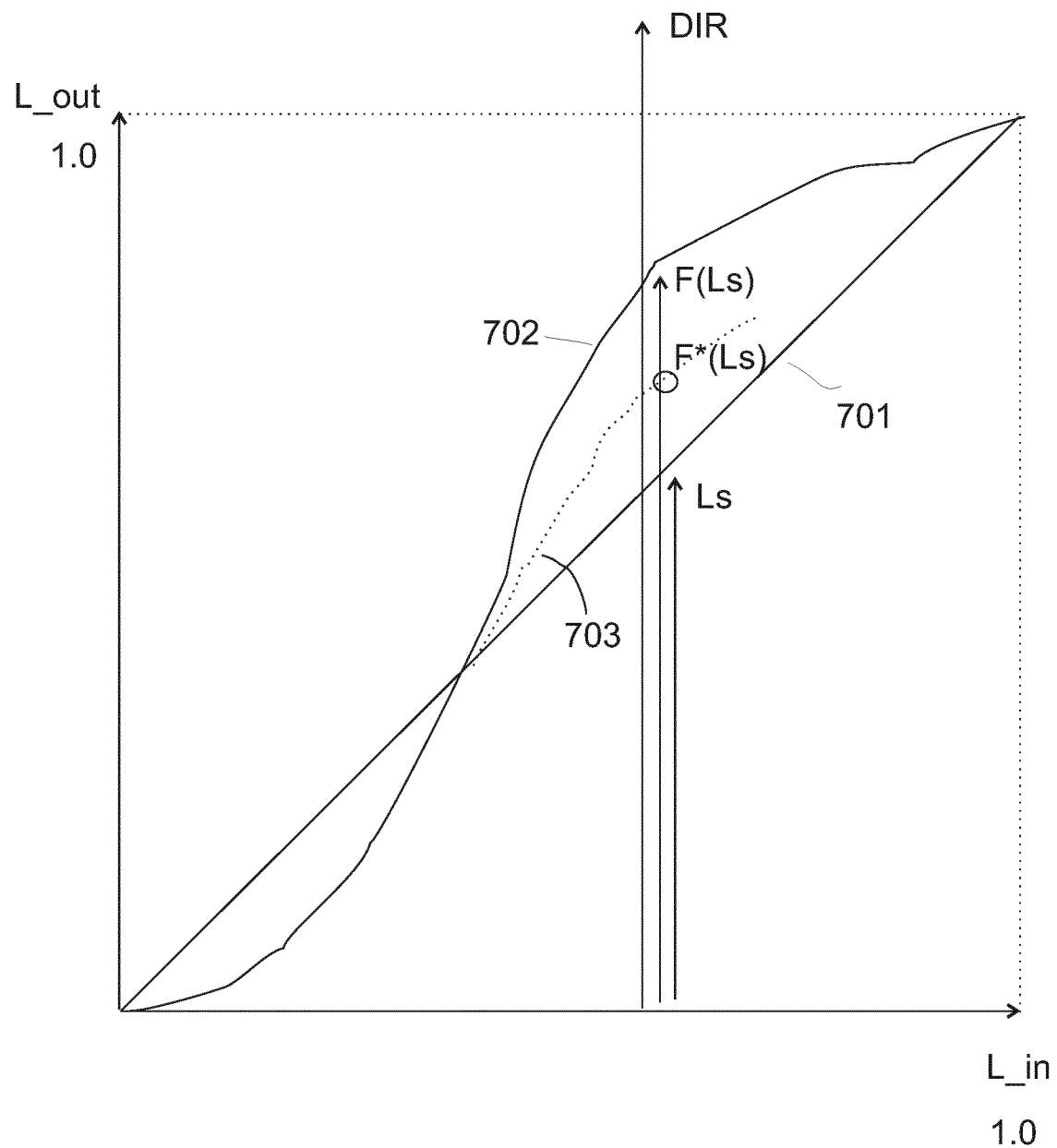
FIG. 7 schematically illustrates which algorithms one can use, as developed by the present applicant's inventors, to artistically optimally re-grade automatically, as desired by a content creator, an image from a first dynamic range to a different second image, of which the dynamic range (at least its peak brightness) may differ by several factors of two.

In FIG. 7 we summarize how according to one of our embodiments one can do such a re-grading from a first dynamic range look to a second one. Suppose L_in are normalized [0.0-1.0] HDR input luminances, which correspond to actual (to be rendered on a display when rendering the HDR image) luminances 0-5000 nit. L_out is a LDR luminance, normalized, but corresponding to a PB=100 nit (i.e. an SDR luminance). The function 702 mapping this HDR to this LDR image is an example of a F2_L color in particular luminance transformation (one can assume for simple understanding one merely has a grayscale image, but we have shown one can apply the required color transformation on RGB colors in this manner too). Suppose we want to derive the optimal re-grading function 703, which corresponds to a MDR display's PB_MDR of say 3400 nit. The diagonal line 701 would be the required luminance mapping if we wanted to map the 5000 nit input image into an image optimal for a display of PB=5000 nit, because the HDR image is already graded optimally for that display (i.e. it is symbolically transformed by an identity transform). We establish a derivation direction DIR, e.g. vertical. The scaled function for a display PB of 3400 nit, should give a value F*(Ls) for any input luminance Ls which is in between F(Ls), i.e. whatever the optimally determined downgrading function F (F2_L) happens to be in that luminance point, and Ls. We can determine this point to be Ls+FI(PB_MDR, Ls)*(F(Ls)−Ls), with FI being some function giving values between 0 and 1, and in simpler scenarios being only function of PB_MDR, which can also be written in a multiplicative manner as k(PB_MDR)*Ls. Which function exactly is used depends on the re-grading philosophy of the used embodiment, and the reader can imagine there can be various more or less complex embodiments depending on whether e.g. viewing environment specifics (or even viewer preferences are taken into account), but the details of that are beyond what this application needs as explanation, which is already complex enough (the reader should just understand that some re-grading function can be established, and applied to the input image, to obtain the correctly re-graded image with correct image object luminances for a MDR display).

As said the first image can be anything, but we will elucidate the principles with an LDR commercial, the principles of our embodiments being similar for other content. This 2500 MDR may not be the appropriate grading (i.e. 2500 may not be the appropriate PB) when mixing with a 100 nit LDR commercial, at least because of the huge difference in dynamic range of the two images, but also because of the possibly extreme distribution of the object luminances in the LDR commercial (i.e. 2500 nit may not be the best LMC value for the CombRng, but then another value can be chosen). One should understand high dynamic range not only as "high", i.e. bright, but also in terms of "dynamic", i.e. where on the luminance axis the creator has allocated the various semantic objects and/or regions in the image(s).Contrary to popular misconceptions, showing an image merely with high brightness can still result in a rather flat LDR-ish appearance, and an irritatingly bright one even, so more tight control over all or many in between grey values is desired. E.g. the creator of the commercial may have made the LDR commercial extra bright and flashy, to give it a high visual impact on 100 nit LDR screens. But this impact may be too high even on 2500 nit dynamic range (let alone on a 5000 nit PB_D display for a viewer who has bought such a display), so e.g. CombRng taking into account both the need to show nicely bright lamps in the movie, and the extremeness of the LDR grading, may for that case need to be e.g. 1500 nit LMC. The apparatus can use methods such as measuring the global contrast of the LDR image, e.g. counting how large the amount of pixels above k %=e.g. 80% luminance in the LDR image is, how often high and extreme the average luminance is, or how the amount of pixels above k % varies, etc., and therefrom determine an extremeness measure, and therefrom determine e.g. at least how bright the brightest parts of this LDR commercial may ultimately become when mapped to the CombRng, and e.g. therefrom determine what LMC must be (e.g. the brightest pixel of the LDR pixels can become 300 nit, depending on what non-linearity one uses, or depending on what amount of brightening is needed for collocating the face luminances, and the brightest Lambertian pixels of the HDR movie (i.e. identified in the lower range of that movie, e.g. as 5× the encoded middle grey of that main region for the HDR movie) can e.g. become k times more or less, i.e. e.g. 200 or 450, and the bright lamps may become 5× the 300 nit, giving an LMC=1500 nit).

The skilled reader understands that there are various manners to come to the CombRng (or anc), e.g. it can be determined primarily by the HDR movie, and then a determination how to coordinate the LDR image with the HDR movie mapped to that CombRng (as the first described examples above taught), or as exemplified here it can be determined primarily or to a large extent by the LDR image characteristics, whilst safeguarding sufficient quality of the HDR images when determining how far the brightest HDR objects can extend above the brightest or average colors in the LDR image, or iteratively until a reasonable optimum for the two is found, etc. That all depends on the needs of the particular situation, and the particular combination apparatus embodiment behavior. Which of the two images has the highest importance can be preset in various manners, e.g. the viewer can in some embodiments with his remote control indicate that he wants minimal disturbance of his movie by whatever images will be combined, or content creators can give indications about their content, which the combination apparatus finally decides on, etc.

Returning to FIG. 3, a first image source 350 delivers the first image(s), which we assume to be an LDR image Im1_LDR, i.e. encoded in a standard manner e.g. according to Rec. 709 (of course there may be a decoder unit, which is not shown for it). It may, in case it's a recent video, have been annotated with its own functions F1_L for converting it to HDR, or it might not be annotated, in case it's an old SDR video. I.e. it may have functions F1_L associated in its metadata, allowing the artistically optimal conversion to other dynamic ranges than its native 100 nit DR. In case functions are missing, the combination apparatus can always apply averagely reasonably well-working functions, and estimates. Again the image source 350 may be various sources, e.g. a security camera on the front door of the viewer's house may PIP an image when somebody rings the doorbell, etc.

As explained, according to one of various possible algorithms, a dynamic range establishing unit (302) analyses the situation, e.g. the luminance characteristics of the first and second images, and establishes a suitable combination luminance dynamic range (CombRng), in the above example with LmiC=0 nit, and LMC=1500 nit. A luminance anchor determining unit (303) will determine an anchor luminance (anc). E.g., it reads from the first image source in metadata associated with the first image a source anchor luminance (L_SA1) of the type "face luminance", this value being e.g. 45 nit. Knowing that for at least one of the images faces seem to be important, it then needs to establish which would be a good face color anc in the CombRng (of course other embodiments can decide on an anc first, even without looking what source anchor luminances where specified, or when seeing that the anchor luminance was e.g. an average grey in a bright outdoors sub-region, it may determine for the CombRng an overall average grey, and a d_anc position on which to position bright outside luminances compared to an overall neutral rendering of colors in the CombRng. Depending on the complexity of the embodiment, a typical embodiment may want to check what the value of a second source anchor luminance L_S2A1 of the type face color indicates how the face colors are currently in this shot of the movie. On a normalized luminance axis this will of course be a lower value, because the upper range is used for HDR effects like brightly lit objects or regions, or lamps. Still, if a reasonable value in a range of diffuse objects up to e.g. 400 nit would be 180 nit, and we find a value of only 30 nit, we know that we either have a dark face by nature or a dimly lit face, or both. In any case, even if that face should look darker than the one in the commercial, it will be much darker if we decide to place our anc value at e.g. 180*1500/2500. So we may want to calculate an anc value which is somewhat closer to the 30 nit, position the LDR face luminance at or around that e.g. 0.8*180*1500/2500 nit value, and have the HDR face colors mapped closer to that anc value too, e.g. 0.3*180*1500/2500. This guarantees that we have appropriately dimmed faces for the LDR image, and appropriately dark faces, as they should be according to the story, for the HDR movie, and both coordinated according to the optimal anc value. Of course the same can be done by taking into account other or additional anchor luminances, such as e.g. a middle grey for a specifically HDR-lit region.

Having established a CombRng with an anchor luminance anc, the only thing still to do then generically is to optimally map the two images into that dynamic range according to one specific luminance value which is determined because it should fall on or around the anc value. One way to do this is with a linear allocation of the luminances, with an optimally determined contrast value C, which is the slope of the line of the luminance mapping function, and then allocate luminances by calculating the linear equation until clipping occurs (and the amount of clipping can be controlled together with the C value; note that one can clip to some value within the CombRng, i.e. below the maximum value LMC). The down-mapping to the CombRng in this example can also be done by taking into account the same mathematics as the decoder 251 uses, namely by using at least a luminance mapping (F2_L) with a shape which encodes the needed behavior for the brighter and darker parts of the image, as determined by typically a human grader. E.g., once one knows the CombRng, one could have the pixels corresponding to the second image mapped by decoder 251 immediately from the 5000 nit HDR image Im2_HDR. The color transformation unit (310) is arranged to do all necessary pixel color transformations, in particular at least appropriate luminance adjustments, so that the combination unit (320) can apply simple algorithms (e.g. be a simple additive weighing or pixel replacement or switching unit, because all the colorimetric optimization has already been done). A source anchor luminance reading unit (311) will at least read one source anchor luminance associated with one of the two images, e.g. a face luminance of the LDR image, or a good average value for the blacks in the imaged scene, etc. As shown above, it can in some embodiments also read a number of source anchor luminances, which are characteristic of special luminance regions in the images (e.g. a special grey value, or a grey value associated with a common semantically important object, such as an average bright or dark sky luminance, etc.), from both or in general all images. Since in some less simple scenarios one does not want to map the luminances of the two images based on equating just one similar anchor luminance (anchored to anc), but rather one wants to smartly position the output luminance compared to anc, a deviation determining unit (312) is arranged to determine an appropriate luminance offset (d_anc). As exemplified, this may be e.g. because the commercial contains a highly lit and contrasty face, and the horror movie comprises a muddy dark face, and e.g. if anc is determined close to the luminance of the dark movie face, then one wants a sufficiently large positive offset d_anc for where to map the face colors of the LDR commercial face. Intermediate correctly luminance-mapped images Im2_HM and Im1_LM will then go in the combination unit (320), which may then e.g. be as simple as a pixel switcher, which dependent on the (x,y) position of the pixel either puts the mapped HDR color (i.e. Im2_HM) in the output image Im_o, or the LDR Im1_LM color, whether as linear RGB, or recalculated into an Y'CbCr, etc.

Figure 4:
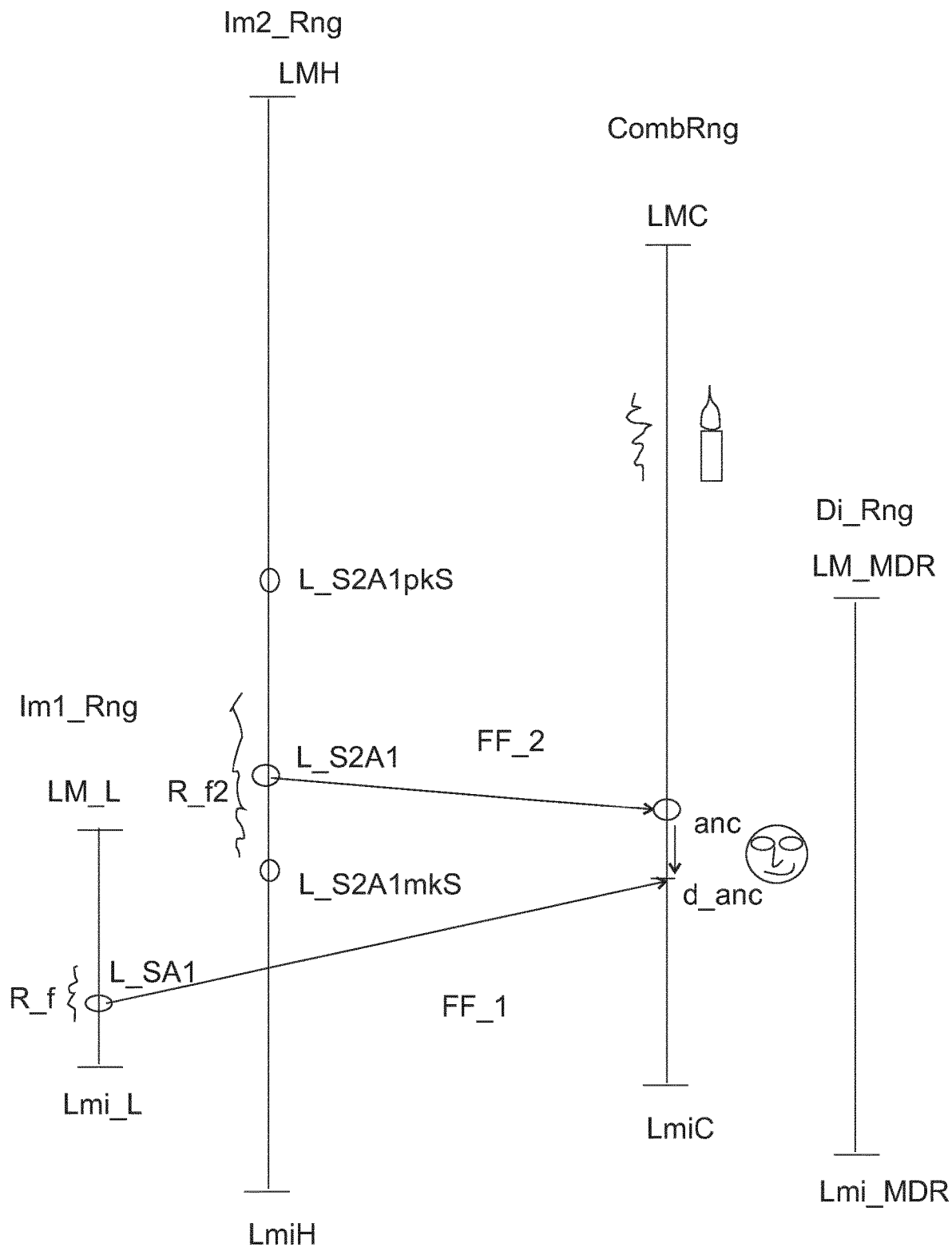
FIG. 4 schematically illustrates how the appropriate color transformation to the optimally chosen combination dynamic range happens prior to the video or image combination.

FIG. 4 clarifies everything further for the chosen example, by showing the mappings on the luminance dynamic ranges. Im1 Rng is the LDR 0-100 nit dynamic range of the LDR first image, i.e. having luminances encoded which must fall between minimum luminance Lmi_L=0 nit, and maximum luminance LM_L=100 nit. Im2_Rng is e.g. the dynamic range of the HDR image with LMH=5000 nit (or it could be the display-optimized MDR image in which case LMH would be 2500 nit in the above example). It can already be seen from this that there is no need that the CombRng should be in any way the same or close to neither the Im2_Rng nor the range of the display Di_Rng. This display range is shown for comparison, but it may in some embodiments not even be used in the combination, but then rather Im_o will go to a display tuning color transformation unit to map the combined output image Im_o defined up to e.g. 3000 nit onto a display dynamic range of e.g. 1400 nit, or whatever the values happen to be (the skilled person understands that there can be scenarios where LMC is higher than LM_MDR, e.g. if the combination was done in another apparatus, e.g. in a cable head-end, and a particular user has a HDR display with limited PB, e.g. 950 nit; or, in case the mixing happens all at the viewer's location, and the viewer has a display with high PB, e.g. 7000 nit, but currently receives content of a HDR program like a news program with PB=1200 nit, or less, and an LDR image, then LMC may be determined to be far lower than LM_MDR=7000 nit). The tuning functions can then e.g. be the ones for the HDR movie content (i.e. F2_L), since the LDR commercial will already have been sufficiently harmonized with it. Of course more complex embodiments may directly optimize both images to the display dynamic range. The reader will understand that there are situations where the CombRng can't even be e.g. the display dynamic range, e.g. at a production or video transmission site, where the viewer's TV specifics are not even known yet. That is one of the complexities the HDR market has created, and that will need to be catered for. In the LDR era all televisions were approximately equal (with PB around 100 nit), so video handling was simple, but now some viewers can have a 1000 nit HDR TV, others a 7000 nit HDR TV, others a legacy SDR 100 nit TV, whilst others like to watch the images on their Ipad or mobile phone, with a PB of e.g. 500 nit (not yet starting to divulge on all the details of the various image content). It should be understood that alone by their huge variance, those display dynamic ranges cannot all trivially always be the most appropriate CombRng for combining the two images and representing both optimally. But also, especially if we have to ultimately render on say a 1000 nit TV or monitor, would it be the most optimal if we were to upgrade and combine an LDR all the way up to 5000 nit image 2 HDR dynamic range, if we then subsequently have to significantly downgrade again, and risk, especially when using the F2_L functions, losing some important part of the brighter LDR colors?

Figure 5:
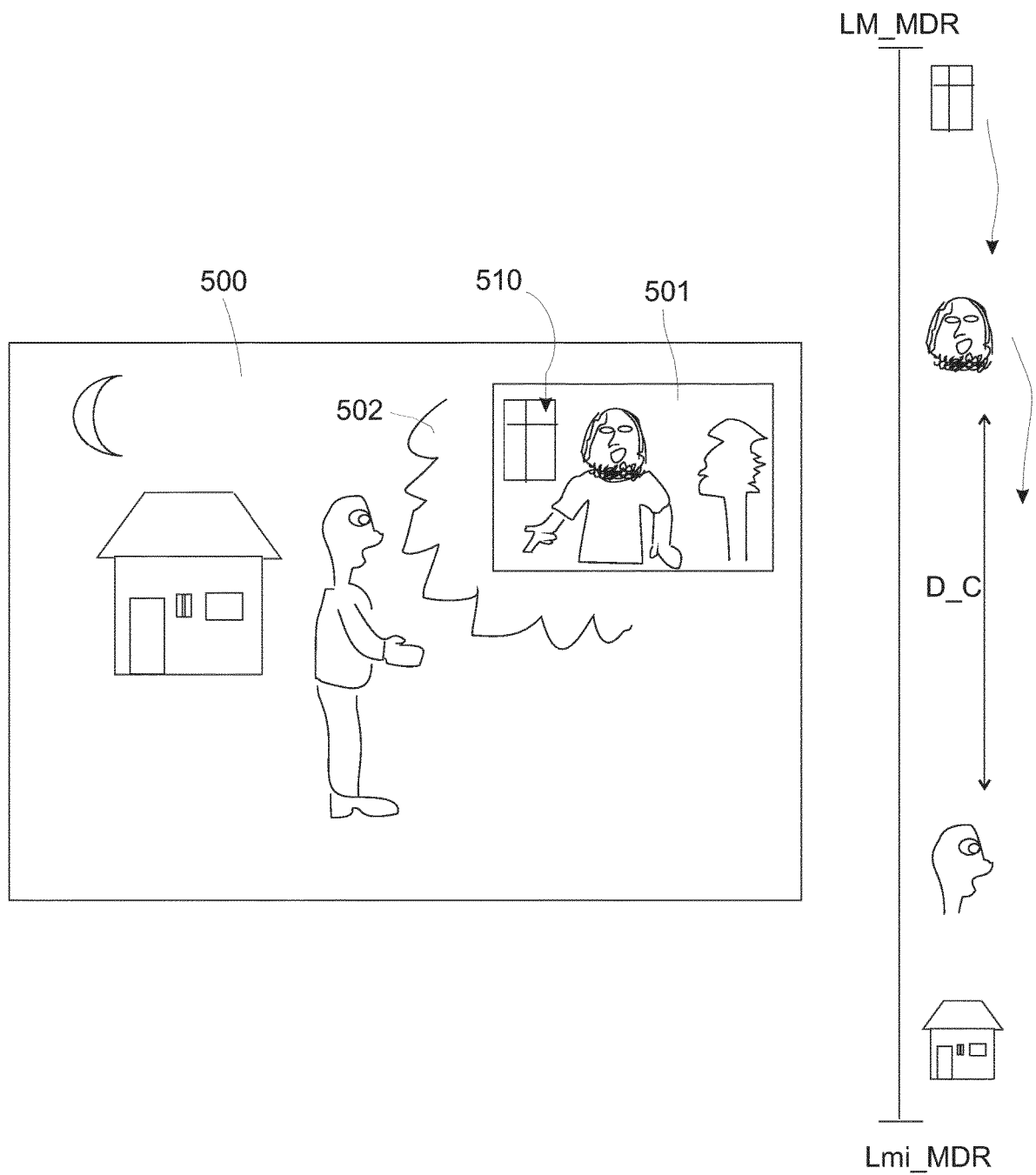
FIG. 5 schematically illustrates what problems can occur if one doesn't carefully colorimetrically prepare the pixel luminances (or in general colors) of the two images, but rather combines them in a simplistic manner, for one of the possible combinations being a picture-in-picture composition.

We explain that a little further with FIG. 5, which uses a PIP 501 example (but similar issues happen e.g. with temporal masking and adaptation, etc.) in a main region 500 of a HDR movie.

Classical LDR combiners can do their combination in Y'CbCr (i.e. luma+2 chrominance coordinates), non-linear R'G'B', linear RGB, or in principle any color space (although that may be less typical for systems which need to work on video speed, yet also want to save on calculation resources). Let's assume we have a grey-value image.

In case one would simplistically switch per pixel the luma codes Y' of the pixels, that would lead to very bad results, because those are determined so very differently for HDR and LDR images (it basically becomes a major misunderstanding issue of the handling apparatus). E.g., everything seen through window 510 in the LDR PIP (let's say being a director's commentary) may have been clipped to the maximum luma code, Y'=255, or 1.0 normalized, because it is too bright for LDR and not interesting in that sole video anyway. When rendering the combined image Im_o in a luma encoding, wherein some of the normalized pixel lumas of originally HDR movie (say a dark night scene) pixels have been replaced by the normalized lumas of the LDR image, by decoding it with the e.g. PQ HDR EOTF, the PIP will look excessively bright (the window colors would become rendered as e.g. PB_D=4000 nit, where one could alternatively in principle have nicely harmonized outside object colors, or at least less irritatingly bright clipped colors). This will lead to over-radiating 502 also called bleeding or light spreading. If this is not already due to the physics of the display (e.g. low amount of backlight LEDs, interreflections on display front plate), then often the glare in the human eye can also result that very bright regions on a HDR display difficult to watch without using one's hand to block the bright area. In short, the viewer doesn't like it, and prefer otherwise, if technology would make that possible. At least, it should be clear that those luminances of the LDR PIP and the dark regions of the night scene in the HDR movie are not well-harmonized. But the opposite may also happen. If the PIP is next to a sun in the HDR movie, or other very bright part, it could be too dim. What can also be ugly is e.g. that colors which are clearly supposed to be white, are looking too greyish. If as shown on the right we decrease the luminance of the PIP face by bringing it closer to the luminance of the dark HDR face, by the fact that the luminances of the other objects in the LDR image are related to the face color (in contrast ratio), they will become more suitably dimmed too. So all colors should look relatively nicely coordinated.

One may naively think that all problems can be solved then by allocating the proper LDR sub-range to the PIP image (i.e. the sub-range of 0-100 nit luminances, as it would fall in the HDR CombRng, whatever that may be), which corresponds to correctly decoding it with the Rec 709 maximized to a LDR PB of 100 nit, rather than the (relative) display PB of say 3000 nit, and then making those LDR pixels have luminances up to maximally 100 nit on the display dynamic range (assuming that the CombRng is taken to be equal to the available display DR). But as said, although in some situations that may be a good choice, that leaves the decision dependent on what the display dynamic range actually is (seen relatively, it becomes a random relationship). For a very bright sunlit scene, it could happen that adjacent to the maximally 100 nit LDR PIP, on a 3000 nit display there are adjacent objects with say 1500 nit luminance. This makes the PIP rather disappointingly dark, and its colors will look muddy rather than vivid, which is not what the person who paid for the commercial would hope for. The same could happen when combining in the HDR image dynamic range (Im2_Rng). So it will be understood that appropriate mixing is not a trivial thing, i.e. a good framework as in the present invention is needed. Also when having two HDR images, even if the EOTFs were not that different, one still wouldn't be sure how the content creator used that available range, i.e. colorimetrically designed his total system (content production rules, etc.). Even if the PB of the two encodings didn't differ too much, e.g. 5000 vs. 4000 nit, the creator could still have made significantly different decisions (for good reasons, e.g. for making his particular story with nicely designed HDR scenes look spectacular, versus another creator making a news show easily convertible to other dynamic ranges, e.g. for viewing on portable displays, yet while the images should still have some HDR punch in them) about e.g. the lower range in which the Lambertian reflecting objects of say an indoors scene fall. The first creator may have defined those up to 300 nit (on the 4000 nit system), whereas the creator of the second image may have decided for his scene, e.g. the indoors being some space station, going up to 900 nit (on the 5000 nit system). It can be as simple sometimes as whether you like bright, or eerily dark space stations. Even if they followed very strict rules regarding the lighting or at least rendering luminances of the faces, e.g. 50% of diffusive white (i.e. the 300 or 900 nit), without the proper harmonization faces in the combination might look considerably, even weirdly, different, possibly even glowing. And the same could happen to the many other colorimetrically critical objects HDR images can contain, e.g. should a swimming pool appear somewhat glowing and lit-from-within, or just dull plain water, or how dark should a night scene be, or how misty a day, or somebody may even care about the luminances on a lit poster at the front of a beverage vending machine, especially if that relates to other objects in the scene, and the story and mood communicated, etc.

Figure 6:
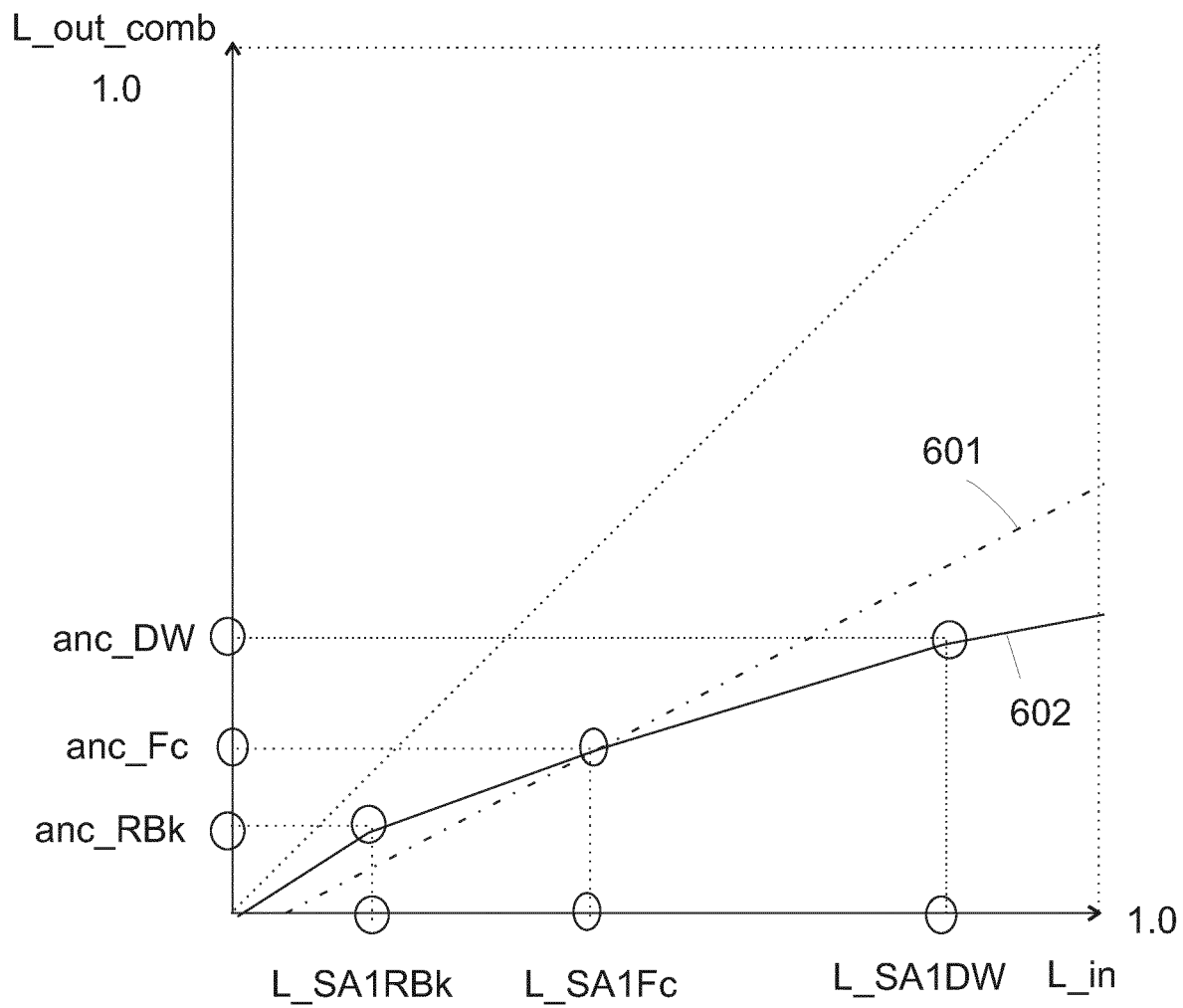
FIG. 6 schematically illustrates how the apparatus can determine some exemplary appropriate color, or at least luminance, transformation function(s) (FF), for at least one of the at least two images to be combined.

FIG. 6 illustrates two possible examples of the color transformation to the CombRng. We have as input image one of the images to be combined, with relative input luminances L_in. As explained, the apparatus needs to determine a color transformation function (FF_1), which allocates an output luminance L_out_comb in the CombRng to all possible input luminances. Having this function, e.g. loaded in a LUT, one can then start processing the incoming pixel colors for the successive images. A first simple linear determination yields the linear function 601, determined by the two parameters anc_Fc for the face color luminance L_SA1Fc in the input image, and the multiplicative contrast constant C. This function can clip in the black or white, which may or may not be desirable (again depending how simple the deciding party wants it, whether that ultimately be the content creator, or the apparatus manufacturer). In more complex embodiments we can improve upon that. Luminance mapping function 602 shows how we can nicely configure the desired mappings based on only a couple of important anchor luminances. That would in general, although not that much more difficult to use, produce far better results. Perhaps this commercial LDR image had too much bright pixels, say in the background. When applying particular photographic composition rules one can elect to photograph the main person against darker or lighter background, e.g. an average grey background, or a very light or white background, or potentially even a dark background. Oftentimes in video that will depend on what the actual background is (e.g. if the video is a reporting about a fashion photographer who is going to shoot his model against a white background, the video will show him talking in front of the white walls or backdrop which will be photographed). In studios the background may have been designed. In a weather announcement, the weather man may be standing in front of a (virtual typically, by green screen) rendering of a photo which has been submitted by a viewer, a non-professional. Or in a movie somebody may be sitting in front of a bright publicity screen, e.g. a LED screen, for some reason, etc. This is another example of a need to coordinate—somewhere—because in the past one would show a nicely coordinated LDR photo in a LDR weather show, but soon viewers may send HDR photos for shows which are still produced in an LDR manner, or a couple of years from now somebody may send a very low quality LDR photo to be shown hence mixed in a HDR program. In any case, for the curve 602 we supposed there would be many too bright pixels in the LDR image to be PIP-ed. We may not only need to lower the output values of the function 602 for some white, but also e.g. start soft-clipping for the brightest input luminances. So curve 601 would yield results which are too bright. The apparatus (301) has done this by reading three types of source anchor luminance in the input image, and allocating them to respective anchor luminances in the CombRng output image. Namely, the content creator has also specified a good reference level for diffusive white, i.e., which luminances in his image correspond to Lambertian reflecting objects which are white (i.e. with a reflectivity of e.g. 90%), and which are averagely lit. The apparatus will allocate for this LDR image an anc_DW luminance for the diffusive whites of the LDR image in the CombRng, which is explicitly lower than what the linear luminance transformation curve 601 would yield. So the combination apparatus can now smartly decide how to luminance transform such bright image pixels, given whatever it has determined as particular needs for those brighter pixels in the combination image. A similar appropriate behavior can be specified on the dark end, e.g. in this case to avoid the clipping, by specifying a priori in the content a black anchor luminance L_SA1RBk, and determining at the time of combination a suitable black anchor luminance anc_RBk. The apparatus can then e.g. decide to continue the function linearly to absolute black (i.e. 0.0) from this anc_RBk point, and make it ascend with a very small slope above anc_DW. Or it can optimize the blacks for a specific rendering situation, with the knowledge of the L_SA1RBk source black anchor luminance.

We elucidate a couple of possible more complex examples with FIG. 8, namely how some of our apparatus and method embodiments can not only design multi-segment functions based on various anchor luminances, but also determine the shape of parts of the luminance transformation curve (FF) based on the behavior of re-grading as specified in the color transformations functions (F2_L, and if available F_1_L) as co-communicated with the image from the creation side in metadata.

We can assume that the function (FF) determining between the three anchor luminances happens again as before (by linear, or non-linear interpolation), but that the apparatus is going to determine the luminance transformation behavior of advanced luminance transformation function 810 in FIG. 8B based on knowledge obtained about the grading by the content creator from the received metadata (F2_L). F2_L is now the luminance transformation (for the second image, but the same can be understood for all other images to be combined in the combination output image) of the second image, from its native dynamic range (DR1) to another pre-specified dynamic range (DR2), i.e. input luminances L_DR1_im2 are related to output luminances L_DR2_im2, which is another dynamic range look for that same imaged HDR scene). We can see from the graph that there is a main part (between anc_DW and anc_RBk), which is represented (will be rendered) well with good sufficiently bright and contrasty luminances (for the combination situation), but that the blacks (below L_SA1RBk) can be easily discarded at least for some looks corresponding to some dynamic ranges, because the function quickly drops to zero, and clips. I.e., there will in this example not be very important objects in this sub-range of the darkest luminances. The apparatus can use this to determine its appropriate function 810, e.g. by quickly dropping the function for these dark blacks, and it can decide this based on how dark or contrasty it wants the combination to be, or at least the second image part in that combination image (e.g. based on the amount of pixels with luminance below L_SA1RBk there are in that second image, or after appropriate combination, e.g. scaling, in the output image Im_o, etc.). I.e. the combination apparatus looks at the re-grading behavior of the received two graded images encoding (i.e. how the darkest pixel luminances are handled when re-grading from a master e.g. 5000 nit PB_C graded image, to a SDR 100 nit grading, in that part of the shape of the received luminance mapping function), and determines a partial shape which is similar to some degree.

We have also illustrated a possibility for the brightest pixels. The discontinuity in the curve F2_L_indicates that there clearly are two regions, e.g. the Lambertian objects in the indoors scene, and bright colors which represent lamps (or similar situations). Especially if we have lamps, that means that we can more liberally allocate their final luminances, depending inter alia on the dynamic range we have available on the MDR display and/or the CombRng. So the apparatus can determine an appropriate average level L_RefB for those pixel luminances, and finalize the 810 curve shape as such. FIG. 8A shows how the received luminance mapping function F2_L for mapping between the master HDR and SDR gradings as received looks, with correspond bright partial (802) and dark partial (801) function shape and behavior.

The skilled reader understands that the present various embodiments will be applicable in many systems and to many combination scenarios, and with the various components in various combinations, but we elucidate some exemplary further possibilities with two Figures.

Figure 9:
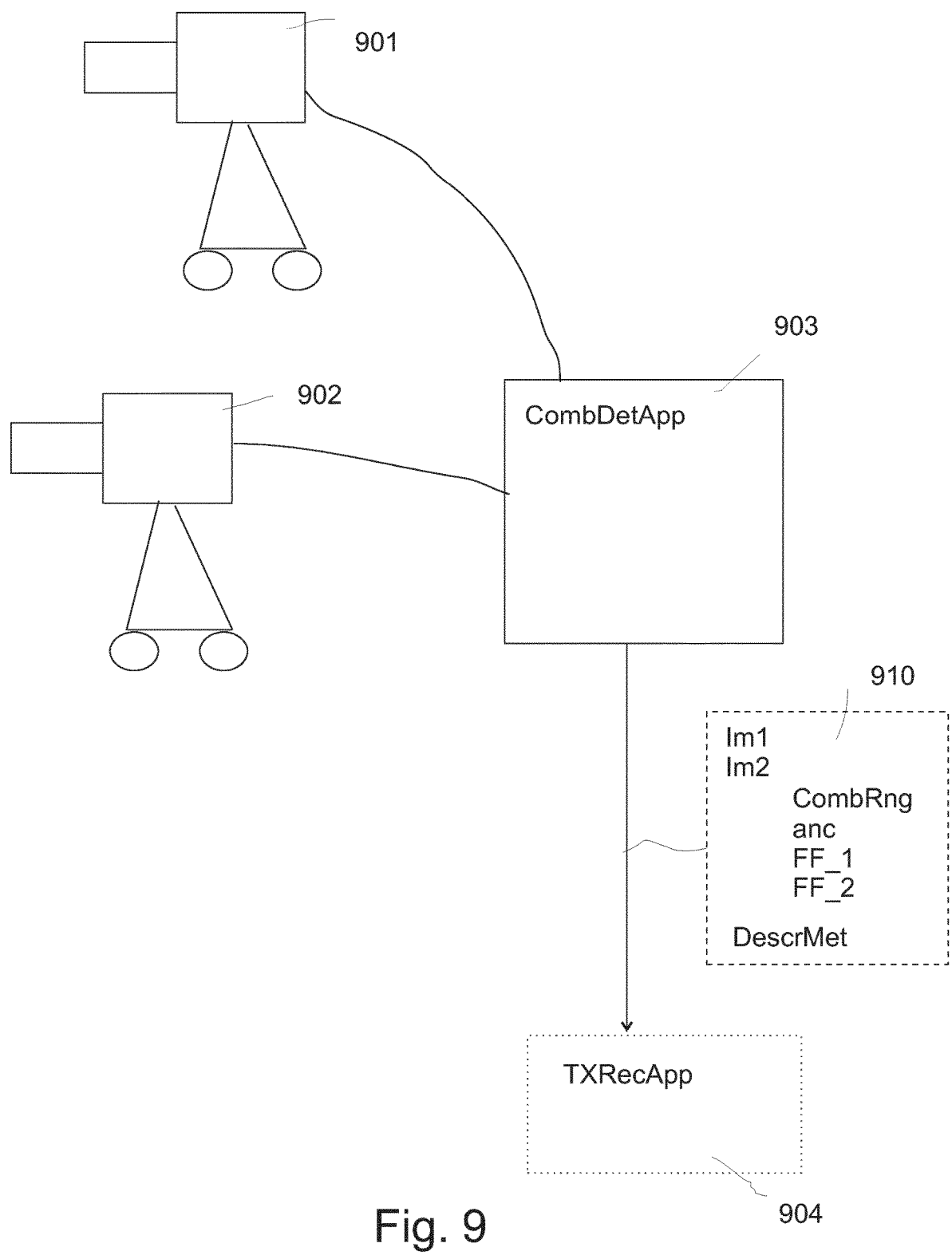
FIG. 9 schematically illustrates one example of an application of an embodiment of the presently described apparatus and method, namely in a multi-video original production, such as e.g. a talk show for TV.

FIG. 9 shows an example of a television production system. This may be a multi-camera studio production (first camera 901 and second camera 902), and some live content may come in from location, etc. It may also be a field production, with an OB van, etc. The technical director needs to mix camera feeds, and other videos, some of which may be HDR, and some LDR e.g., and the HDR videos may of course, contrasting with the LDR videos which are of a single type (the universal single Rec. 709 standard which existed), be of various types and characteristics. He wants to determine the optimal combination, on a combination determination apparatus 903, which may reside in a production control room. Although he determines a combination, we show in this example that this combination need not necessarily result in a fixedly defined Im_o (rather, the technical director only needs to determine a suitable combination, but the specifics of that combination can be communicated in various manners to various receiving sites further down the video communication pipeline, with receivers may even want to re-determine the combination in a different one, e.g. slightly different from the one preferred by the technical director; i.e. the combination may be communicated as rough image and function and other metadata, prior to combination). In that case, an image signal 910 with metadata may be communicated, which comprises the two images (e.g. with scaling functions to determine the decided PIP combination), and with the determined CombRng, anc, and possibly also FF_1 and FF_2 color transformations to map the images to the CombRng, so that any receiver (e.g. a transmission receiver 904, in some intermediate node, such as e.g. in a transmission control room) can actually apply the final combination. To allow potential re-determination (of at least one of CombRng, anc, FF_1, or FF_2), the production side may also convey further metadata on the video, e.g. whether it contains many bright scenes, that they need an additional 3× brightness above the average movie brightness (i.e. that is how they desire this content to be luminance-mapped in the final CombRng), specifics regarding object or region luminances, or semantic information, like e.g. the luminance range and/or location of the sky, etc.

Figure 10:
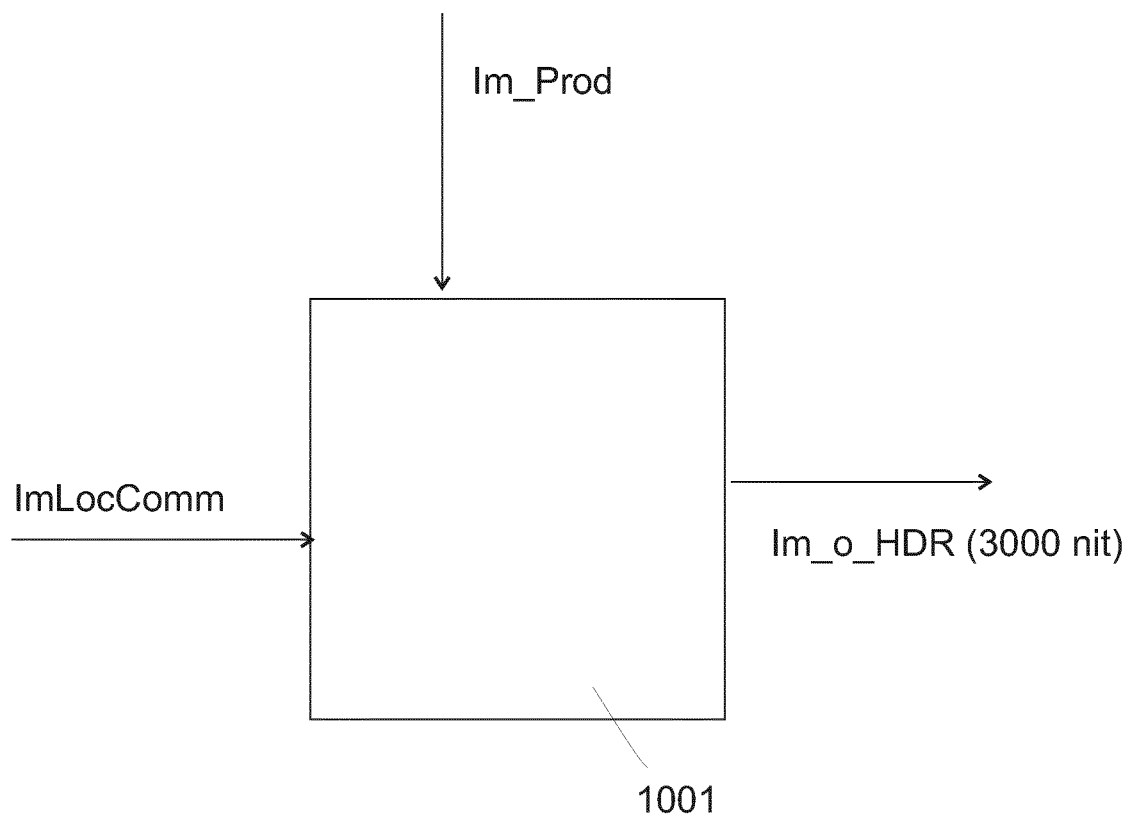
FIG. 10 schematically illustrates a second example wherein an embodiment of the apparatus and method is used in a system in an intermediate node of a video communication network, such as e.g. a transmission control room for servicing a local area (the reader should understand that other combination apparatus embodiments can reside at other places of the video or image handling chain, e.g. at the premises of the ultimate user of the video)

FIG. 10 shows another possible embodiment, namely an intermediate combination apparatus (1001). This may be e.g. in a transmission control room of a cable provider or similar. He may get the image(s) from the main production (as created in FIG. 9, and communicated either as final images, or initial images with sufficient metadata to appropriately combine them according to the director), namely Im_Prod, and e.g. a local commercial feed ImLocComm. The intermediate combination apparatus (1001) may potentially also do dynamic range transformation, e.g. to convert a 5000 nit Im_Prod into output images coded with PB=3000 nit, which may be more suitable for the purpose, e.g. the further distribution over some pre-established video communication system. The latter is of course more interesting if the apparatus 1001 outputs two separate image streams to be mixed later, yet in this example where we assume a final suitable image stream is generated (only to be display-tuned by the ultimate receivers), that will typically already have an LMC different from 5000 nit.

The reader can also understand how similarly a consumer-side system can combine HDR images or videos, e.g., a movie together with images received via a computer, and combined in an IC of a settopbox, personal computer, etc., or how the same can be used in video conferencing rooms, etc. Im_o of FIG. 3 can go to a television, one of the images may be received on a blu-ray disk via a BD player, etc.

Figure 11:
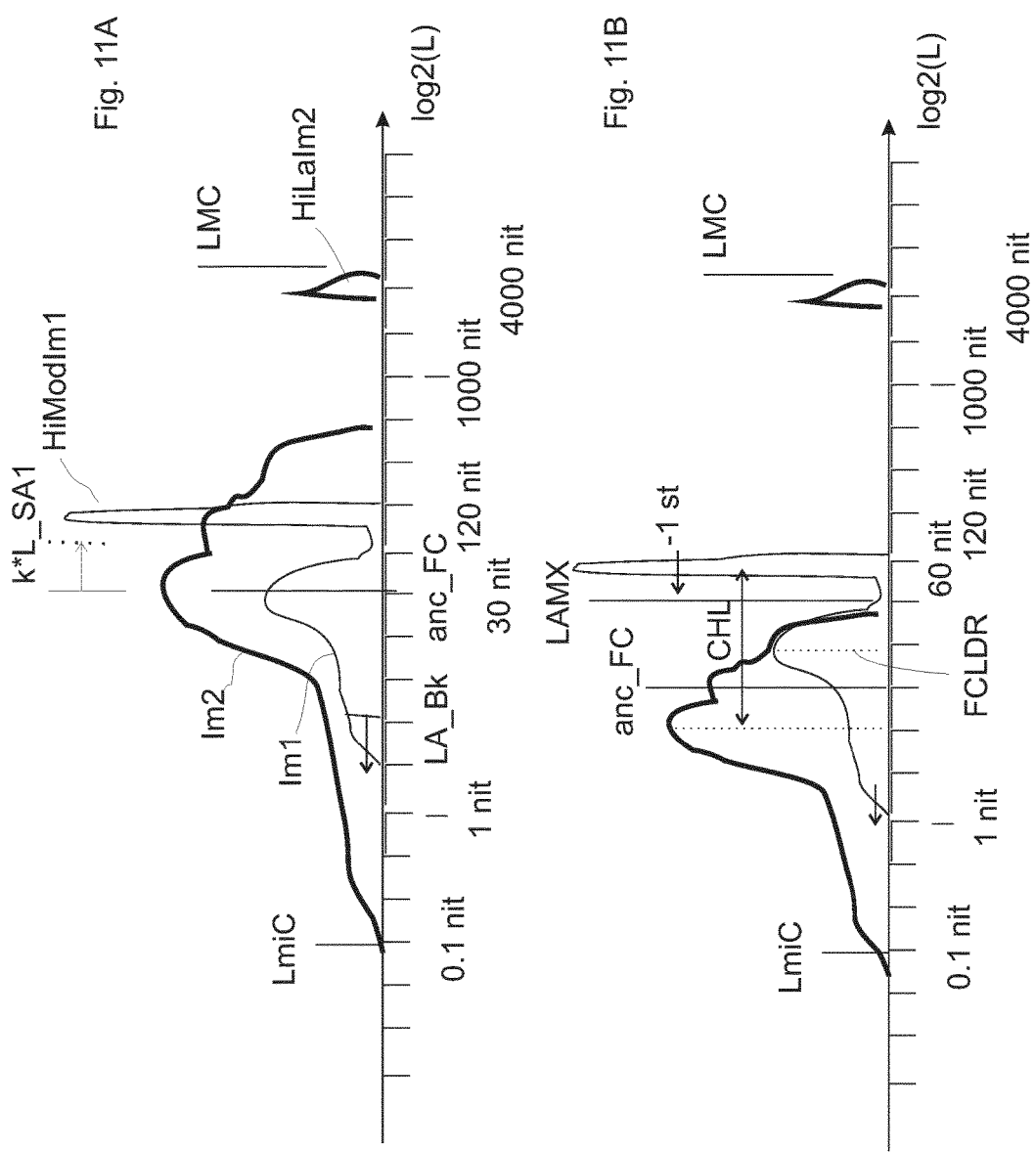
FIG. 11 schematically shows how apparatus embodiments can determine a CombRng, and allocate source image luminances therein, starting from a good position of a luminance value of an anchor luminance.
Figure 14:
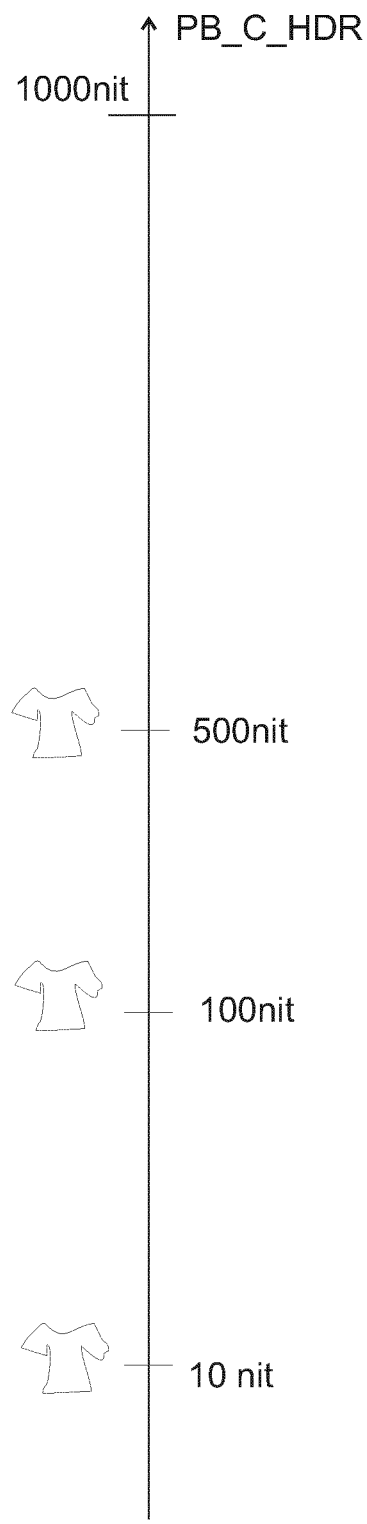
FIG. 14 schematically shows how even in one image capturing method, in particular encoded with one technical HDR video coding method, one could have very variable luminances for the same object, in particular if one wants to most liberally use the potential of HDR imaging.

FIGS. 11 and 12 give a couple of possibilities how to determine the CombRng. The luminance axis has been given in Log_base2 units, because this gives a better correlation with the human visual lightness and brightness impressions of the images if rendered. Algorithms for determining the various pixel luminances can also be advantageously formulated in such a logarithmic representation, actually some of our preferred video coding embodiments also work in such perceptually uniformized luminance representations. In these embodiments, the apparatus has already determined a good value for anc_FC. E.g. the apparatus assumes that the LDR value of approximately 30 nit will be a good value, also for HDR renderings. The apparatus will now look at the luminance distribution situation of the two images, combined with the particulars of the combination, to arrive at good choices for LMC and LmiC. The apparatus will have rules for this, which may be selected and varied e.g. by viewer control settings. The first two examples are where a higher dynamic range image (Im2, shown with the thicker line) is the main image, and a lower dynamic range image (not necessarily SDR) Im1 is a PIP, e.g. taking up ¼ of the area (which is one of the control parameters which can indicate visual dominance of objects or regions of the Im1 compared to the objects in the scene of Im2. In these examples the apparatus will want the look of the HDR Im2 to dominate, so it will determine the CombRng and the placing of Im2 in it first, and as guiding, and then harmonizedly place Im1 on it. In these embodiments the face colors have already been allocated to the optimal final face color anc_FC, so the remaining question is about allocating the rest of the luminances. This will be influenced both by the extremities of CombRng, and the therefrom arising color transformation functions to luminance-coordinatedly fit in the other luminances, and the variability allowed for changing the shape of those functions as brightness impact requires so. In FIG. 11A, the HDR Im2 has a histogram which is already well-conforming to a typical scene with a face when rendered around anc_FC, i.e. the face in Im2 is normally lit. We see from the long tail to the blacks that there are dark areas in the scene, e.g., this may be an unlit room somewhere behind the actor. It could be that some of the pixel colors would not be visible in some renderings because they are undiscriminably dark, but at least they are encoded, and calculated by the apparatus, so that any final rendering apparatus (e.g. a TV doing a display tuning to its MDR range, and vendor-specific brightening processing of the darkest regions) can use this data appropriately. We see furthermore that there is a bright luminance mode HiLaIm2, which may correspond to e.g. a lamp, in which we would like to see some structure ideally (e.g. how the lamp reflects in its metal luminaire). The image to be PIP-ed, Im1, has a characteristic with a high pixel count peak HiModIm1 near white (the brightest luminances in that code). This may be because the person (who also has a reasonably large area, as can be seen from the mode near anc_FC, where a typical face color should be in typically lit images) is standing in front of a large bright screen, e.g. a light-box, which is near white or even clipped to maximum white potentially. This peak has a large likelihood of being too bright and disturbing in the combination. In this first example however, because the face colors are in both images in normal positions, and there is a reasonably large amount of brighter colors already in the HDR image (both the mode of diffusively lit objects, e.g. under the main set of lamps, and some highlights HLaIm2 which are 100× brighter than the face), one can put the HiModIm1 at its normal position (i.e. the same number of stops above the anchor in the CombRng as coded in the Im1 when decoded into a linear luminance representation, which is also in this example a normal decoded value of around 100 nit because the face luminance is at its normal LDR position), because there it will be a normal luminance which one could see occurring in Im2 too, i.e. it will not be too disharmonious. This then also means that the highlights of Im2 can be kept at their normal positions (because no re-matching or re-coordination is needed, since all matched colors fit in the current HDR image luminance distribution profile, which has its highlights where they happen to be for this image), i.e. the apparatus can select LMC to be the upper limit of the HiLaIm2 luminance mode, or the peak brightness of the HDR Im2 range in case it doesn't have luminances up to PB. That is not necessarily so, but can be a reasonable choice if no further specifics are known, e.g. regarding typical use further down the line of the HDR image handling chain). In FIG. 11B we have a similar situation (the same Im1 being PIP-ed), but now the Im2 has a different histogram (e.g. a later shot of the movie). Here the faces are to be rendered (i.e. if they were rendered on their own without any combination with other image content) relatively dark, e.g. at 4 nit. It could e.g. be that a person is standing in the shadows. In this example the apparatus doesn't want to make the faces in the PIP so dark, but still it does want a more coordinated darkness for the Im1 faces too. The apparatus decided to take a setting of anc_FC one stop above the HDR image faces luminance, i.e. 8 nit, and to render the Im2 faces one stop below anc_FC (as they should retain their dark look, to keep the artistic intent of this movie scene), and (depending on i.a. the size of the PIP) to render in CombRng the faces of LDR commercial Im1 1 stop above anc_FC (still clearly a brighter image part, but not too disharmoniously bright). When maintaining the ratios of all object luminances in Im1 (the linear mapping through the anchor luminance anc_FC), this would already lower the HiModIm1 large region's luminance to below 60 nit instead of around 100. Still, when the apparatus judges the brightness impact (which it can judge purely on the luminances, e.g. by calculating a contrast CHL between some reference color of an important part or object of Im2, e.g. the face color anc_FC, and this HiModIm1 luminance, or by spatial analysis too, e.g. by weighing a larger and closer highlight area of Im1 as more seriously contrasting with the important e.g. central area of Im2) it may still consider that large bright area of Im1 too bright compared to the rather dark look of most of Im2. So it may decide to lower the luminance of this mode HiModIm1 by 1 stop, bringing it to 30 nit, which should not be too distracting for a small PIP in the right-upper corner. As shown above, the apparatus can do that in various manners, e.g. by lowering the contrast factor C for the luminance transformation to CombRng above anc_FC, or some non-linear function which may be calculated based on some desired maximum position LAMX for the brightest possible pixels in Im1, potentially further determined by positioning some diffuse white anchor luminance, etc. Note also that the apparatus has in this embodiment done some harmonizing processing in the black luminance sub-range too. Because the blacks of the HDR image go very deep (and one may assume that several displays may render this, at least when the algorithm is applied prior to display optimization, if run with a display connected, or even in the display, of course the apparatus may take into account what the display can actually render with sufficient visual quality, i.e. visibility), the apparatus may deepen the blacks of Im1 also, to make both sets of blacks more harmonious. It can do so by spreading e.g. all luminances below what was coded for Im1 as LA_Bk (some black delimiter), e.g. by stretching the local contrast by 2×. It can be seen from FIG. 11B that in this example the keeping of the brightest regions of the HDR image may still be useful, i.e. LMC is determined again to the maximum value needed for faithful rendering of Im2 on displays which can do so, because the problem was mostly in coordinating Im1 in a luminance sub-region which falls much deeper. Note that the apparatus has in this example chosen to limit LmiC somewhat above the darkest colors in Im2, e.g. X stops below anc_FC, because it judges that colors which are too dark will be disregarded by the viewer in the combination anyway. The color transformations mapping to CombRng can take this into account and brighten the darkest colors to bring them within CombRng.

FIG. 12A gives an example in which Im1 (i.e. in our simple elucidation the commercial) becomes the dominant image. Perhaps viewers don't want their movie to become small when the commercials start, but the PIP could e.g. be a second channel to watch, or even contain the initially watched Im2 movie switches to a small PIP if something important starts on a second channel the viewer also would like to watch (e.g. this image of Im1 corresponds to the start of the news which the viewer doesn't want to miss because an important news item is expected). Now suppose that Im1 is a SDR image, but someone (e.g. the creator of the content—say a commercial—may have specified the following desideratum in metadata "render brightest luminance at 500 nit, on displays of PB at least 1000 nit", or the viewer may have chosen some user setting, which indicates how dynamic or conservative he wants to see the brightnesses of his content, even if SDR) has specified it to be rendered on higher dynamic ranges as very bright since there is room for that on brighter displays. So if decoded normally according to Rec. 709 we would get histogram Im1Nat, but in actuality, we will get in the CombRng to be rendered the histogram Im1adj with values for Im1 in the combination up to 500 nit (at least when the desideratum of the SDR content creator is fully followed by the combination apparatus, because e.g. it is set to a free content viewing mode, paid by the commercial owners). FIG. 12A then gives a calculation embodiment where e.g. a younger viewer has set his system to dynamic mode. To be able to spectacularly contrast with the large bright area coming from Im1, the apparatus needs to set (at least in this intermediate specifying CombRng, whatever display tuning may happen to it) the bright lamps to e.g. 8000 nit, i.e. it needs to set LMC to 8000 nit (even when it was e.g. 4000 nit in the original Im2 decoding). FIG. 12B is an embodiment which contrasts with the first possibility because the viewer has set his system to conservative (because he doesn't like to see images which are overly bright). Now that is another harmonization consideration, where the brightness of the SDR content is leading, and sufficiently bright, so the reader sees that this is a very different result of the derivation of the LMC of the CombRng. Because there are already so many pixels from Im1 which are very bright, which contributes to a judged or experienced overall high brightness of the combined image Im_o, the apparatus may desire to lower the luminances of the bright HDR mode HiLaIm2, and consequently LMC to 2000 nit only (even though the movie was e.g. master graded on a 10,000 PB_D grading display, and communicated as 5000 nit PB_C HDR images, e.g. with a SMPTE 2084 EOTF luma allocation). Although there is now less contrast between the brightest lamps of the HDR image and the bright large region of the Im1 (2 stops instead of 5 or more), i.e. the HDR movie will lose some of its punch when the PIP pops up, at least the overall image is not too bright. The viewer may desire this manner of combination.

Also if the range CombRng is specified prior to anc_FC, the apparatus can look at various aspects of the luminances of the pixels and objects in both images, e.g. specify one or more corresponding typical luminances. E.g. it may look at a percentage of pixels in both images k times above middle grey, or above 1 times below peak luminance of the decoded images, and decide from these values in both images what good values for several typical luminances would be, the maximum possible luminance in the combination LMC at least to start with. If an apparatus embodiment uses one typical value of the brightest object luminances for each image, it can determine how those would relate when mapped in CombRng, i.e. e.g. what luminance contrast they would have, and propose a more harmonized contrast. Of course further values, like middle grey representative values of most of the colors in the scene (middle grey can be some actual 10% reflectance in some typical illumination of the scene, but can also be used to indicate e.g. a mode, majority value, or average etc. of the pixels in the image), can help in determining what the various inter-region-contrasts in the combined image will be, e.g. the brightest parts of Im2 versus the middle grey part of Im1 etc., and chose harmonious relations between those. E.g., some apparatus embodiments may be configured to always chose some typical contrast values, with the bright, dark and average regions allocated to some typical luminance sub-regions of CombRng (which may of course differ depending on whether LMC is 1000 nit, 2000 nit, 5000 nit, or 10000 nit approximately), and those values can be deviated from (e.g. mapping k stops higher in CombRng) when some characteristic image type is detected, e.g. night scene, well-lit news program, evening in nature, etc. When determining a good anc value for say a good face or grey brightness (or bright light regions) the apparatus can measure what viewing environment the viewer is sitting in. E.g. the forward looking camera in a TV can summarize the environment's brightness characteristics in one or more characterizing values, which can be used in equations to scale the anc_FC value etc. (e.g. a 1 or more stops up or down), and the contrasts needed for other luminances compared to the anchor luminance(s), etc. E.g. the camera can see the viewer (by face detection) is sitting on a coach under some local lighting, and it can determine a second regions which are the walls and other objects behind, typically less well illuminated. If a single characterizing environment brightness value has to be derived by an embodiment, the brightness of the surround walls will be valued higher in the calculation (e.g. a*surround_average_L+b*local_spot_average_L), because the local illumination will typically come from above and influence less experience of the environment the viewer is in (e.g. what the brain establishes as a deep black in that environment, which the display just forms a part of). From these various elucidations it should now be clear to the reader that in the various embodiments, there can be various ways to come to the totality of CombRng, one or more anc luminances, and luminance mapping function shapes, and in fact in the end, a harmonious output image for each situation.

FIG. 18 shows merely some elucidating generic typical possibilities of determined color transformation functions FF to be applied to the luminances of at least one of the images or image parts to be mixed (or some or all of them having their respective functions FF_x), and from these examples the reader can imagine further possibilities following the general concepts of our inventions and its various embodiments. E.g., FIG. 18a shows two simple manner to determine a FF_1 function composed of two parts (in this example ending at the exact end points of the range, which can be deviated from in other scenarios). In case the output result luminance (LF1_o) of applying the function to a luminance of the input image being equal to the source anchor (L_SA1) has to be exactly equal to anc, we get from this internal program of the apparatus the function drawn. In case the output luminance LT2_v can fall in a vicinity, a similar somewhat different two segment function FF can be determined which goes through the point with Y-value anc/k, where k is e.g. 1.5, 2, 3 or 4.

FIG. 18b shows that complexly shaped functions can be designed around this, e.g. normally/dimly lit middle grey anchor, with e.g. an S-curve for the blacks. The combination apparatus can propose such a luminance mapping function part, by e.g. typically looking at the re-grading luminance functions (e.g. the fine-grading function) which has been communicated according to our coding principles to obtain one of the dynamic range images from the other, actually received one. If the combination apparatus sees such an S-type behavior for the blacks, it can understand that there seems to be some important objects region in the middle of the blacks, which needs to have a good strong contrast, whereas the deepest blacks seem to be largely ignorable, because the function shows they can be almost clipped to minimum black (0, or whatever Min-Black happens to be). So a somewhat smarter combination program embodiments will follow this behavior in its determined FF shape, but now the function is re-shaped because the mapping doesn't go between the master HDR 5000 nit range of luminances and a 100 nit SDR range, but to say a 500 nit CombRng (so there will be a need to transform the black somewhat, according to similar needs of mostly making sure that the middle blacks are best rendered, but it will be somewhat differently). Similarly for the function part for the brights, the combination apparatus can decide to follow shape-specifics corresponding to critical image object luminance sub-ranges to a more precise or lesser degree. FIG. 18c shows an example where the combination apparatus controls the contrast C of some "middle range" of the e.g. SDR image to be combined, and also in this example the apparatus decided to not stretch the upper part of the FF function all the way up to the maximum of the CombRng (of the output image Im_Cmb), as in the embodiment that might result in too bright SDR pixel rendering (the reader should understand that HDR image luminance histograms typically have far-spread lobes, with the lobe of the brightest luminances e.g. only containing 20×5 pixels of 20 small specular patches, whereas SDR image contain tightly bundled histograms, with many luminances around the maximum PB_C=100 nit, e.g. potentially even large image regions of clipped-to-white outdoors scenery, and certainly in a relatively dimmer or darker HDR movie, those regions of combined pixels should not be rendered so bright as PB_Comb=2000 nit, to not destroy the pleasure of movie viewing). It should be appreciate that in the earlier days combination apparatus embodiments may only have a couple of such sensible pre-programmed rules in their software or hardware, but embodiments further in the future could do complicated analysis, to come to finally balanced image combinations. So various different system embodiments can be designed around that core apparatus handling the correct image or video mixing, e.g. to allow that a human can specify, long before the (often unknown) mixing actually occurs, in an elegant not too cumbersome manner, what his content needs, by selecting a good value of the anchor luminance of his content. Various embodiments can occur in the mixing apparatus, e.g. where the apparatus uses the same type of anchor (although some apparatuses could also decide to use a different anchor type, and convert the harmonized mapping of the two images from their anchor types into the available luminances of the mixing dynamic range). The skilled reader can understand that in practice the former situation can be embodied in e.g. a mixing apparatus which operates in a kind of slave mode, checking that at least the main video e.g. defined what its critical face anchor luminance was, then establishes what a good face luminance would be in the mixing dynamic range (e.g. already taking final rendering characteristics into account), and then luminance-transforms the second image (even if that doesn't contain a face), to be harmonious with that luminance of the important face in the first image (i.e. how it was represented in the combination dynamic range). An example of the second strategy, in which the mixing apparatus is leading, could be e.g. if the user is looking through photos on tv and has established some reference for that (by defining an anchor luminance as representative single value for the overall typical brightness to which photo renderings must (approximately) comply; and typically also a presentation dynamic range, e.g. he has defined a not too bright (soft viewing) combination dynamic range already with the photos luminance mapped in that range, prior to whatever other image data may come in and be harmoniously mixed, and may also have specified that the photos currently use mostly half of that range, i.e. all our most of their pixels have luminances below PB_Comb_PhotView/2, even though there is some room in the combination dynamic range for brighter pixels, should the secondary content desire so). The mixing of the secondary image content (the primary content being the photos where already being mapped under a determined luminance mapping) will then happen by the apparatus by looking at the anchor value in the content (which may be different than the anchor type of the photo viewing, but will by a formula calculation of the mixing apparatus be related to it, e.g. anc_face_inmix=1.3*anc_photviewapplic), and the established photo viewing combination dynamic range with luminances between e.g. 0 or k nit and PB_Comb_PhotView. It is very useful to have a generic single (all situation capable) HDR image content mixing system which can handle various situations, and the determination in various species will depend on what is optimal for the situation, and what is already known at any time to the apparatus.

E.g., in case the final rendering system is not yet known, the best thing a mixer can do when needing to harmonize the two image contents is to at least look how those are best mixed (e.g. whether one of the images has excessively more (maybe large) high brightness regions, which need to be dimmed to enjoy the other image content). In that case the final display optimization stage (e.g. in a consumer's TV) may still need to do a more complex optimization, taking into account the images as already indicated as how they should (generically) be optimally mixed. However, in embodiments where the rendering environment is already known, and in particular where that has strong desiderata, the mixer may balance more towards the final look (i.e. the visual quality needs of the to a large factor display-determined Combrng, and e.g. sacrifice somewhat of the perfect sole rendering of one of the images, by doing a different mapping). In case the rendering capabilities are of primary importance in the determination of the CombRng, typically at least some typical considerations will be used concerning to be expected properties of e.g. HDR images (e.g. the combination apparatus software rules determining that probably most of an "generic" typical HDR image would reside (+−) below e.g. 500 nit, and bright objects should be renderably if allocated to be displayed luminances of e.g. up to 1500 nit. If a display then e.g. has only a capability of only PB_D=1000 nit, that would correspond to some erroneous non-optimal rendering of good quality HDR images (i.e. bright explosions of e.g. 1400 nit would be somewhat too dim). In such a situation, although the actual PB_D of the available display may have a large impact on the determination of the PB_C of the CombRng for mixing the image content prior to rendering, the combination apparatus could still decide to determine that PB of the CombRng somewhat above 1000 nit (and apply a final display tuning of the mixed image to map it to the display-renderable range), e.g. 15% higher i.e. 1150 nit. Of course ideally in the better embodiments, the optimization of the CombRng, and also a suitable anc point in that combination dynamic range, will take into account, and balance, all factors known (i.e. of the ideal content rendering needs, and all practical requirements and limitations of the current HDR image mixing phase). An optimal anc point determination may typically look at what is available (possible) after having defined previously the optimal CombRng (but as taught, various other factors may be involved, such as e.g. which kind of content semantically the images contain, and in some embodiments possibly even what the end viewer expects for such image content, etc.). So various embodiments can establish the anc in various manners, spanning over from a fixed setting in the apparatus that will (whatever is specified as source image anchor types) always relate everything to suitable face luminances, over a system which has various options of anc type and chooses the closest one to what was determined in at least one of the source images to be combined (i.e. an anc luminance in the CombRng of the same type as indicated in at least one of the images to be combined such as e.g. good face color, but in the CombRng, i.e. optimal for the combination situation, which should be understood is different than for rendering each image on its own), i.e. typically the leading image, to an on-the-fly determination of the apparatus of what would be a sensible anc value given all the physical specifics of the situation (content pixel luminance distribution and display capabilities e.g.), etc. The latter kind of embodiment is good if e.g. a face color has to be determined optimally given specific rendering limitations, such as e.g. how dark the display can well show dark objects, above which the face luminance should fall, which can be especially critical for faces in dark regions of the source images. So to be clear, some embodiments of the apparatus can work by determining some anc value (e.g. a good average luminances), although the two currently incoming images can be defined with anc luminances of the type face color, because generically the only thing needed for making the apparatus work is that those can be related by the apparatus (i.e. that typical face luminance in an input image can be mapped to the vicinity of the "average-type" anc value of the CombRng, because the apparatus judges that sufficiently good images would result if the faces are e.g. 50% brighter than that particularly firstly and independently established well usable anc value. So the anc types of source image and CombRng should be related or relatable. An anc can in an optimal and elegant manner summarize all the colorimetric complexities of an image, and in many situations one would only need one coordination point for the combining anyway. For completeness, it should be obvious that an anc value in a dynamic range means that it is neither of the endpoint luminances, but rather information additional to that. As to establishing a luminance dynamic range, the skilled reader may understand how that may involve determining an upper luminance, and for embodiments which don't systematically take the lowest luminance to be zero nit, also establishing a lower luminance, again dependent on the balanced needs of the known factors, such as amount of relevant image content in the darker regions of the image, capability of the rendering system to display dark colors, etc.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:
1. An apparatus, comprising:
a dynamic range establishing circuit,
 wherein the dynamic range establishing circuit is arranged to establish a combination luminance dynamic range,
 wherein the combination luminance dynamic range includes a maximum luminance,
 wherein the maximum luminance is determined based on at least one of; a maximum luminance of at least one of two images or two videos of images, and a peak brightness of a display for rendering the two images or the two videos of images,
 wherein the dynamic range establishing circuit comprises a luminance anchor determining circuit,
 wherein the luminance anchor determining circuit is arranged to determine an anchor luminance within the combination luminance dynamic range,
 wherein the two images or two videos of images have corresponding dynamic ranges which are different than each other, and
 wherein the anchor luminance is separate and distinct from the maximum luminance of the combination luminance dynamic range;
a color transformation circuit,
 wherein the color transformation circuit is arranged to perform at least a luminance transformation on at least one of the two images or videos,
 wherein the color transformation circuit comprises a source anchor luminance reading circuit,
 wherein the source anchor luminance reading circuit is arranged to read at least one source anchor luminance from metadata from a first source,
 wherein the first source provides a first image or video of the two images or videos,
 wherein the color transformation circuit is arranged to establish a color transformation to be applied to the first image or video,
 wherein the color transformation is dependent on a value of the source anchor luminance by having a property that the source anchor luminance is mapped to a first output luminance in a vicinity of the anchor luminance
 wherein the anchor luminance is separate and distinct from the maximum luminance of the combination luminance dynamic range; and
an image combination circuit, wherein the image combination circuit is arranged to combine the two images or two videos of images with their pixel colors in the combination luminance dynamic range to form at least one output image.

2. The apparatus of claim 1,
wherein the color transformation circuit is arranged to determine the color transformation such that, when the color transformation is applied to an input luminance of a color of a pixel of the first image or video in a case where the input luminance is equal to the at least one source anchor luminance, then the first output luminance is equal to the anchor luminance.

3. The apparatus of claim 2,
wherein the color transformation circuit is arranged to determine the color transformation such that $C/A=K*(B/D)$,
wherein A is the first output luminance;
wherein B is a second input luminance;
wherein C is a second output luminance,
wherein C is determined as the result of applying the color transformation to the second input luminance;
wherein K is a multiplicative constant; and
wherein D is the source anchor luminance.

4. The apparatus of claim 1,
wherein the color transformation circuit comprises a deviation determining circuit,
wherein the deviation determining circuit is arranged to determine on a basis of the at least one source anchor luminance a luminance offset, and
wherein the color transformation circuit is arranged to determine the color transformation such that when an input luminance of a color of a pixel of the first image or video is equal to the at least one source anchor luminance, then an output luminance of the color transformation unit is equal to the anchor luminance plus the luminance offset.

5. The apparatus of claim 4,
wherein the color transformation circuit is arranged to read at least one second source anchor luminance,
wherein the at least one second source anchor luminance is obtained from a second source,
wherein the second source delivers a second image or video of the two images or videos, and
wherein the deviation determining circuit is arranged to determine the luminance offset also on a basis of the at least one second source anchor luminance.

6. The apparatus of claim 1,
wherein the color transformation circuit is arranged to establish a color transformation to be applied to the first image or video also in dependence on first color re-mapping functions,
wherein the first color re-mapping functions specify a change in luminance distribution of objects in the first image or video for mapping the first image or video from the dynamic range associated with the encoding of the first image or video, to a dynamic range with a second peak brightness,
wherein the second peak brightness differs by at least a multiplicative factor of two with respect to a first peak brightness of the encoding of the first image or video.

7. The apparatus of claim 1, wherein the dynamic range establishing circuit is arranged to establish the combination luminance dynamic range such that the combination luminance dynamic range depends on luminances present in at least one of the two images or videos.

8. The apparatus of claim 7, wherein the dynamic range establishing circuit is arranged to establish the combination luminance dynamic range such that the combination luminance dynamic range depends on a peak brightness of a display on which the at least one output image is to be rendered.

9. The apparatus of claim 1, wherein the luminance anchor determining circuit is arranged to determine the anchor luminance depending on at least one of: the combination luminance dynamic range, luminances in at least one of the two images or videos, a peak brightness of a display on which the at least one output image is to be rendered, and a brightness characteristic of a viewing environment.

10. The apparatus of claim 1,
wherein the color transformation circuit is arranged to establish a color transformation,
wherein the color transformation is applied to the second image or video also in dependence on second color re-mapping functions,
wherein the second color re-mapping functions specify a change in luminance distribution of objects in the second image or video for mapping that second image or video from the dynamic range associated with the encoding of the second image or video, to a dynamic range with a peak brightness which differs by at least a multiplicative factor two with respect to the peak brightness of the encoding of the second image or video.

11. The apparatus of claim 1, wherein the metadata indicates to the color transformation circuit an average luminance of a face object in the first image or video as the source anchor luminance.

12. The apparatus of claim 11,
wherein the color transformation circuit is configured to read from the metadata a type of the face object among a set of defined types of face objects,
wherein the defined types of face objects have different luminance characteristics than each other.

13. The apparatus of claim 1,
wherein the first output luminance is offset from the anchor luminance by a luminance offset,
wherein the color transformation circuit is configured to determine the luminance offset by applying a heuristic algorithm to luminances of at least the first image or video.

14. A method of combining two images or two videos of images, the method comprising:
establishing a combination luminance dynamic range,
wherein at least a maximum luminance of the combination luminance dynamic range is determined based on at least one of: a maximum luminance of at least one of the two images or the two videos of images, and a peak brightness of a display for rendering the two images or the two videos of images,
wherein establishing the combination luminance dynamic range comprises determining an anchor luminance in the combination luminance dynamic range,
wherein the two images or two videos of images have corresponding dynamic ranges which are different than each other, and
wherein the anchor luminance is separate and distinct from the maximum luminance of the combination luminance dynamic range;
reading a source anchor luminance from metadata from a first source, wherein the first source delivers a first image or video of the two images or videos;
applying a color transformation on at least one of the two images or videos, consisting of at least a luminance transformation,
wherein the color transformation is established based on a value of the source anchor luminance, wherein the color transformation has a property that the source anchor luminance is mapped to a first output luminance in a vicinity of the anchor luminance, wherein the anchor luminance is separate and distinct from the maximum luminance of the combination luminance dynamic range; and combining the two images or two videos of images with their pixel colors in the combination luminance dynamic range to form at least one output image.

15. The method of claim 14, wherein the color transformation is determined such that when the color transformation is applied to an input luminance of a color of a pixel of the first image or video in a case where the input luminance is equal to the at least one source anchor luminance, then the first output luminance is equal to the anchor luminance, or equal to the anchor luminance plus a luminance offset.

16. The method of claim 14, wherein the color transformation is determined such that $C/A=K*(B/D)$, wherein A is the first output luminance, wherein B is a second input luminance, wherein C is a second output luminance, wherein the second output luminance which is determined as the result of applying the color transformation to a second input luminance;

wherein K is a multiplicative constant, and wherein D is the source anchor luminance.

17. The method of claim 14, wherein a color transformation of the second image or video of images is determined based on at least one second source anchor luminance obtained from a second source which delivers a second image or video of the two images or videos.

18. The method of claim 14, wherein the color transformation is determined at least in part based on at least one received function which indicates how the one of the two images or the two videos of images is to be transformed from the dynamic range corresponding to which it is encoded, to a second dynamic range, wherein the second dynamic range is at least two times higher or lower than the dynamic range in which the one of the two images or the two videos of images is encoded.

19. The method of claim 14, wherein at least one of the combination luminance dynamic range and the anchor luminance is determined from the list comprising a luminance distribution-dependent property of objects in at least one of the two images, information summarizing luminance characteristics of at least one of the two images, a dynamic range of a display on which the combined at least one output image is to be rendered, and a brightness measure for a viewing environment in which the output image is to be seen.

20. The method of claim 14, wherein the metadata indicates an average luminance of a face object in the first image or video as the source anchor luminance.

21. The method of claim 20, wherein the metadata further indicates a type of the face object among a set of defined types of face objects, wherein the defined types of face objects have different luminance characteristics than each other.

* * * * *